(12) United States Patent
Han et al.

(10) Patent No.: US 11,738,770 B2
(45) Date of Patent: Aug. 29, 2023

(54) DETERMINATION OF LANE CONNECTIVITY AT TRAFFIC INTERSECTIONS FOR HIGH DEFINITION MAPS

(71) Applicant: NVIDIA CORPORATION, Santa Clara, CA (US)

(72) Inventors: Xianglong Han, Palo Alto, CA (US); Ming Cui, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 395 days.

(21) Appl. No.: 16/919,137

(22) Filed: Jul. 2, 2020

(65) Prior Publication Data

US 2021/0001877 A1 Jan. 7, 2021

Related U.S. Application Data

(60) Provisional application No. 62/869,964, filed on Jul. 2, 2019.

(51) Int. Cl.
*B60W 60/00* (2020.01)
*G01C 21/00* (2006.01)
*B60W 50/14* (2020.01)
*B60W 40/02* (2006.01)
(Continued)

(52) U.S. Cl.
CPC .... *B60W 60/001* (2020.02); *B60W 30/18159* (2020.02); *B60W 40/02* (2013.01); *B60W 50/14* (2013.01); *G01C 21/3822* (2020.08); *G01C 21/3867* (2020.08); *G08G 1/0104* (2013.01); *B60W 2552/53* (2020.02)

(58) Field of Classification Search
CPC ........................ B60W 30/18159; B60W 60/01
See application file for complete search history.

(56) References Cited

U.S. PATENT DOCUMENTS

| | | |
|---|---|---|
| 2009/0299615 A1 | 12/2009 | Denaro |
| 2010/0057336 A1 | 3/2010 | Levine et al. |
| 2016/0040993 A1 | 2/2016 | Goldberg |

(Continued)

OTHER PUBLICATIONS

International Search Report and Written Opinion issued in corresponding application No. PCT/US2020/040787, dated Sep. 11, 2020.

(Continued)

*Primary Examiner* — Jess Whittington
(74) *Attorney, Agent, or Firm* — Maschoff Brennan

(57) ABSTRACT

According to an aspect of an embodiment, operations may comprise accessing an HD map of a region comprising information describing an intersection of two or more roads and describing lanes of the two or more roads that intersect the intersection, automatically identifying constraints on the lanes at the intersection, automatically calculating, based on the constraints on the lanes at the intersection, lane connectivity for the intersection, displaying, on a user interface, the automatically calculated lane connectivity for the intersection, receiving, from a user through the user interface, confirmation that the automatically calculated lane connectivity for the intersection is an actual lane connectivity for the intersection, and adding the actual lane connectivity for the intersection to the information describing the intersection in the HD map.

27 Claims, 48 Drawing Sheets

(51) Int. Cl.
*G08G 1/01* (2006.01)
*B60W 30/18* (2012.01)

(56) References Cited

U.S. PATENT DOCUMENTS

| | | |
|---|---|---|
| 2016/0091609 A1* | 3/2016 | Ismail .................... G01S 19/49 |
| | | 702/150 |
| 2018/0188037 A1 | 7/2018 | Wheeler et al. |
| 2018/0188059 A1 | 7/2018 | Wheeler et al. |
| 2018/0189578 A1* | 7/2018 | Yang .................... G06V 20/582 |
| 2020/0217686 A1* | 7/2020 | Koh .................... G08G 1/0965 |
| 2020/0255027 A1* | 8/2020 | Kulkarni ............ G01C 21/3602 |

OTHER PUBLICATIONS

Liu et al., Generating Enhanced Intersection Maps for Lane Level Vehicle Positioning based Applications, Social and Sehavioral Sciences, pp. 2395-2403, Nov. 20, 2013.

* cited by examiner

DETERMINATION OF LANE CONNECTIVITY AT TRAFFIC INTERSECTIONS FOR HIGH DEFINITION MAPS

CROSS-REFERENCE TO A RELATED APPLICATION

This patent application claims the benefit of and priority to U.S. Provisional App. No. 62/869,964 filed Jul. 2, 2019, which is incorporated by reference in the present disclosure in its entirety for all that it discloses.

FIELD

The embodiments discussed herein are related to maps for autonomous vehicles, and more particularly to determining lane connectivity at traffic intersections for high definition maps for autonomous vehicles.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise accessing an HD map of a region, the HD map comprising information describing an intersection of two or more roads and describing lanes of the two or more roads that intersect the intersection. The operations may also comprise automatically identifying constraints on the lanes at the intersection. The operations may also comprise automatically calculating, based on the constraints on the lanes at the intersection, lane connectivity for the intersection, the lane connectivity indicating which of the lanes that are outgoing from the intersection a vehicle can legally travel from each of the lanes that is incoming into the intersection. The operations may also comprise displaying, on a user interface, the automatically calculated lane connectivity for the intersection. The operations may also comprise receiving, from a user through the user interface, confirmation that the automatically calculated lane connectivity for the intersection is an actual lane connectivity for the intersection. The operations may also comprise adding the actual lane connectivity for the intersection to the information describing the intersection in the HD map.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
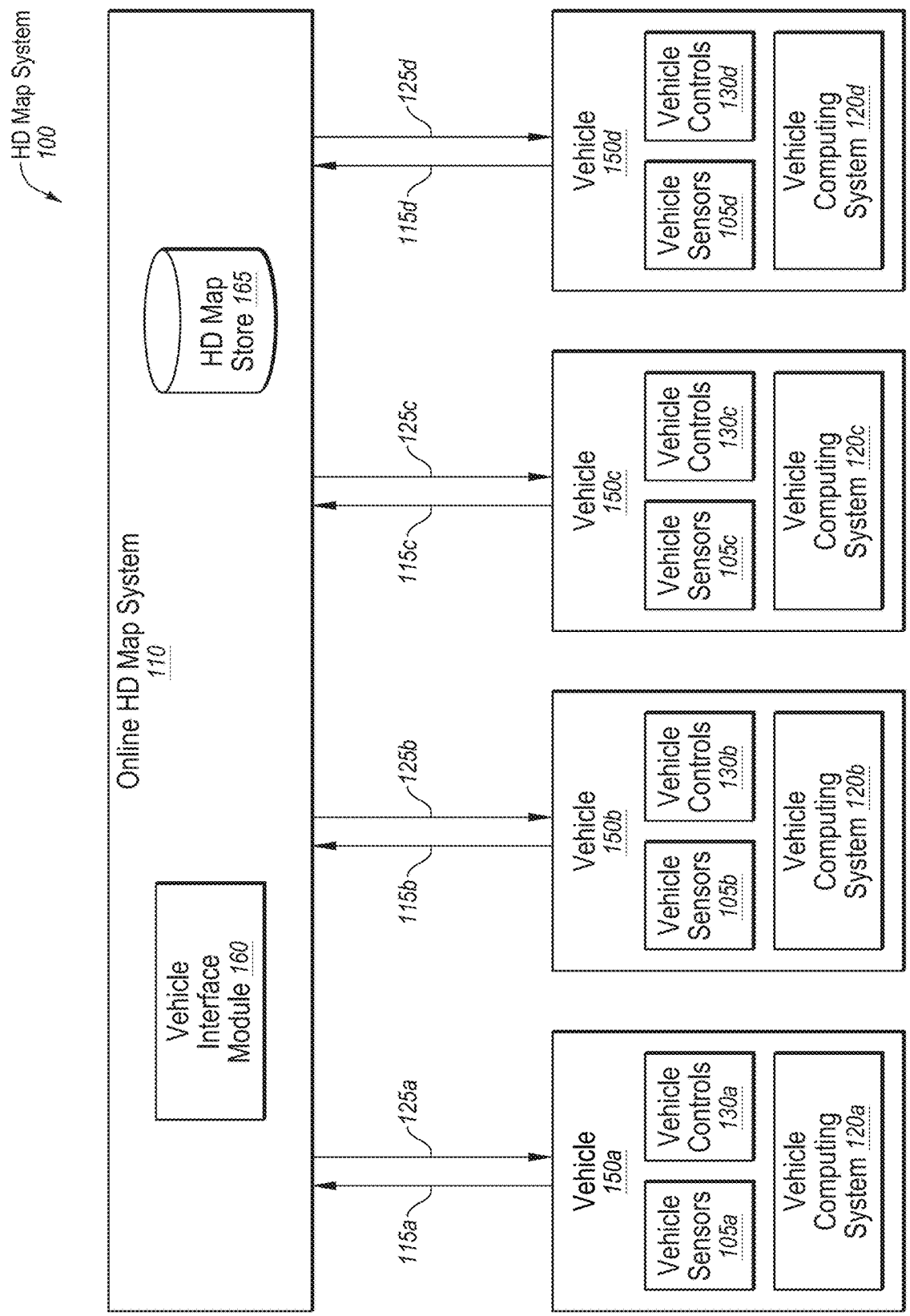
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may enable lane connectivity determinations at traffic intersections for HD maps for autonomous vehicles. In some embodiments, at a traffic intersection (also referred to as an intersection), a road may not have lane markings describing how a vehicle can travel through the intersection. For example, when making a left turn from a particular lane, a vehicle may be limited to entering a specific lane or may be able to enter two or more lanes. In some embodiments, the system may use various heuristics to determine lane connectivity at an intersection. In some embodiments, the system may determine the lane connectivity and may store the information as metadata that is provided to vehicles for determining how to navigate at the traffic intersection. In some embodiments, the system may automatically determine the lane connectivity and may configure a user interface that displays the automatically determined lane connectivity to a user or operator for verification. The user/operator may approve the lane connectivity at the intersection determined by the system or may manually correct it. Therefore, some embodiments may enable semi-automated lane connectivity calculations which may be faster and more accurate than using an entirely manual process or an entirely automated process.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150*a-d*) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120*a-d*) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4A:
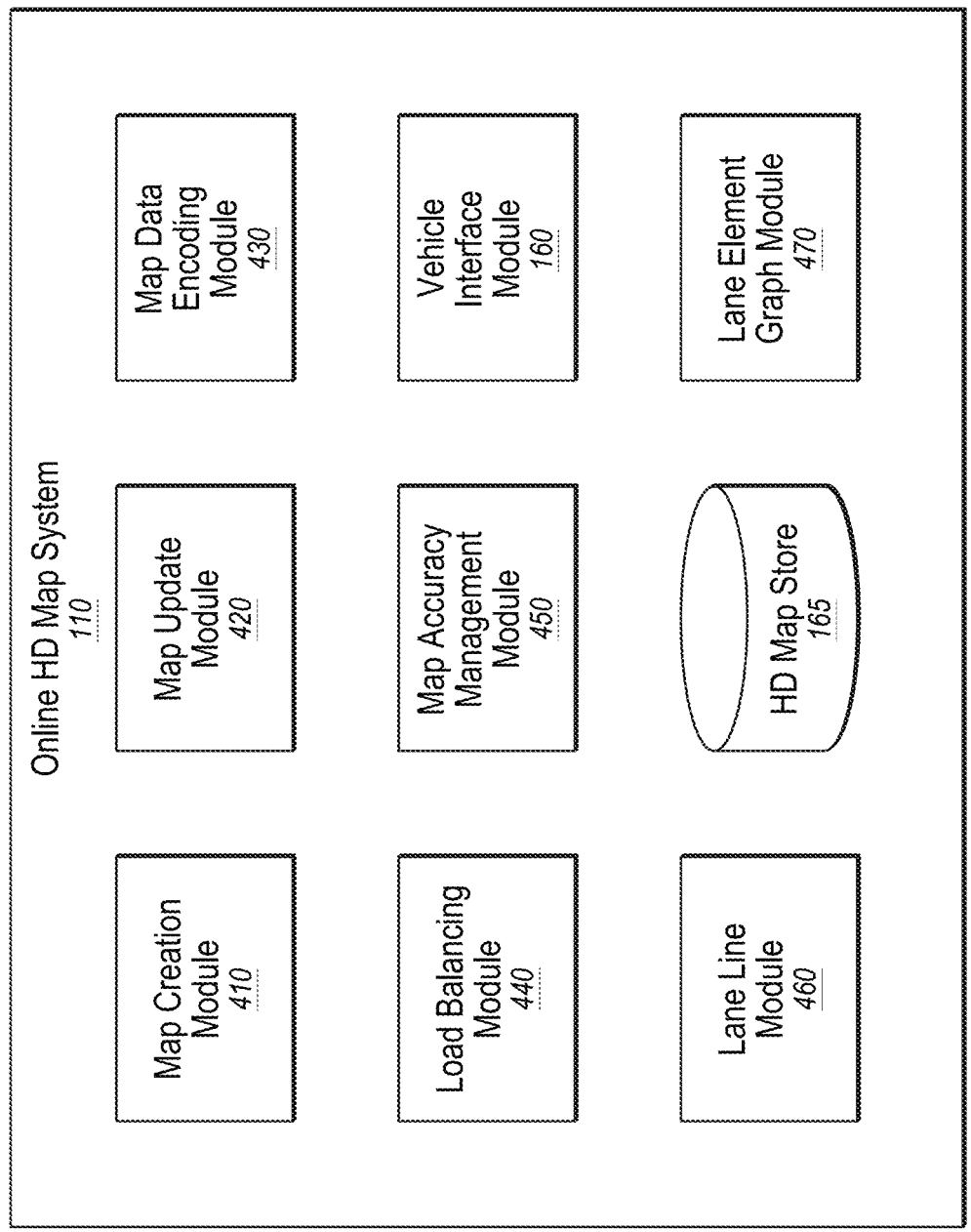
FIG. 4A illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4A and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
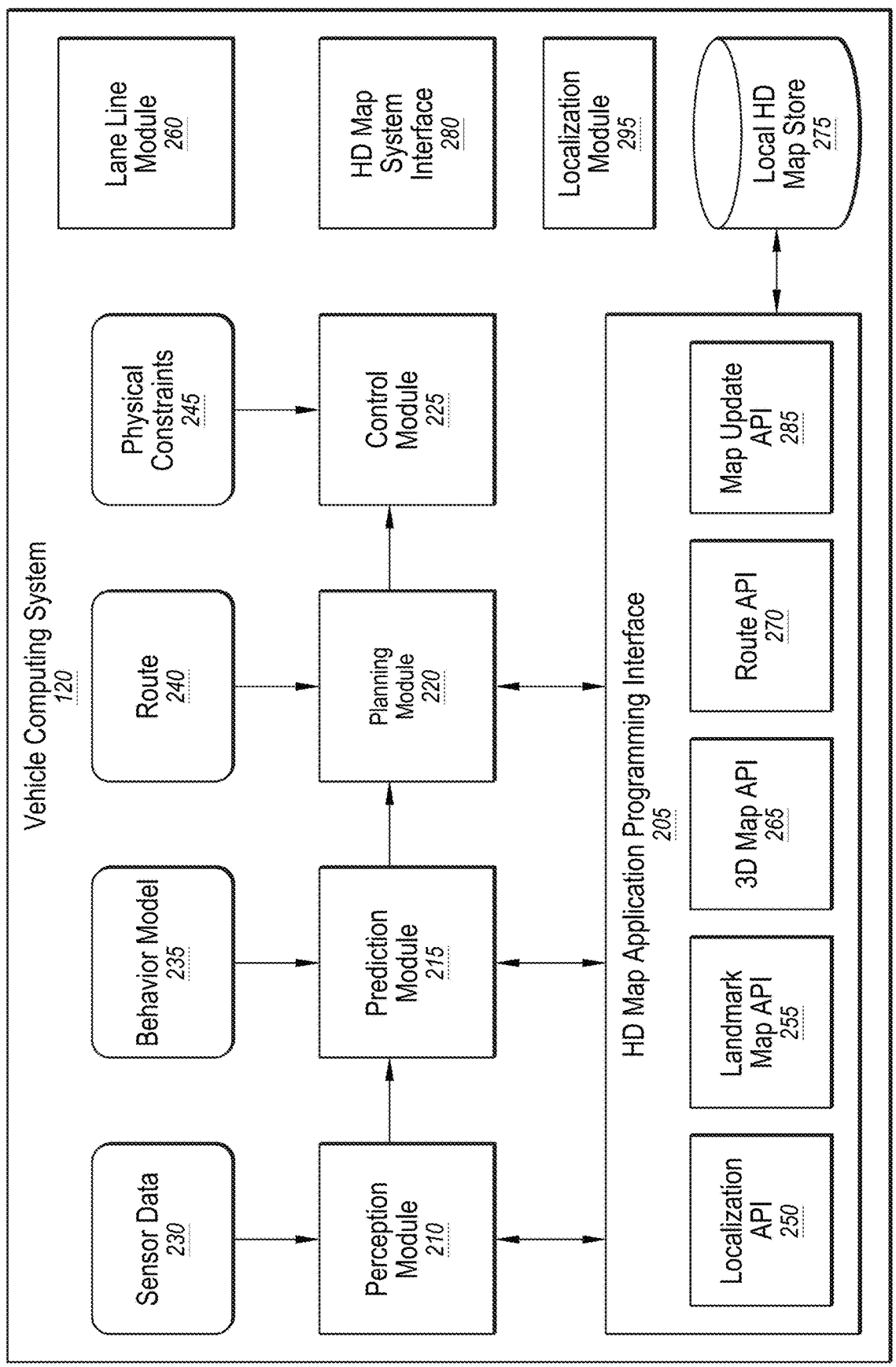
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a lane line module 260, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
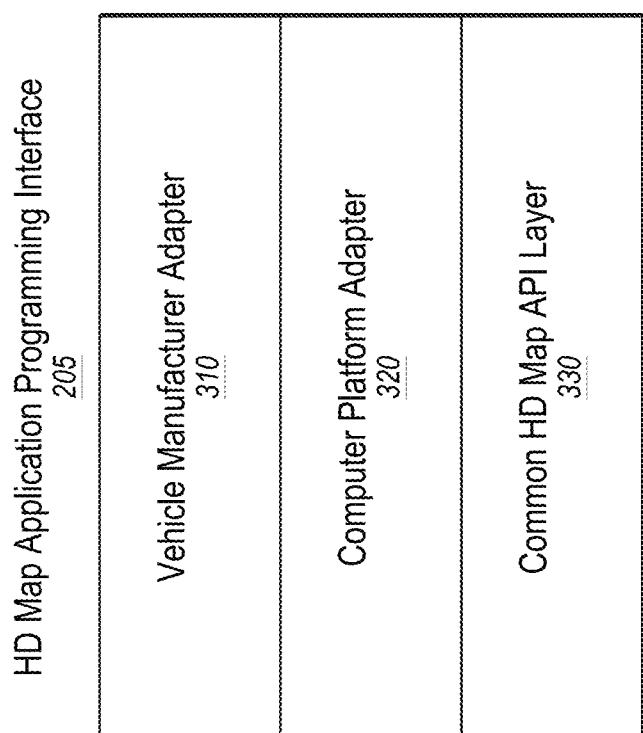
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4A illustrates an example system architecture of the online HD map system 110. The online HD map system 110 may be configured to include a map creation module 410, a map update module 420, a map data encoding module 430, a load balancing module 440, a map accuracy management module 450, a lane line module 460, lane element graph module 470, the vehicle interface module 160, and the HD map store 165. Some embodiments of online HD map system 110 may be configured to include more or fewer modules than shown in FIG. 4A. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy. The lane element graph module 470 may be configured to generate lane element graphs (i.e., a connected network of lane elements) to allow navigation of autonomous vehicles through a mapped area.

Figure 4B:
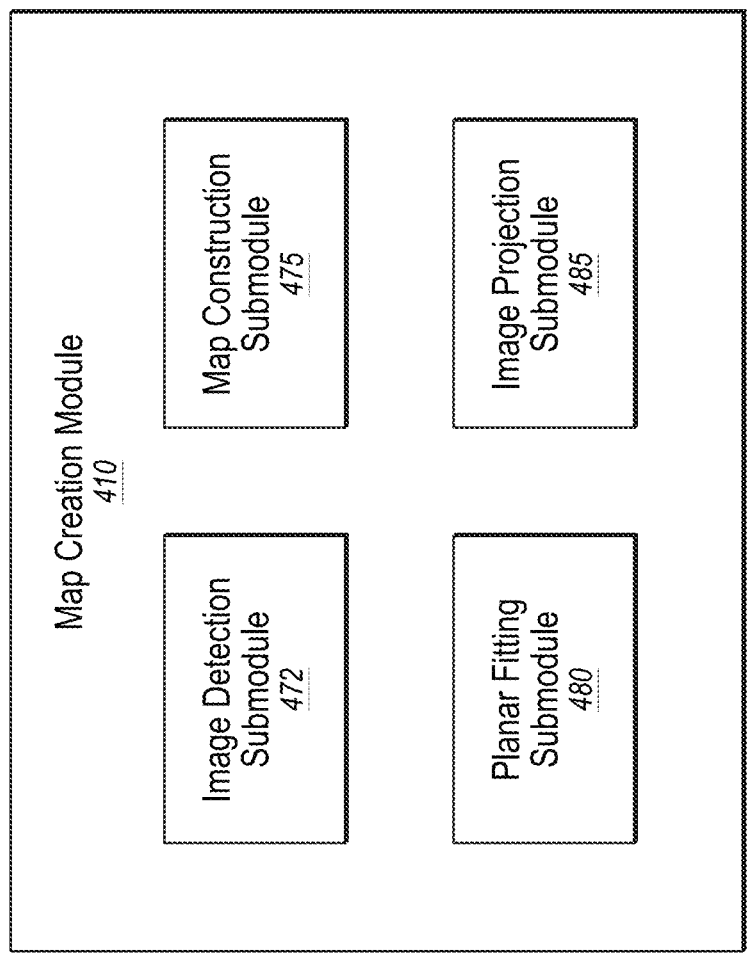
FIG. 4B illustrates an example of system architecture of a map creation module.

FIG. 4B illustrates an example of system architecture of the map creation module of FIG. 4A. The map creation module 410 may be configured to create the HD map from map data collected from several vehicles. In some embodiments, the map creation module 410 may include an image detection submodule 472, a 3D map construction submodule 475, a planar fitting submodule 480, and an image projection submodule 485, which are utilized to store traffic signs in the map. In some embodiments, the map creation module 410 may include additional or fewer submodules for the purpose of creating the HD map. Upon creating the HD map, the map creation module 410 may transmit the HD map to be stored by the HD map store 165 of FIG. 1.

The image detection submodule 472 may be configured to identify a traffic sign in an image. The image detection submodule 472 may receive at least one image from at least one camera (e.g., the vehicle sensor 105 of FIG. 1) mounted on at least one vehicle (e.g., the vehicle 150a of FIG. 1). The image may contain a traffic sign. The image detection submodule 472 may receive the image and identify the portion of the image corresponding to the traffic sign. In some embodiments, the image detection submodule 472 may apply one or more models for classifying the traffic sign with a plurality of attributes. Attributes may include a type of the sign, text on the traffic sign, color of the traffic sign, limitations of the traffic sign, etc. The classified attributes may be stored in the HD map describing the identified traffic sign.

The map construction submodule 475 may be configured to construct the HD map from a depth map. The map construction submodule 475 may receive at least one depth map from at least one detection and ranging sensor (e.g., the vehicle sensor 105a of FIG. 1) mounted on at least one vehicle (e.g., the vehicle 150a of FIG. 1). The depth map may contain a plurality of points displayed in two-dimensions wherein each point describes a distance of an exterior surface of a physical object from the detection and ranging sensor. The map construction submodule 475 may translate each point into a position vector of the exterior surface of the physical object. The map construction submodule 475 may translate a point's position in the depth map into a direction of the position vector from the detection and ranging sensor. The map construction submodule 475 may translate the point's distance into the magnitude of the position vector from the detection and ranging sensor. In some embodiments, the map construction submodule 475 may receive multiple depth maps and combine all translated position vectors to construct the map in three dimensions. For example, the map construction submodule 475 may receive multiple LIDAR scans and then merges the multiple LIDAR scans into a point cloud that is a 3D mapping of all translated position vectors from the multiple LIDAR scans. In some embodiments, the map construction submodule 475 may merges multiple LIDAR scans taken in quick succession and/or taken from relatively proximal positions.

The planar fitting submodule 480 may be configured to fit a plane corresponding to the traffic sign in the map. The planar fitting submodule 480 may utilize at least one depth map containing the traffic sign to identify a subset of at least three points corresponding to the traffic sign. In some embodiments, the planar fitting submodule 480 may utilize a depth map which the map construction submodule 475 may utilize to construct the map. The planar fitting submodule 480 may utilize the identified subset of at least three points and likewise identify the corresponding position vectors in the map. The planar fitting submodule 480 may fit a plane in the map based in part on the position vectors in the map and the plane corresponding to a spatial position of the traffic sign in the map.

The image projection submodule 485 may be configured to project the portion of the image of the traffic sign in the map. The image projection submodule 485 may take the identified portion of the image corresponding to the traffic sign from the image detection submodule 472. The image projection submodule 485 may process the portion of the image corresponding to the traffic sign. Processing of the portion of the image corresponding to the traffic sign may comprise editing the portion of the image, adjusting dimensions of the portion of the image, improving resolution of the portion of the image, some other image-processing process, or some combination thereof. The image projection submodule 485 may project the processed portion of the image in the map by placing the processed portion of the image on the fitted plane in the map corresponding to the traffic sign.

Figure 5:
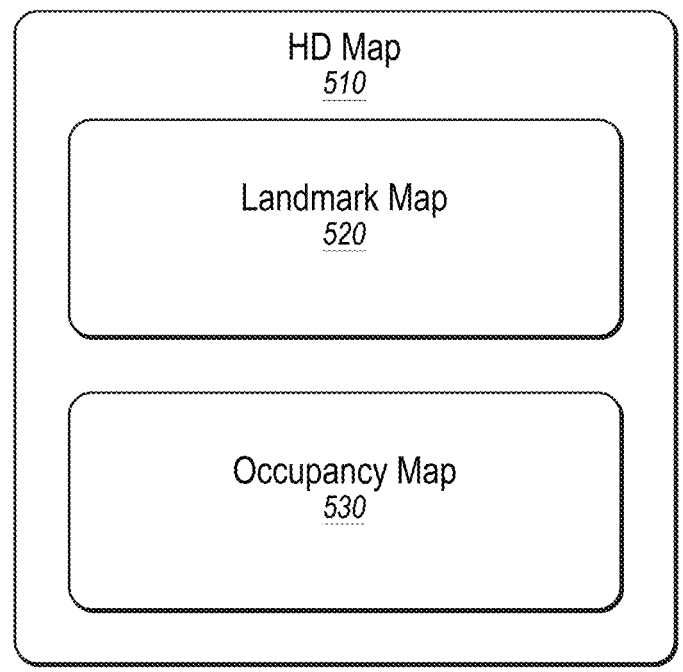
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
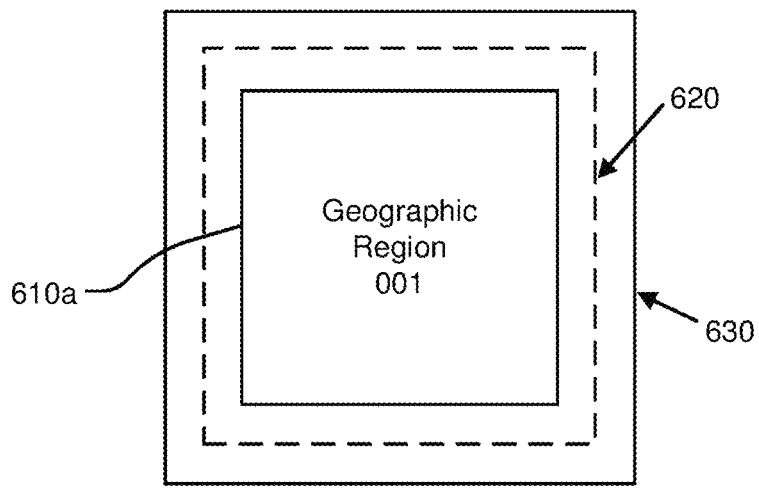
FIGS. 6A-6B illustrate example geographical regions defined in an HD map.
Figure 6B:
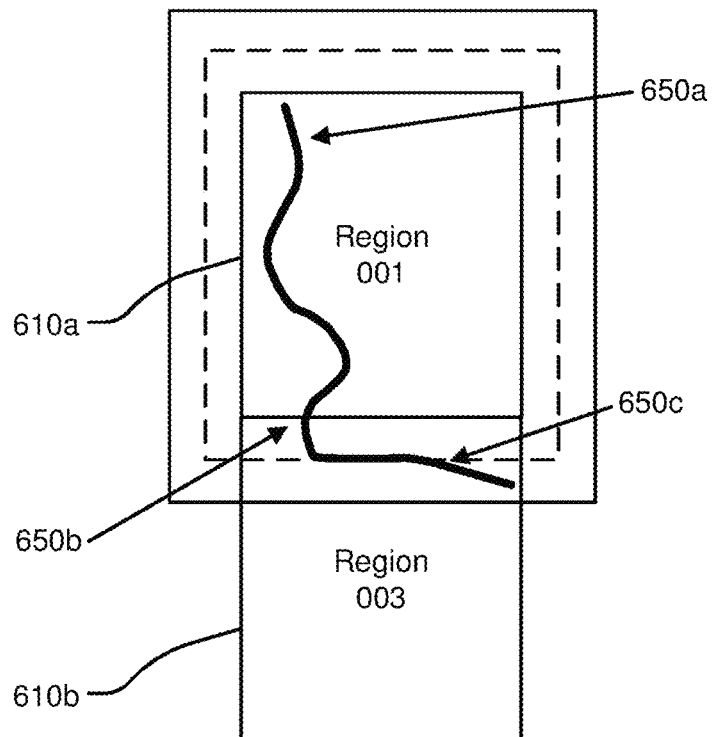

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
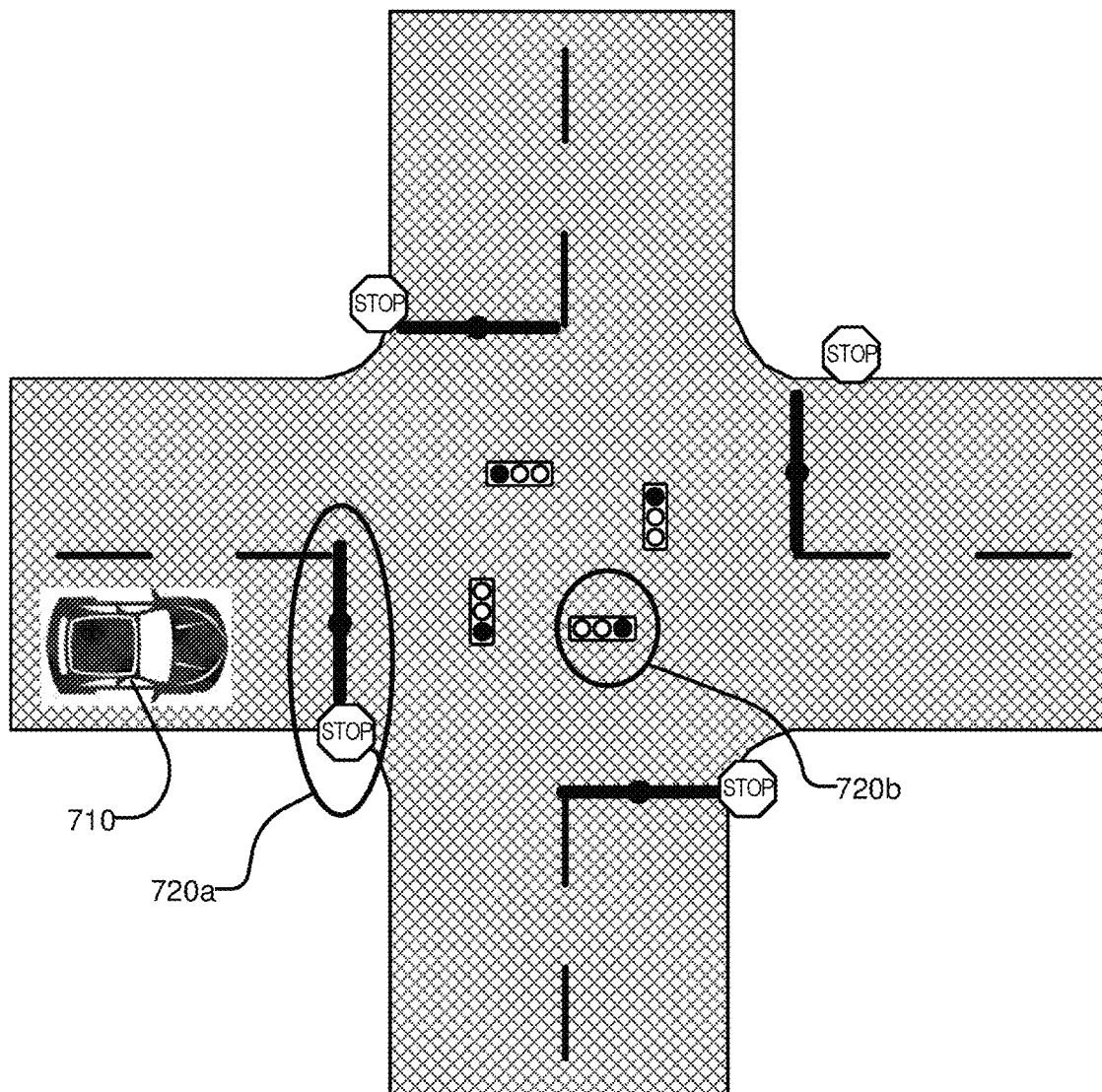
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
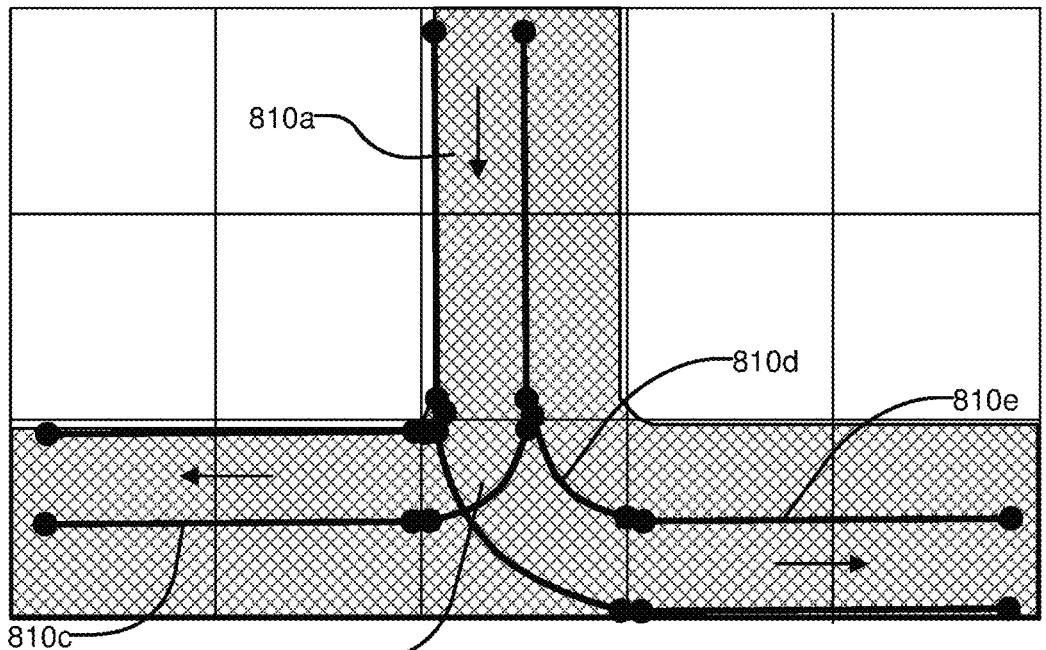
FIGS. 8A-8B illustrates example lane elements and relationships between lane elements in an HD map.
Figure 8B:
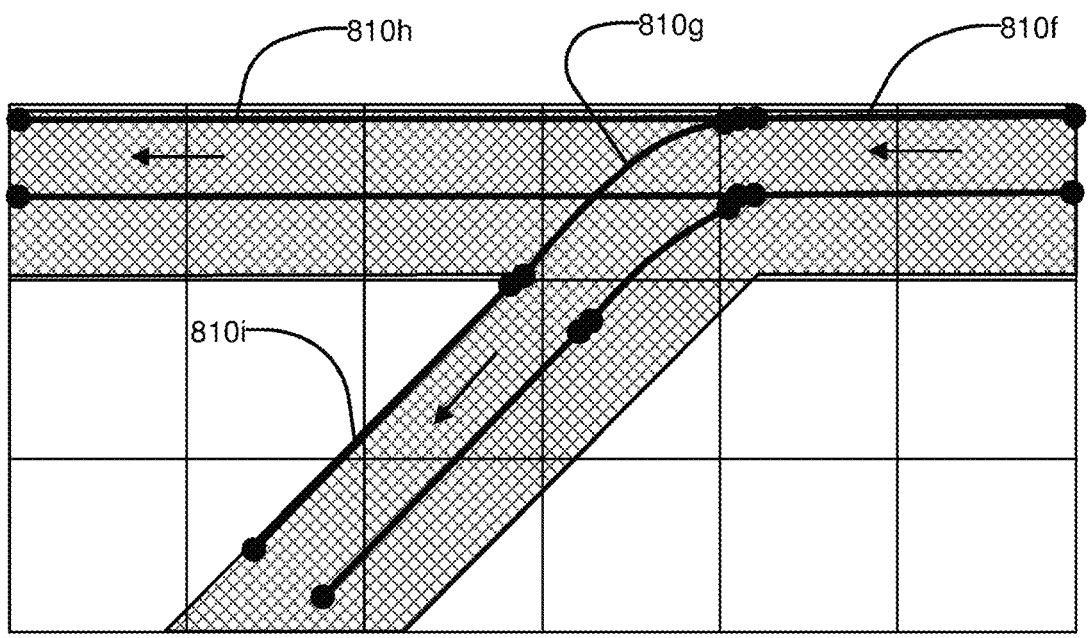

FIGS. 8A-B illustrate lane elements and relations between lane elements in an HD map. FIG. 8A illustrates an example of a T-junction in a road illustrating a lane element 810a that may be connected to lane element 810c via a turn lane 810b and is connected to lane 810e via a turn lane 810d. FIG. 8B illustrates an example of a Y-junction in a road illustrating label 810f connected to lane 810h directly and connected to lane 810i via lane 810g. The HD map system 100 may determine a route from a source location to a destination location as a sequence of connected lane elements that can be traversed to reach from the source location to the destination location.

Lane Line Module

Additional details regarding lane lines may be found in International Publication Number WO 2018/126228 A1, published Jul. 5, 2018, which is incorporated by reference in the present disclosure in its entirety for all that it discloses.

Figure 9A:
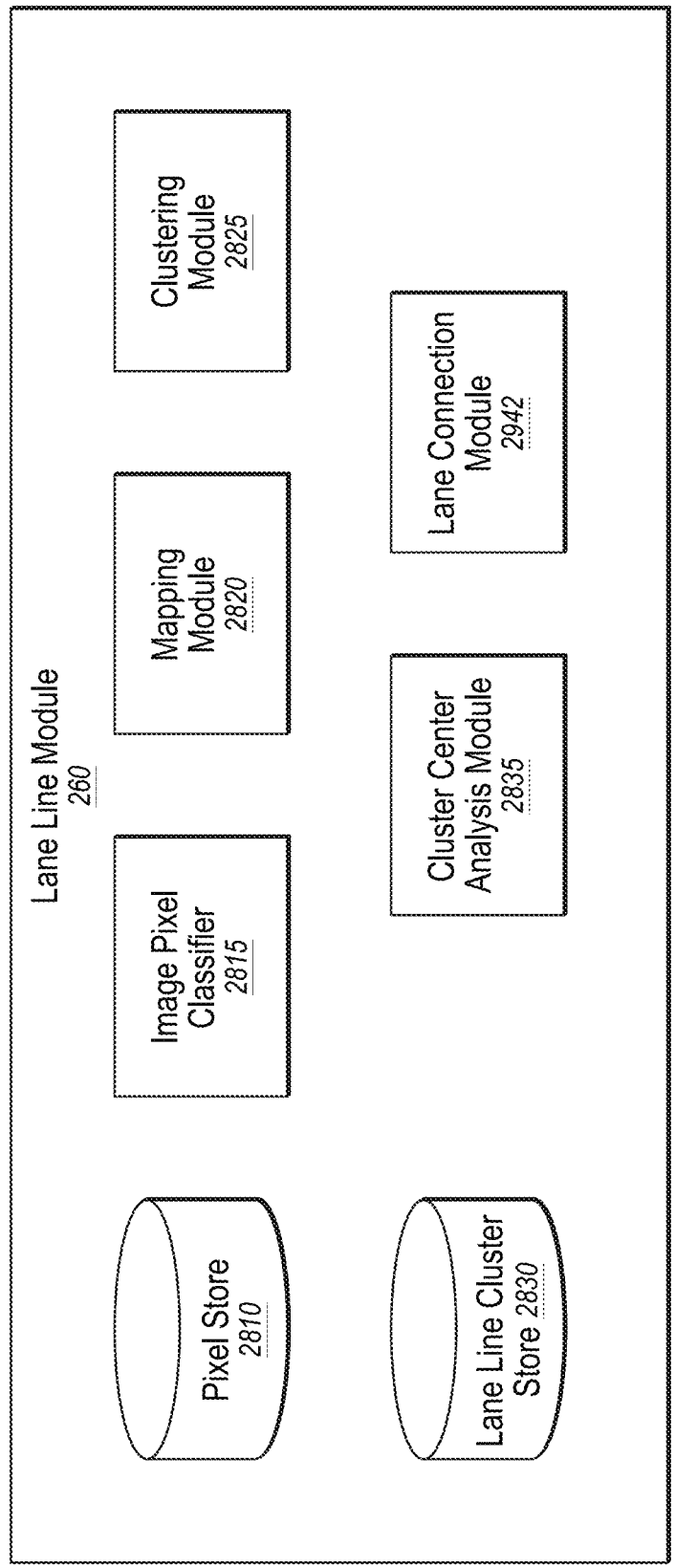
FIG. 9A illustrates an example system architecture of a lane line module.

FIG. 9A illustrates an example system architecture of the lane line module 460. The lane line module 460 may include a pixel store 2810, an image pixel classifier 2815, a mapping module 2820, a clustering module 2825, a lane line cluster store 2830, a cluster center analysis module 2835, and a lane connection module 2942. Similar to the architecture of the HD map system, other embodiments of the lane line module 460 may include more or fewer modules than those shown in FIG. 9A, and functionality indicated as being performed by a particular module may be implemented by other modules. In some embodiments, the lane line module 460 may be a distributed system comprising a plurality of processors.

The pixel store 2810 may contain two-dimensional pixels, referred to as 2D points, contained in images of lane lines. The image pixel classifier 2815 may assign probabilities to each 2D pixel which describes the likelihood that an individual pixel is in the center of a lane line. The mapping module 2820 may trace each 2D pixel above a threshold probability of being in the center of a lane line to a 3D representation, referred to as a 3D voxel. The clustering module 2825 may group neighboring points into lane line clusters which are stored within the lane line cluster store 2830. The cluster center analysis module 2835 may simplify stored lane line clusters by removing outlier points from the cluster and may draw a center line through the remaining points. Using the center line, the lane connection module 2942 may connect multiple lane line segments to create a complete representation of a lane line.

Overview of Lane Line Creation for HD Maps

Figure 9B:
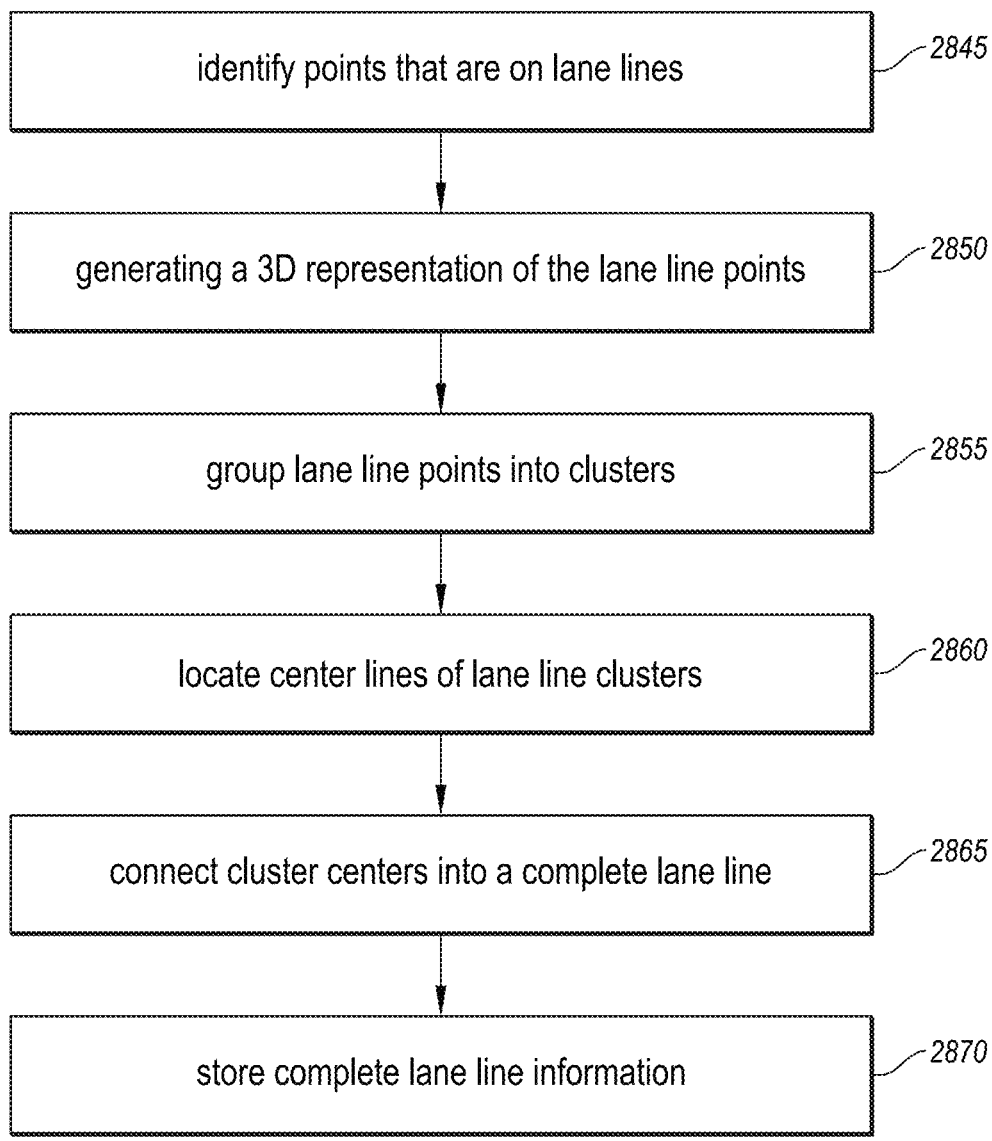
FIG. 9B illustrates a flow chart of an example lane line creation process.

FIG. 9B illustrates a flow chart of an example lane line creation process. The process of FIG. 9B may be performed by any suitable system, apparatus, or device. For example, one or more elements of the HD map system 100 of FIG. 1 may be configured to perform one or more of the operations of the process of FIG. 9B. Additionally or alternatively, the computer system 4300 of FIG. 31 may be configured to perform one or more of the operations associated with the process of FIG. 9B. Although illustrated with discrete blocks, the actions and operations associated with one or more of the blocks of the process of FIG. 9B may be divided into additional blocks, combined into fewer blocks, or eliminated, depending on the particular implementation.

The process of FIG. 9B may include identifying, at 2845, points that are on lane lines, generating, at 2850, a 3D representation of the lane line points, grouping, at 2855, lane line points into clusters, locating, at 2860, center lines of lane line clusters, connecting, at 2865, cluster centers into a complete lane line, and storing, at 2870, complete lane line information.

Figure 10:
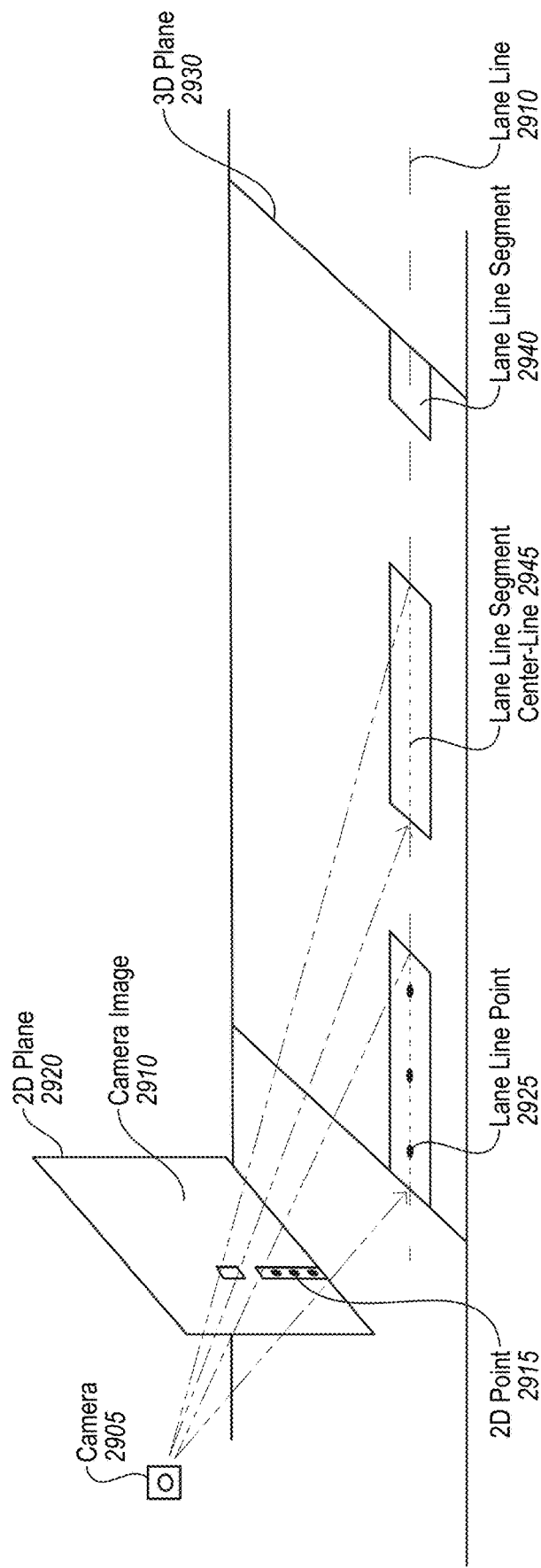
FIG. 10 illustrates example components used in an example lane line creation process.

FIG. 10 illustrates example components used in an example lane line creation process. The camera 2905 may capture a camera image 2910 and may identify 2D points 2915 of those images in a 2D plane 2920. The identified 2D points with high enough center line probabilities may be mapped to lane line points 2925 of a 3D voxel which exists in a 3D plane 2930. Lane lines 2935 may be represented as continuous lines along a vehicle route, but can be broken down into lane line segments 2940. Lane line segments 2940 may refer to sub-divisions of a single lane line. In some embodiments, different lane line segments 2940 may be geometrically identical whereas in others they may have different dimensions. Each lane line segment may be encompassed by and identified by a lane line segment center-line 2945 which may include two or more lane line points 2925 in the 3D plane 2930.

Figure 11:
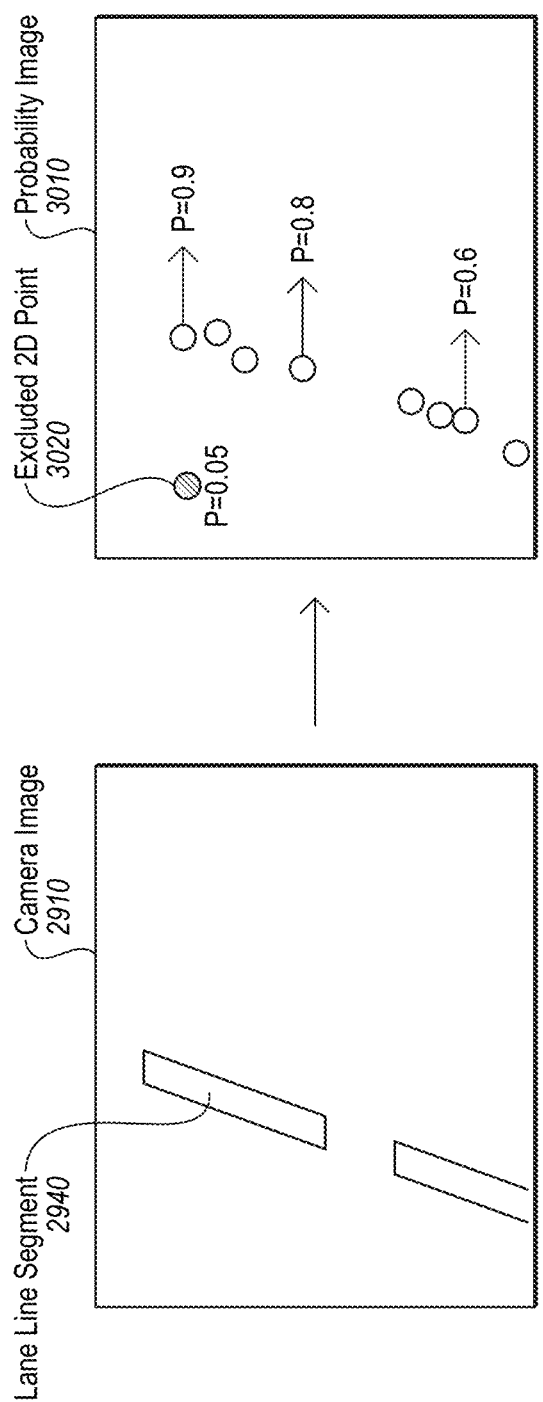
FIG. 11 illustrates an example camera image of two lane elements represented as a group of 2D points.

FIG. 11 illustrates an example camera image of two lane elements represented as a group of 2D points. For example, from one or more pictures of a lane line, the image pixel classifier 2815 may classify 2D points based on their likelihood of being located along the center of a lane line. In some embodiments, the likelihood that an image pixel falls along the center of a lane line, or a center line probability, may be represented as a numeric probability determined by an image segmentation deep learning model. For example, 2D points with a definite likelihood of being located at the center of a lane line may have probabilities of 1, whereas 2D points located off of the lane line have probabilities of 0. In some embodiments, the 2D points that fall on a lane line are identified by a range of acceptable probability values (e.g., 0.75 to 1.0). As disclosed in FIG. 11, a camera image 2910 may be converted into a probability image 3010 that includes a group of points that center line probabilities of 0.6, 0.8, and 0.9, all of which are greater than the probability of the excluded 2D point 3020 with a center line probability of 0.05. Continuing from the above example, 2D points located between the center and the edge of the lane line may have probabilities between 0 and 1. Based on these classifications, the image pixel classifier 2815 may identify points that fall on a lane line.

Mapping Between 2D Points and 3D Voxels

Figure 12A:
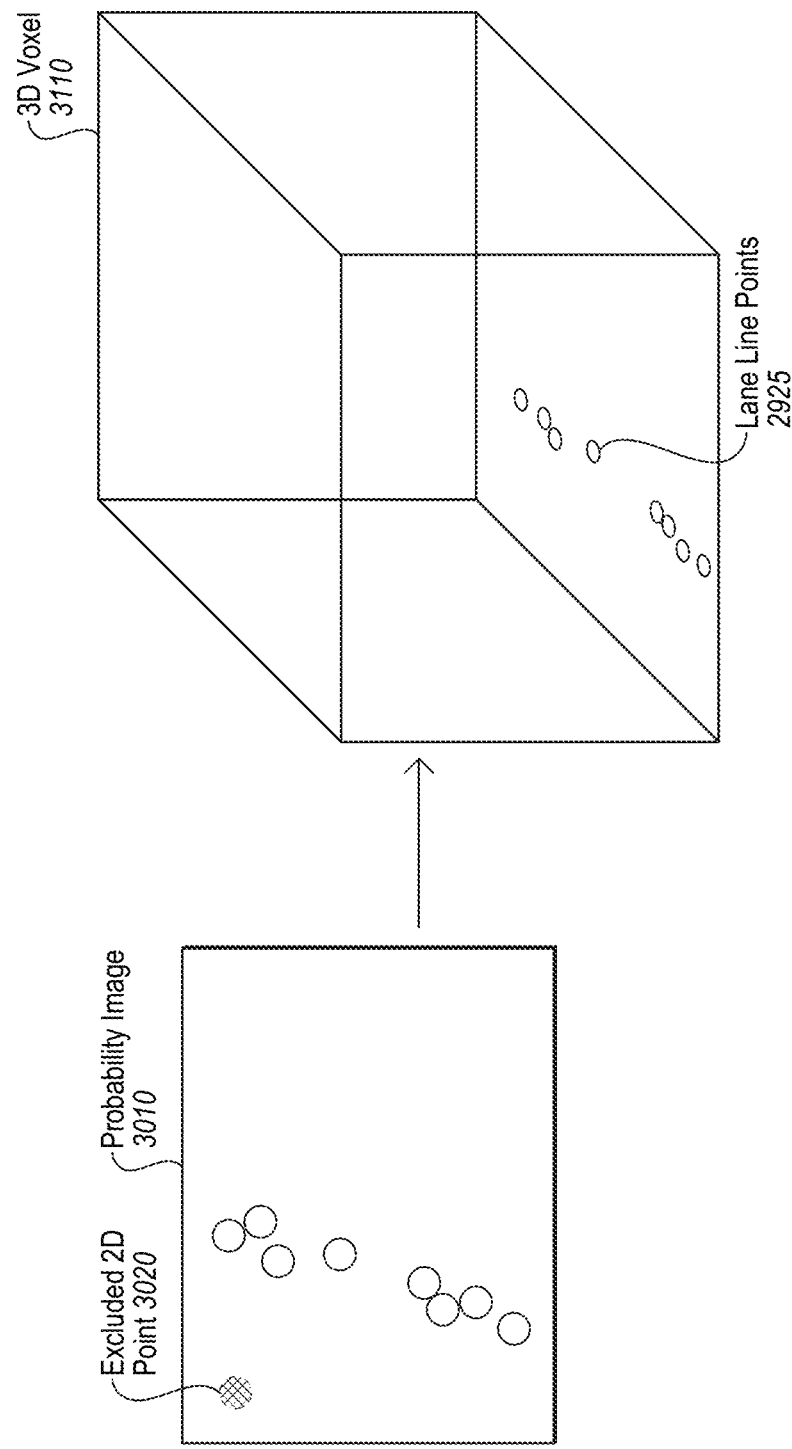
FIG. 12A illustrates an example 3D representation of a probability image converted from a camera image.

FIG. 12A illustrates an example 3D representation of a probability image converted from a camera image. For example, FIG. 12A discloses 3D voxel 3110 of the original probability image 3010 converted from the camera image. While the probability image 3010 may only represents the lane line and its surrounds in two-dimensions, the 3D voxel 3110 may represent the same information in three-dimensions to provide an additional layer of information to the online HD map system 110.

Figure 12B:
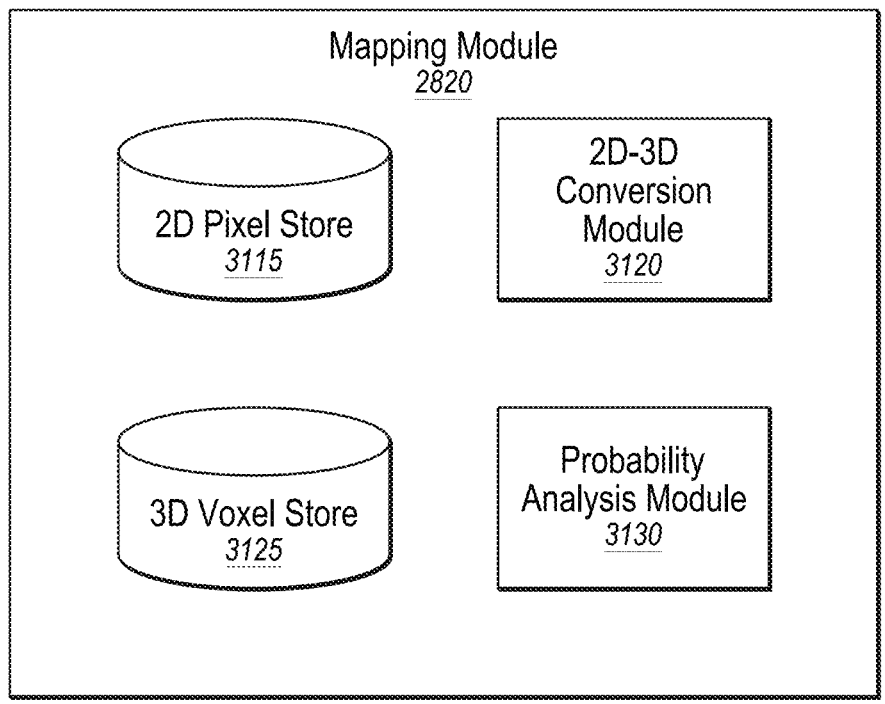
FIG. 12B illustrates an example system architecture of a mapping module.

FIG. 12B illustrates an example system architecture of a mapping module. The mapping module 2820 may map each 2D point 2915 to a lane line point 2925 in a 3D voxel 3110 to create a three-dimensional representation of the 2D point's surroundings. FIG. 11A shows the system architecture of the mapping module 2820. The mapping module 2820 may include a 2D pixel store 3115, a 2D-3D conversion module 3120, a 3D voxel store 3125, and a probability analysis module 3130. Other embodiments of the mapping module 2820 may include more or fewer embodiments modules than those presented in FIG. 12B and functionality indicated as being performed by a particular module may be implemented by other modules. The 2D pixel store 3115 may contain all 2D points 2915 obtained from the converting of the camera image 2910, whether identified as a having a center line probability above or below a threshold probability. From the 2D pixel store 3115, each 2D point 2915 identified as having a center line probability above the threshold probability may be passed through the 2D-3D conversion module 3120 to map the 2D point 2915 to a 3D voxel 3110. All mapped 3D voxels 3110 may be stored in the 3D voxel store 3125. The probability analysis module 3130 may compute the probability that a given 3D voxel includes the center of a lane line.

Figure 12C:
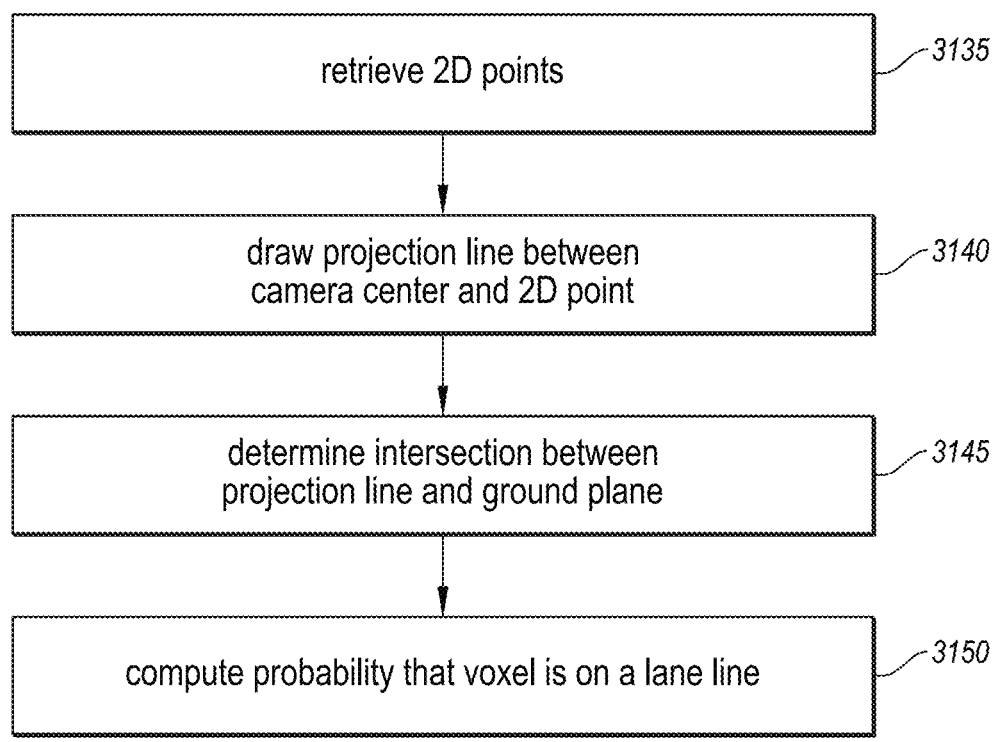
FIG. 12C illustrates a flow chart of an example process for mapping from the two-dimensional plane to the three-dimensional plane.

FIG. 12C illustrates a flow chart of an example process for mapping from the two-dimensional plane to the three-dimensional plane. The process of FIG. 12C may be performed by any suitable system, apparatus, or device. For example, one or more elements of the HD map system 100 of FIG. 1 may be configured to perform one or more of the operations of the process of FIG. 12C. Additionally or alternatively, the computer system 4300 of FIG. 31 may be configured to perform one or more of the operations associated with the process of FIG. 12C. Although illustrated with discrete blocks, the actions and operations associated with one or more of the blocks of the process of FIG. 12C may be divided into additional blocks, combined into fewer blocks, or eliminated, depending on the particular implementation.

The process of FIG. 12C may occur within the mapping module 2820 for mapping 2D points 2915 to 3D voxels 3110 (e.g., forward mapping). The mapping module 2820 may retrieve, at 3135, one or more 2D points 2915 from the set of identified 2D points within the 2D pixel store 3115 with high center line probabilities. Between each of the identified 2D points 2915 and the center of the camera responsible for producing the initial camera image, the 2D-3D conversion module 3120 may draw, at 3140, a projection line and may determine, at 3145, the intersection between the projection line and a ground plane. The ground plane may refer to the surface on which the lane line elements can be found. The intersection between the projection line and the ground plane may be used to characterize the dimensions and location of the 3D voxel.

In some embodiments, 3D voxels 3110 may be mapped in reverse to 2D points 2915 to obtain the lane line probability for each 3D point (e.g., the probability that the 3D point is on a lane line). In these embodiments, the HD map system may process or iterate through 3D points (e.g., from LIDAR), convert them to camera coordinates (e.g., by finding corresponding 2D mapping), and project them to the image (e.g., backward or reverse mapping). The HD map system may use deep learning techniques to determine a probability map that maps each pixel to the probability that the pixel lies on a lane line. The HD map system may use the probability map to determine the lane line probability for the 3D point corresponding to the pixel.

For each 3D voxel 3110 stored in the 3D voxel store 3125, the mapping module may compute, at 3150, a probability describing the likelihood of a 3D voxel 3110 being found on a lane element. In some embodiments, the same conventions and classification methods described in reference to the image pixel classifier 2815 may also be implemented by the mapping module 2820. In other embodiments, the mapping module may use different techniques. Because of distance distortion within camera images, as distance increases label granularity for the image may also decrease, resulting in errors for representing double lane lines. To improve accuracy, the mapping module 2820 may aggregate mappings from 2D points 2915 to 3D voxels by using the center-line probability of a 3D voxel 3110 from a second image that also contains a pixel of interest found in the first image. In some embodiments, grouping a set of identified 2D points into a cluster may include forming a group of points that are located within a threshold distance of each other, wherein the threshold distance may be greater than a lane line width and significantly less than a distance between two lane lines. For example, the HD map system may use a distance slightly bigger than a typical lane line width, such as a distance of 40 cm, but much smaller than distance between 2 lane line segments (which may be a few meters).

Grouping Lane Line Points into Lane Line Point Clusters

Figure 13A:
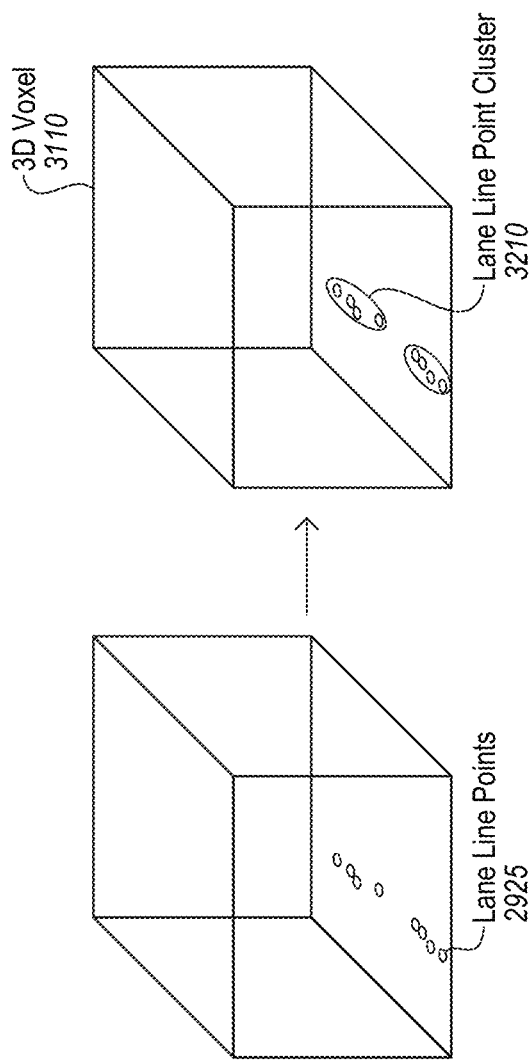
FIG. 13A illustrates an example 3D representation of two lane line point clusters.
Figure 13B:
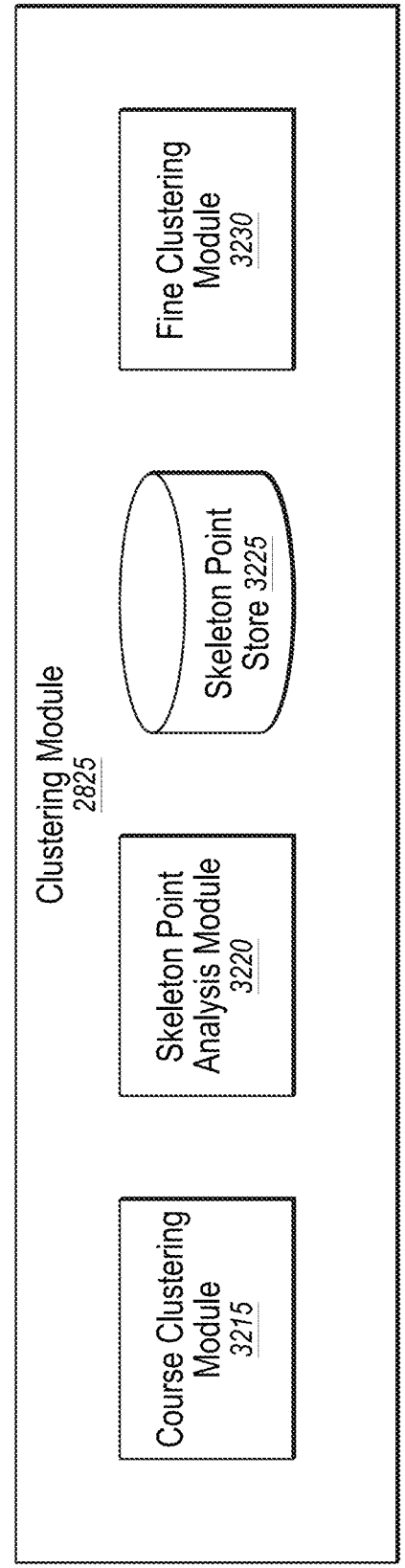
FIG. 13B illustrates an example system architecture of a clustering module.

FIG. 13A illustrates an example 3D representation of two lane line point clusters 3210 and the lane line points 2925 within them in a 3D voxel 3110. FIG. 13B illustrates an example system architecture of a clustering module 2825. The clustering module 2825 may group the neighboring lane line points 2925 within the 3D voxels 3110 together into lane line point clusters 3210 to define segments of a lane line. The clustering module 2825 may include a course clustering module 3215, a skeleton point analysis module 3220, a skeleton point store 3225, and a fine clustering module 3230. Other embodiments of the clustering module 2825 may include more or fewer modules than those presented in FIG. 13B and functionality indicated as being performed by a particular module may be implemented by other modules. The course clustering module 3215 may identify and group neighboring lane line points 2925 into clusters based on a set of established distance parameters. The skeleton point analysis module 3220 may further group lane line points 2925 in a cluster into smaller sub-clusters encompassing the entirety of the cluster and determines a center point for each sub-cluster. The center point within each sub-cluster may also referred to as a skeleton point and may be stored by the skeleton point store 3225. Using the identified skeleton points stored within the skeleton point store 3225, the fine clustering module 3230 may distinguish between the intersecting lane lines 2935 moving in different directions.

Figure 13C:
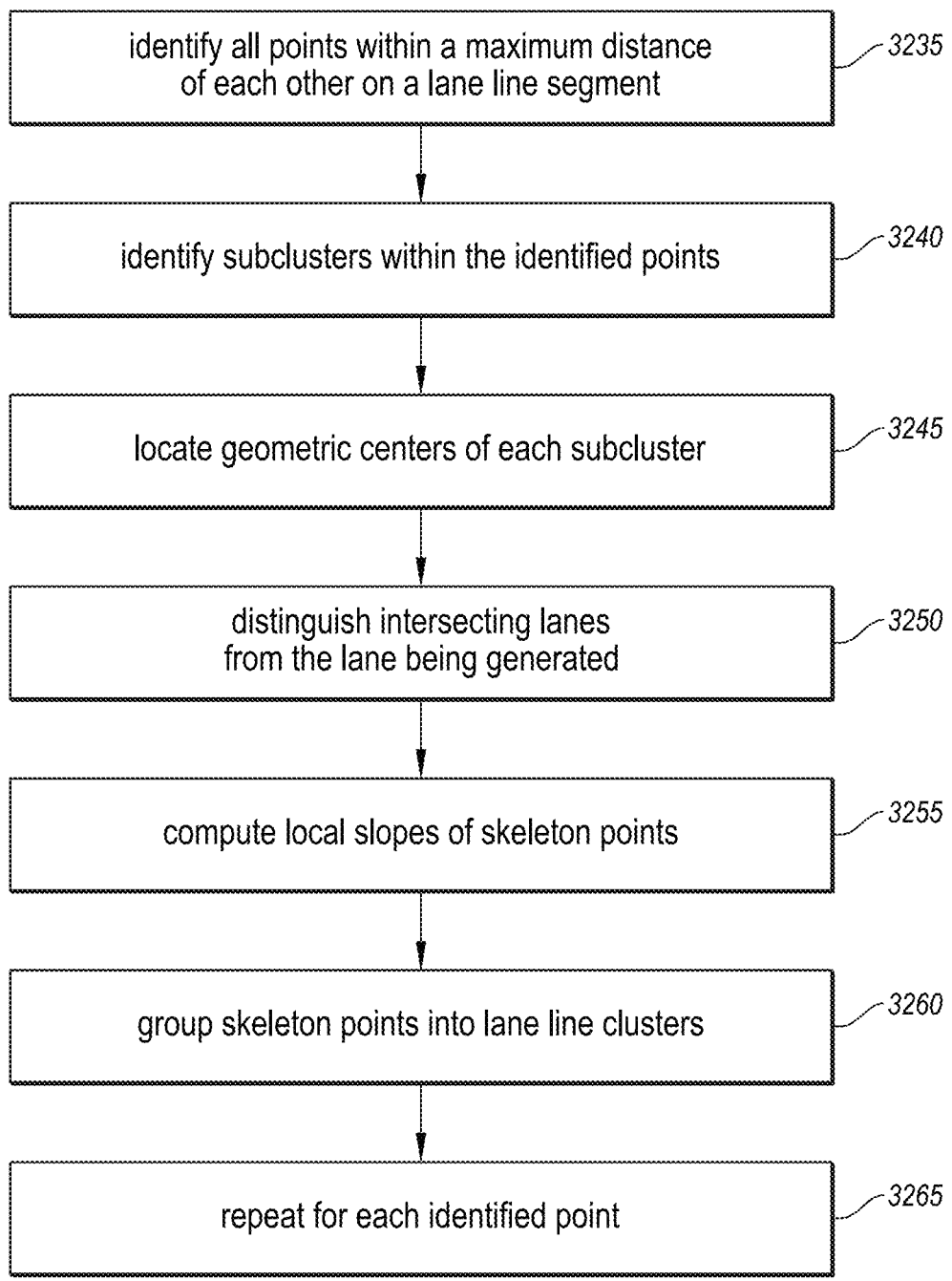
FIG. 13C illustrates a flow chart of an example process for grouping 2D lane line points into clusters.

FIG. 13C illustrates a flow chart of an example process for grouping 2D lane line points into clusters. The process of FIG. 13C may be performed by any suitable system, apparatus, or device. For example, one or more elements of the HD map system 100 of FIG. 1 may be configured to perform one or more of the operations of the process of FIG. 13C. Additionally or alternatively, the computer system 4300 of FIG. 31 may be configured to perform one or more of the operations associated with the process of FIG. 13C. Although illustrated with discrete blocks, the actions and operations associated with one or more of the blocks of the process of FIG. 13C may be divided into additional blocks, combined into fewer blocks, or eliminated, depending on the particular implementation.

As disclosed in FIG. 13C, the course clustering module 3215 may identify, at 3235, all lane line points 2925 neighboring each other. In some embodiments, neighboring points may be within a maximum distance of each other. For example, five lane line points 2925 may be arranged in a line in increasing order. For example, when grouping neighboring points into clusters, a lane line point cluster 3210 originating at the first point may include the second, third, and fourth point, but not the fifth point because it is a distance from the first point greater than a threshold distance. Alternatively, a lane line point cluster 3210 originating from the second point, may include the first, third, fourth, and fifth point because for each point the separating distance is below a threshold distance.

Figure 13D:
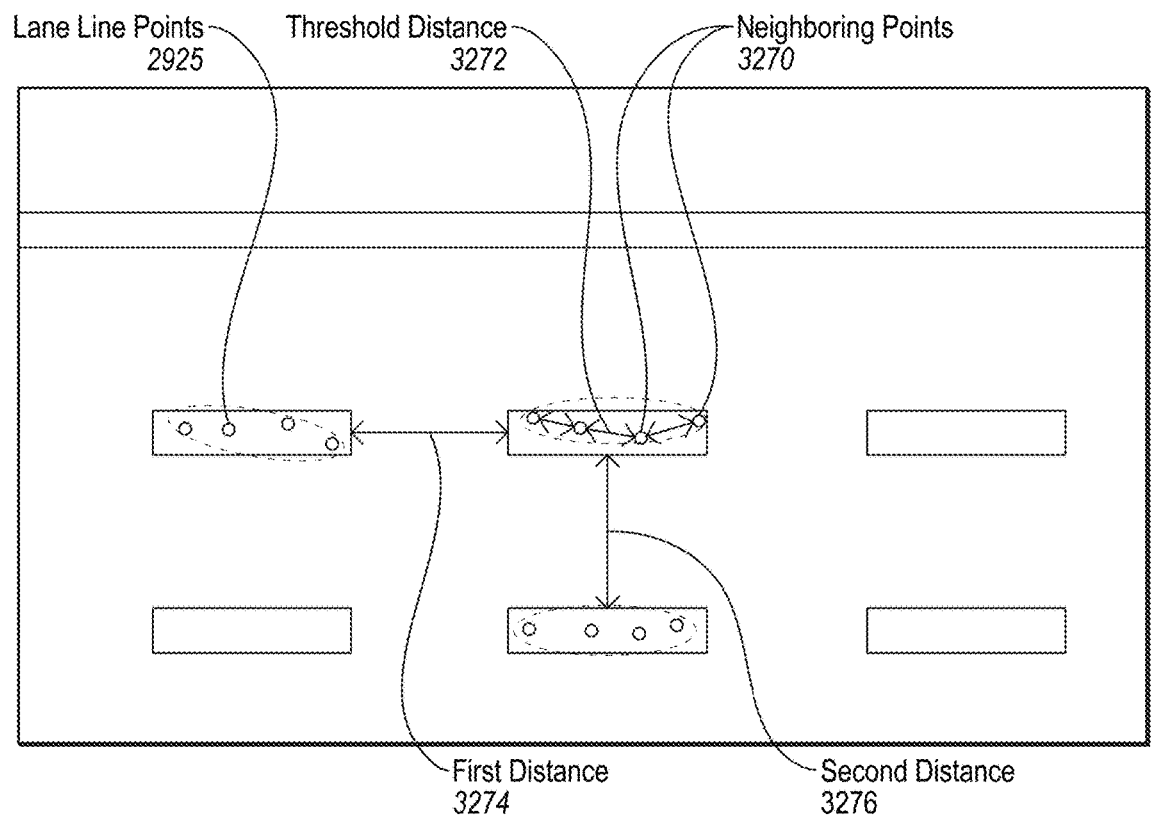
FIGS. 13D-13F illustrate different aspects of the example process for grouping two dimensional points into clusters of FIG. 13C.
Figure 13E:
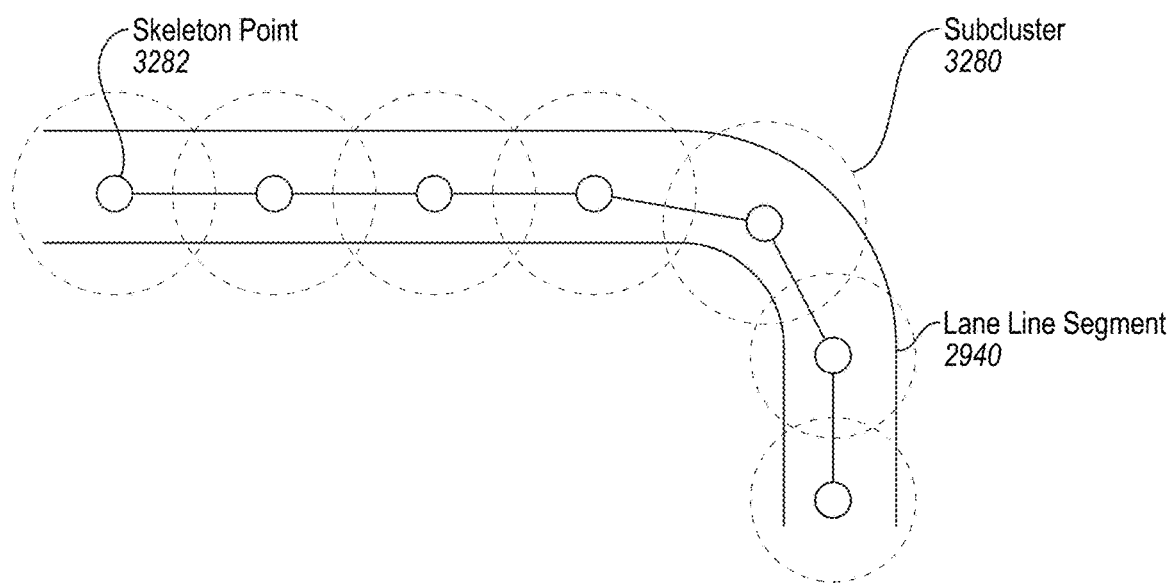
Figure 13F:
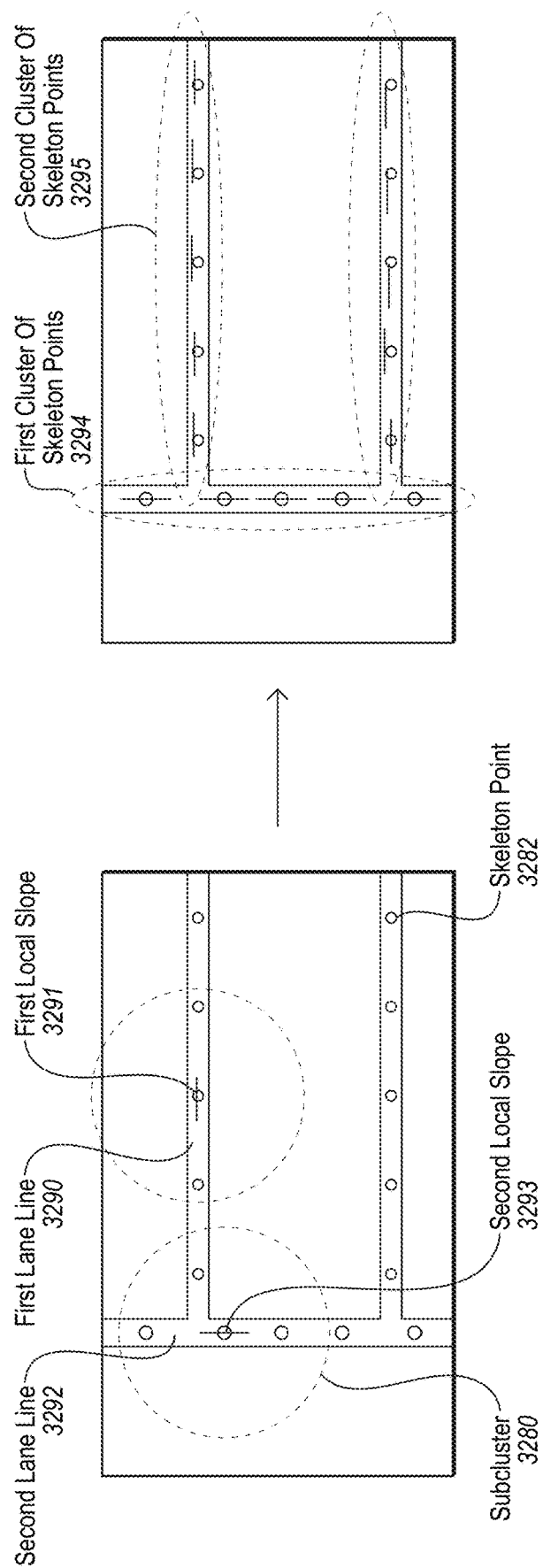

FIGS. 13D-13F illustrate different aspects of the example process for grouping two dimensional points into clusters of FIG. 13C. For example, FIG. 13D discloses a scenario of grouping lane line points 2925 into lane line point clusters 3210. Neighboring points 3270 may be defined as points with a threshold distance 3272 of each other. In some embodiments, the threshold distance may be defined as a distance that is: 1) smaller than a first distance 3274 between the lane line segment containing the lane line points 2925 and a following or preceding lane line segment within the same lane line and 2) smaller than a second distance 3276 between the lane line containing the lane line points 2925 and a second lane line running parallel or intersecting with the first lane line. In some embodiments, the threshold distance 3272 may be defined as numerical maximum distance between two lane line points in a lane line (e.g., 5 cm). For example, the clustering process described above may be performed using an algorithm that receives an input point and outputs all points within a distance of the input point. More specifically, the input point may be picked at random and may be used to locate a first neighboring point 3270 with the most optimal combination of additional neighboring points. The first neighboring point 3270 may then be used as an updated input point. From the updated input point, all neighboring points may be identified.

Returning now to FIG. 13C, the skeleton point analysis module 3220 may identify, at 3240, subclusters from the identified neighboring points. For example, as lane line points 2925 are grouped into subclusters, they may be removed from the general cluster. The process described above may be repeated until all lane line points 2925 within a lane line point cluster 3210 have been included in a subcluster. Within each subcluster, the skeleton point analysis module 3220 may locate, at 3245, a geometric center, or a skeleton point. In some embodiments, skeleton points may be determined based on the weighted center-line probabilities of each lane line point 2925 within the subcluster and may be stored within the skeleton point store 3225. FIG. 13E discloses a visual representation of a lane line segment 2940 divided into several subclusters 3280 and their respective skeleton points 3282. In some embodiments, subclusters 3280 may be have a circular shape while in others they may have an elliptical shape or a polygon shape.

Returning now to FIG. 13C, within each subcluster 3280, the fine clustering module 3230 may distinguish, at 3250, intersecting lane lines from the lane line in the process of being created. For each skeleton point 3282 within a lane line point cluster 3210, the fine clustering module 3230 may compute, at 3250, a local slope using the lane line points 2925 within each subcluster 3280. The fine clustering module 3230 may group, at 3260, skeleton points sharing local slopes within a range of each other and within a maximum distance apart together by the fine clustering to indicate that they are within the same lane line. FIG. 13F discloses a visual representation of a first lane line 3290 with a first local slope 3291 intersecting a second lane line 3292 with a second local slope 3293. Because their respective local slopes are outside a range of acceptable similarity, the first lane line 3290 and second lane line 3292 may be identified as independent of each other and may be grouped into a first cluster of skeleton points 3294 and a second cluster of skeleton points 3295. In some embodiments, the range of acceptable similarity may be defined generally by the user whereas in other embodiments the range may be defined specific to the set of lane line points under consideration. The above process may be repeated, at 3265, for each skeleton point 3282 in a lane line segment 2940.

Locating Centers on Lane Line Point Clusters

Figure 14A:
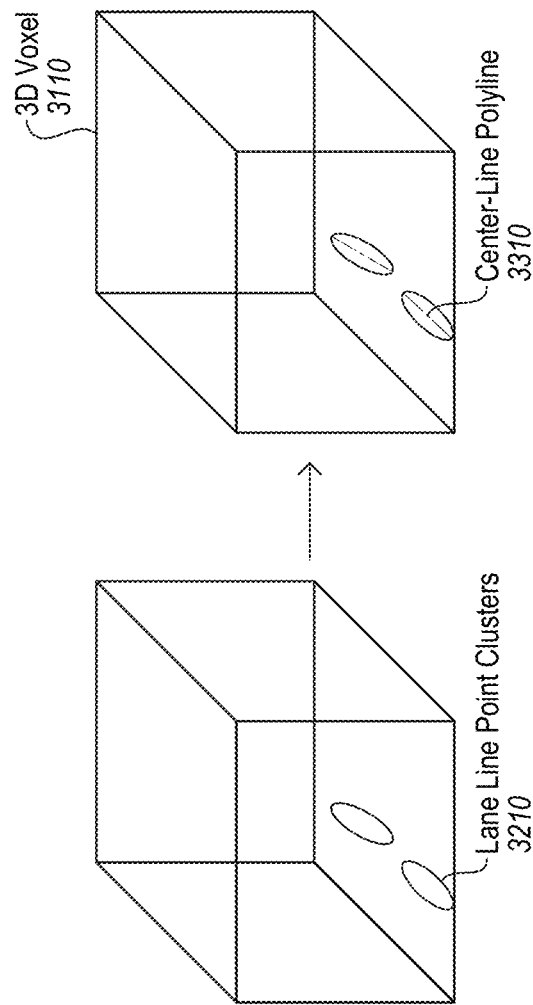
FIG. 14A illustrates an example 3D representation of two center-line polylines within two lane line clusters.
Figure 14B:
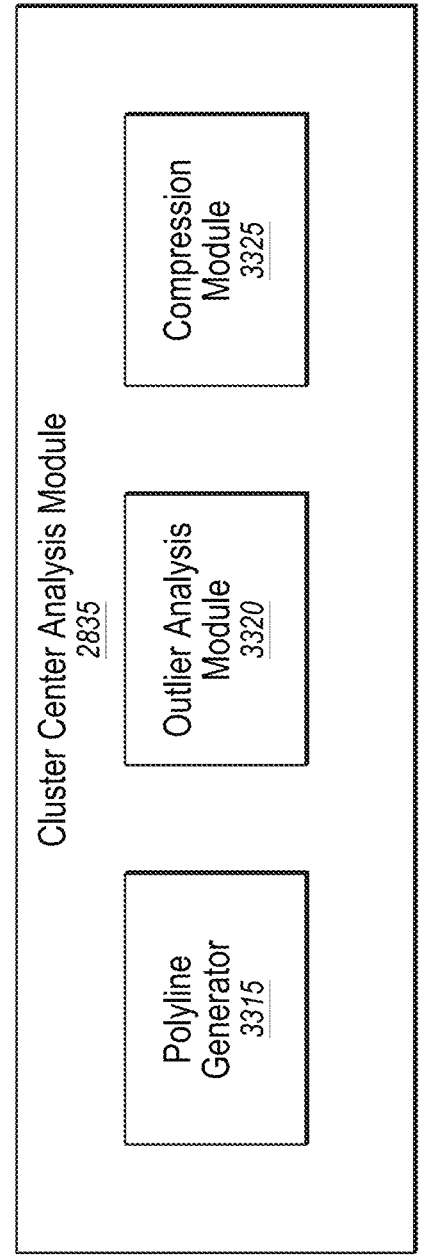
FIG. 14B illustrates an example system architecture of a cluster center analysis module.

FIG. 14A illustrates an example 3D representation of two center-line polylines 3310 within two lane line clusters. More particularly, FIG. 14A discloses a representation of a center-line polyline 3310 through a lane line point cluster 3210 in a 3D voxel 3110. FIG. 14B illustrates an example system architecture of a cluster center analysis module 2835. The cluster center analysis module 2835 may locate center lines for each lane line segment 2940 by connecting skeleton points 3282 within each segment. The cluster center analysis module 2835 may include a polyline generator 3315, an outlier analysis module 3320, and a compression module 3325. Other embodiments of the cluster center analysis module 2835 may include more or fewer modules than those presented in FIG. 14B and functionality indicated as being performed by a particular module may be implemented by other modules. The polyline generator 3315 may organize skeleton points 3282 within a lane line segment 2940 and may create a polyline through the ordered points. The outlier analysis module 3320 may identify and analyze outliers to determine if they represent a change in the direction of the lane line segment or merely a deviation from the polyline in the same direction. The compression module 3325 may identify and remove redundant skeleton points 3282 to condense the polyline to the fewest number of points while still conveying the correct shape of the lane line segment.

Figure 14C:
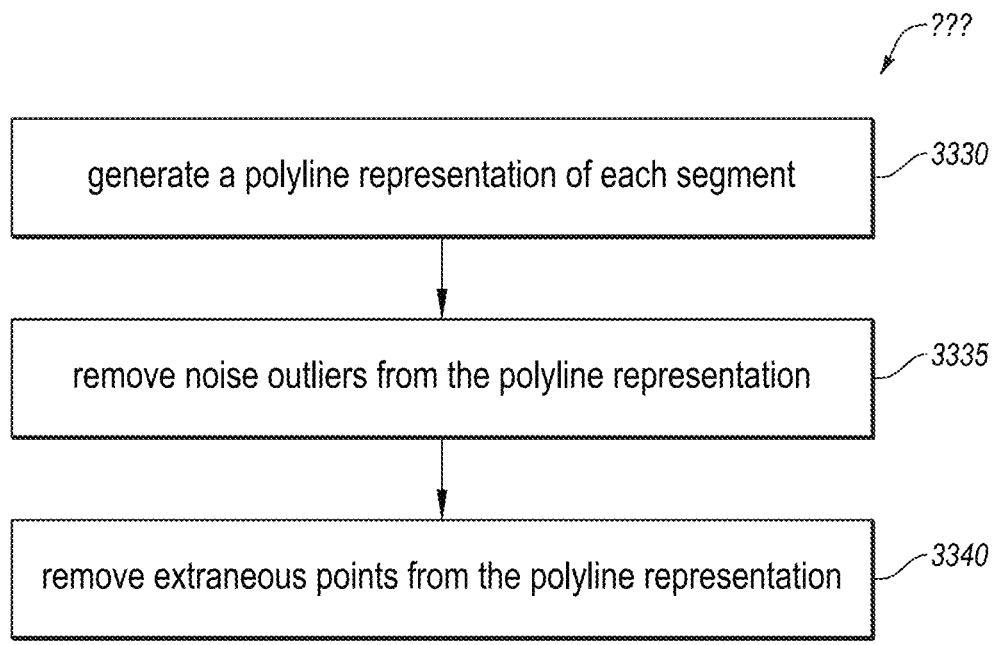
FIG. 14C illustrates a flow chart describing an example process for locating the center line of a lane line segment.
Figure 14D:
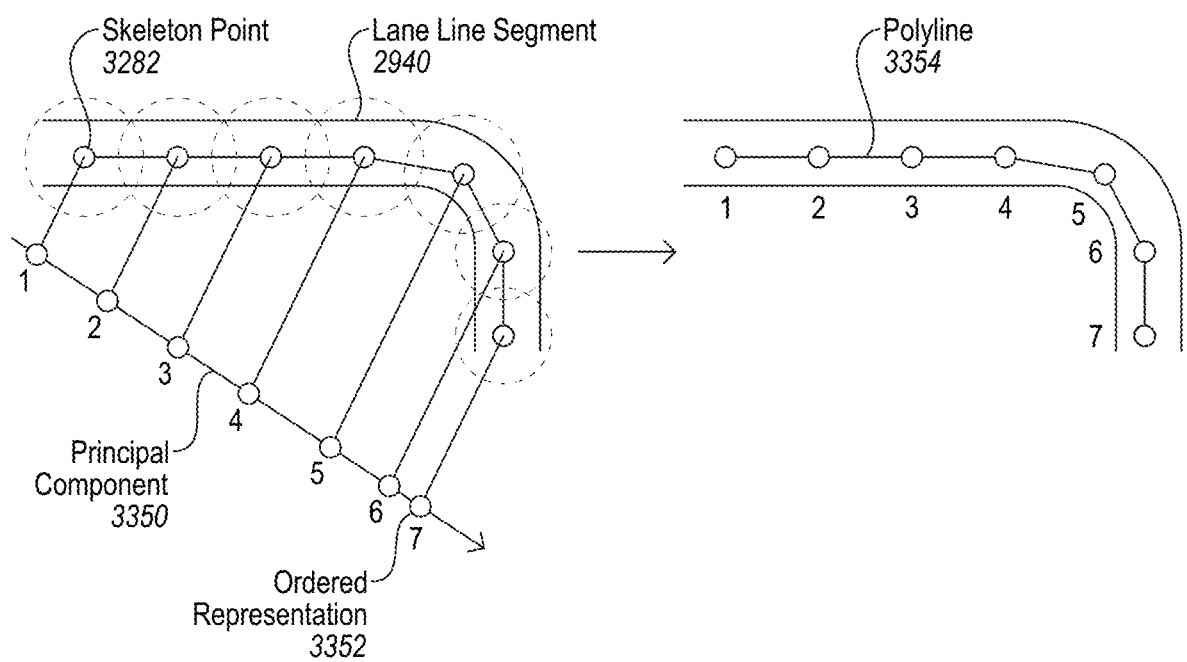
FIG. 14D-14H illustrate different aspects of the example process for locating the center line of a lane line segment of FIG. 14C.

FIG. 14C illustrates a flow chart describing an example process for locating the center line of a lane line segment 2940. FIG. 14D-14H illustrate different aspects of the example process for locating the center line of a lane line segment of FIG. 14C. The process of FIG. 14C may be performed by any suitable system, apparatus, or device. For example, one or more elements of the HD map system 100 of FIG. 1 may be configured to perform one or more of the operations of the process of FIG. 14C. Additionally or alternatively, the computer system 4300 of FIG. 31 may be configured to perform one or more of the operations associated with the process of FIG. 14C. Although illustrated with discrete blocks, the actions and operations associated with one or more of the blocks of the process of FIG. 14C may be divided into additional blocks, combined into fewer blocks, or eliminated, depending on the particular implementation.

As disclosed in FIG. 14C, the polyline generator 3315 may generate, at 3330, a polyline representation of each lane line segment. When generating the polyline, the polyline generator 3315 may consider the geometry of the lane line segment. In some embodiments, the lane line segments may be long and winding and the polyline may be generated based on skeleton points 3282 within the lane line segment. Under the assumption that the lane line being considered is relatively straight and does not follow a circular path, the polyline generator 3315 may reorganize the skeleton points into a consecutive order using a principal component of the points, as disclosed in FIG. 14D. A principal component 3350 on which the skeleton points 3282 are projected may be determined and the skeleton points 3282 may be ordered through the projection. The ordering of the projection 3352 may be mapped to the initial position of the lane line points on the lane line segment to determine the ordered position of the lane line points on the lane line segment. The polyline 3354 may be generated by consecutively connecting the skeleton points 3282.

Figure 14E:
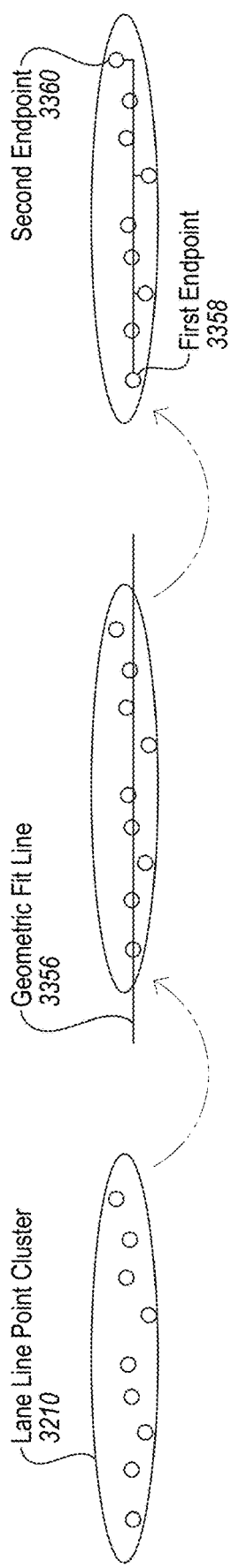

In some embodiments, the lane line segment may be short and straight and may use a technique for fitting a geometric line through the lane line points 2925 in a lane line point cluster 3210, as disclosed in FIG. 14E. Once the geometric fit line 3356 has been determined for a lane line point cluster 3210, the geometric fit line 3356 may be shortened to run between a first endpoint 3358 and a second endpoint 3360 of the cluster. In some embodiments, there are not two clearly defined endpoints and instead two points with the greatest distance between them may be used to contain the geometric fit line 3356.

Figure 14F:
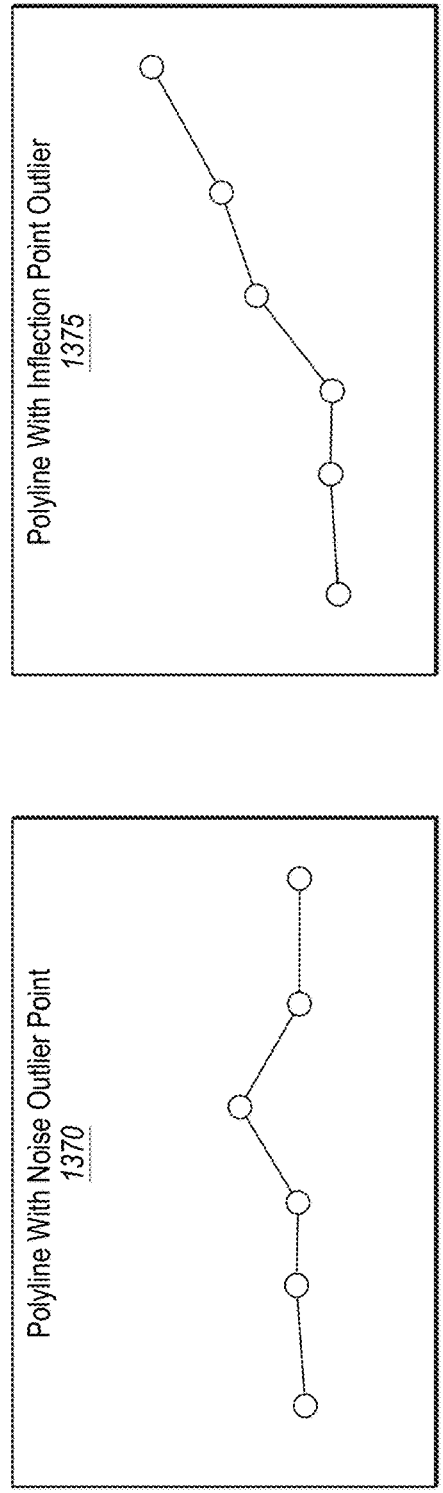
Figure 14G:
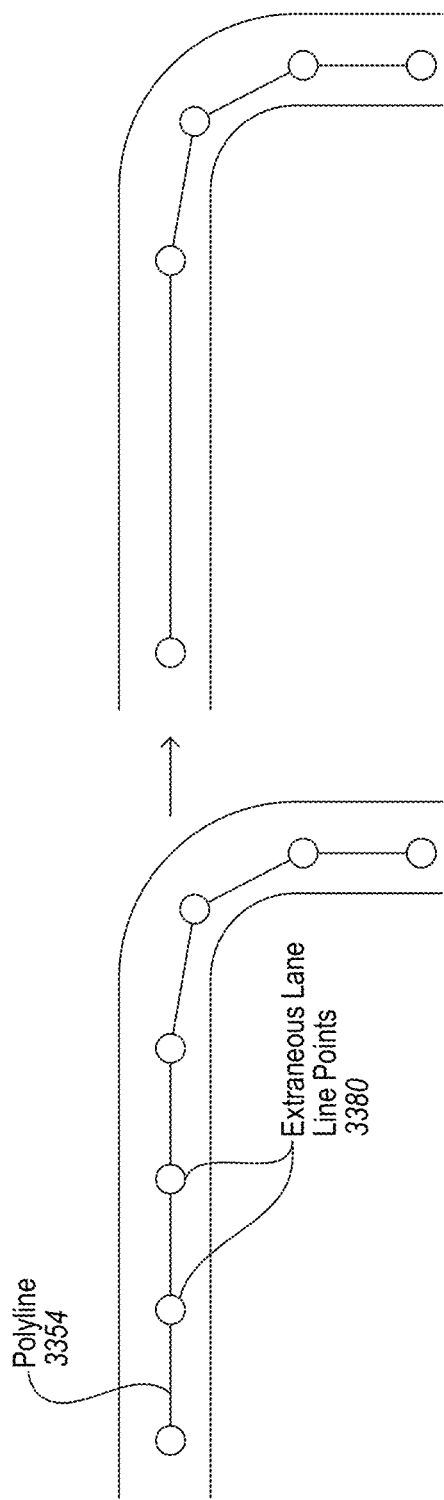

Returning now to FIG. 14C, in some embodiments, the generated polyline 3354 may be non-linear due to an off-set between one or more points and the majority of remaining points on which the polyline 3354 is based. In these embodiments, off-set points, or outliers, may be analyzed to determine whether they are noise points that do not affect the direction of the polyline 3354 or inflection points that indicate a change in the direction of the polyline 3354. Points identified as inflection points may indicate that the polyline 3354 is changing direction or deviating from a current direction by a significant amount. Conditions qualifying as a significant amount of change may be set manually or based on consideration of the specific lane line points 2925 in the lane line segment 2940. FIG. 14F discloses one example polyline with a noise outlier point 1370 and another example polyline with an inflection point outlier 1375.

Once one or more noise outlier points 1370 have been identified, the outlier analysis module 3320 may remove, at 3335, the noise outlier points 1370 from the polyline 3354 (e.g., by performing denoise operation on the polyline). Low pass filtering of the polyline coordinates may be used to remove noise outlier points 1370. In some embodiments, beginning at a first point a fit line may be generated by iterating through neighboring points within a lane line points 2925 from one end of a segment to another. For example, the fit line may include the first point, five points ahead of the first point, and five points behind the first point for an eleven-point fit line. In some embodiments, the system may assume that the current point is p*, the previous denoised point is p', and the next point in polyline is p". The system may check if the first angle between p*p'–L (theta0) or the second angle p*p"–L (theta1) is greater than a threshold value, for example, max_theta_degrees (e.g., a typical value may be 15 degrees). If so, the system may mark the current point as noise and discard it, otherwise the system may mark the current point as a good point and add the current point to the denoised polyline 3354. Once all necessary noise outliers have been analyzed and removed from the polyline, the polyline of remaining lane line points may be referred to as a de-noised polyline.

Figure 14H:
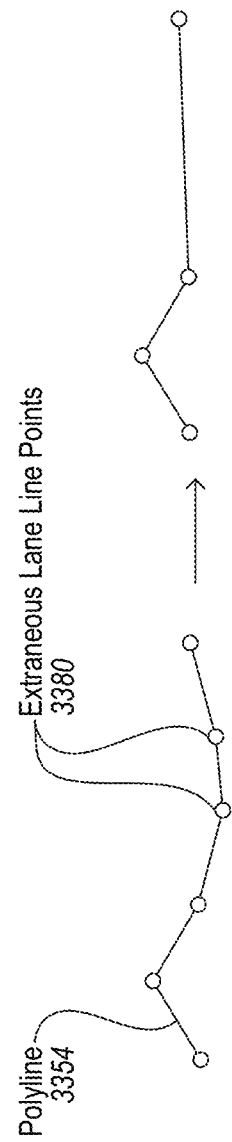

In order to reduce the memory required to store lane line segments, the compression module 3325 may remove, at 3340, extraneous lane line points from the polyline 3354. In some embodiment, extraneous lane line points may fall on the polyline 3354 in parallel with a preceding point, as disclosed in FIG. 14G with multiple removed extraneous lane line points 3380 with no deviation from the direction of the preceding lane line points. FIG. 14H discloses an embodiment in which extraneous lane line points 3380 deviate less than a minimum threshold distance from the polyline 3354. The threshold parameters may be determined manually or based on the characteristics of the polyline 3354. In this embodiment, extraneous lane line points 3380 may be analyzed to confirm that they are not inflection points. For example, all lane line points 2925 on the polyline between the endpoints may be analyzed to identify any points greater than a threshold distance from the polyline. If no lane line points are identified, all points between the endpoints may be removed from the polyline leaving only the endpoints. Alternatively, if a lane line point 2925 is identified with a distance from the polyline 3354 above a threshold distance, the polyline 3354 may be shortened by adjusting one endpoint closer to the identified lane line point. Adjusting the endpoints of the polyline 3354 may be performed by identifying a first midpoint of the entire polyline and identifying any lane line points 2925 between the first midpoint and the first endpoint of the polyline that are a distance greater than the threshold distance from the polyline. If no lane line point is identified, the first midpoint may be set as a new endpoint and the above process may be performed for a second midpoint that lies between the first midpoint and the second endpoint. If a lane line point 2925 is identified, each lane line point 2925 between the first midpoint and the first endpoint may be analyzed. Once any lane line point 2925 has been identified, it may be set as a new endpoint for the polyline 3354. The processes described above may be performed iteratively until the polyline endpoint and the identified lane line point 2925 overlap at the same point.

Connecting Lane Line Segments into Lane Lines

Figure 15A:
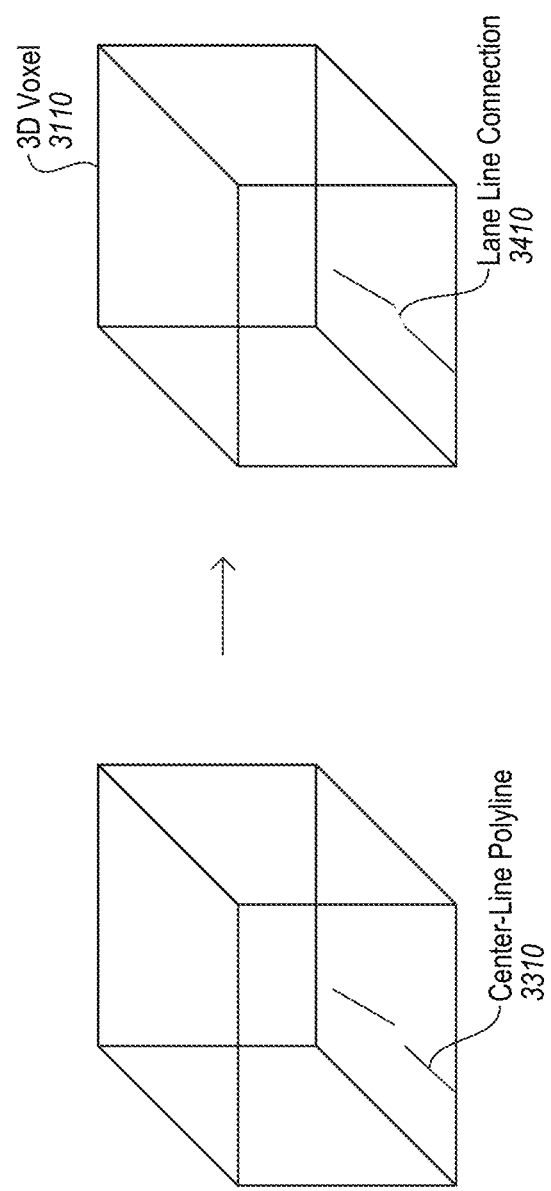
FIG. 15A illustrates an example 3D representation of a complete lane line created by connecting center-line polylines in a 3D voxel.
Figure 15B:
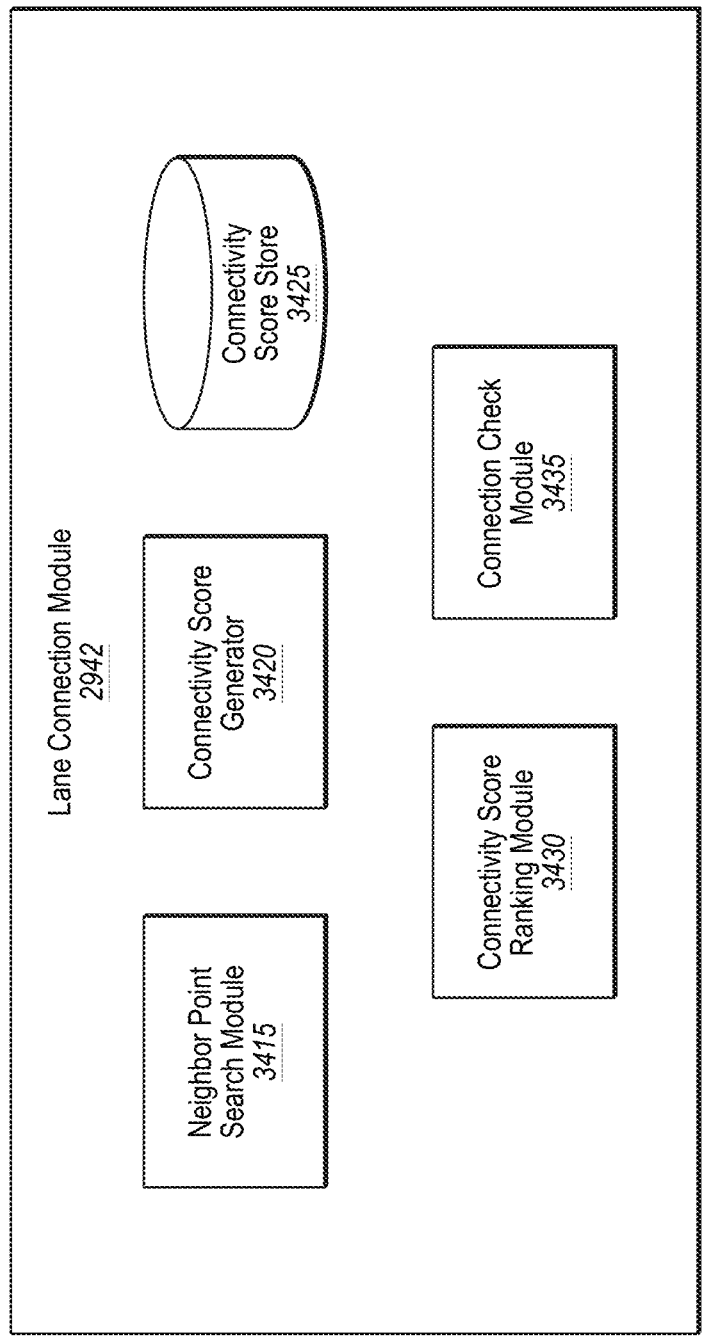
FIG. 15B illustrates an example system architecture of a lane connection module.

FIG. 15A illustrates an example 3D representation of a complete lane line 2935 created by connecting center-line polylines 3310 in a 3D voxel 3110. FIG. 15B illustrates an example system architecture of a lane connection module 2942. The lane connection module 2942 may connect individual lane line segments into a complete representation of a lane line using the center-line polylines 3310 generated by the cluster center analysis module 2835. The lane connection module 2942 may include a neighbor point search module 3415, a connectivity score generator 3420, a connectivity score store 3425, a connectivity score ranking module 3430, and a connection check module 3435. Other embodiments of the lane connection module 2942 may include more or fewer modules than those presented in FIG. 15B and functionality indicated as being performed by a particular module may be implemented by other modules. The neighbor point search module 3415 may identify neighboring endpoints of additional lane line segments that are eligible to be connected with the lane line of interest. The connectivity score generator 3420 may determine a connectivity score between each neighboring endpoint and the endpoint of the lane line of interest and the connectivity score store 3425 may store the score. The connectivity score ranking module 3430 may organize all possible connections based on their connectivity scores and the connection check module 3435 may confirm that each connection does not overlap with any other lane line segments.

Figure 15C:
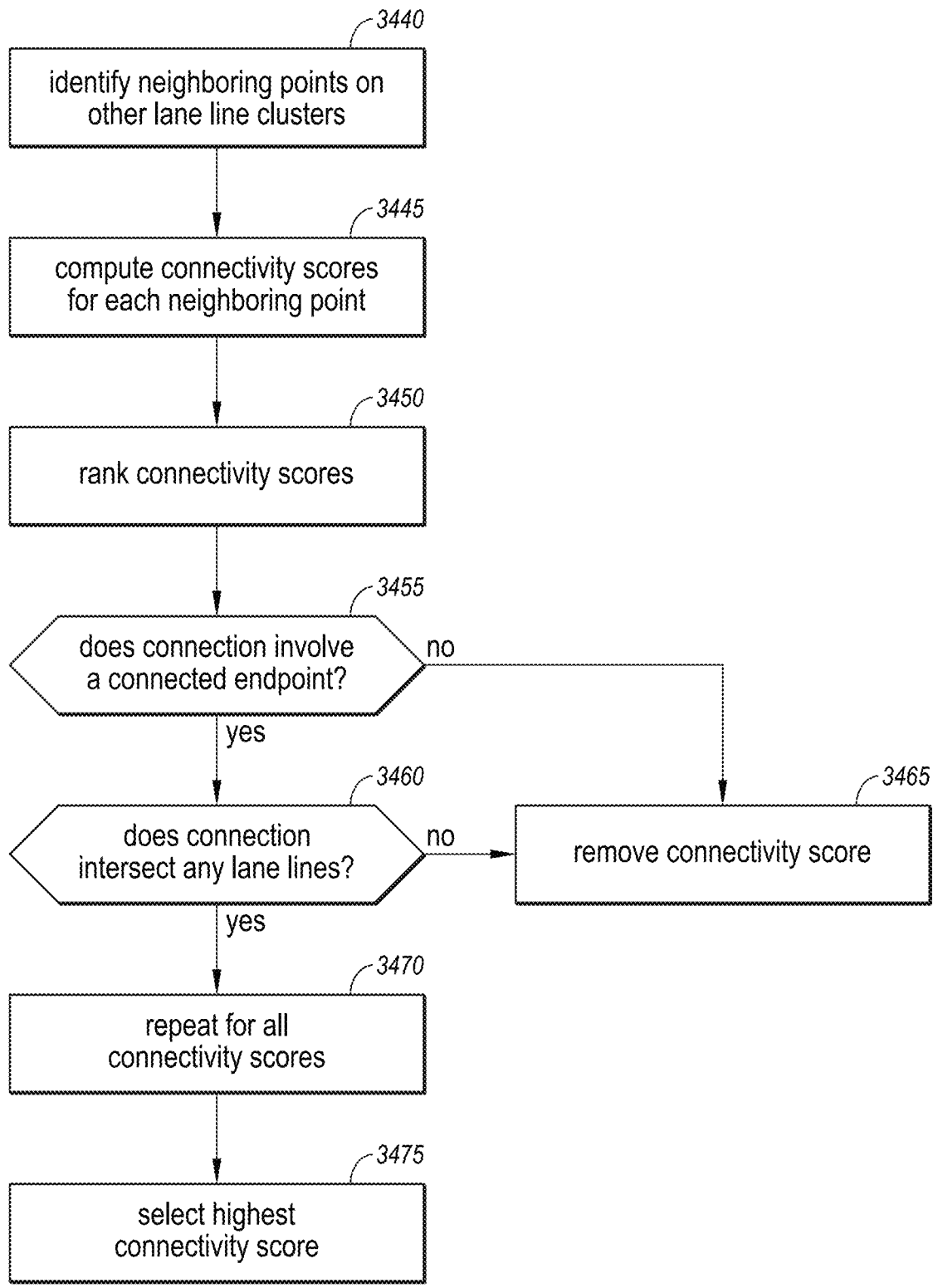
FIG. 15C illustrates a flow chart of an example process for connecting one or more lane line segments.

FIG. 15C illustrates a flow chart of an example process for connecting one or more lane line segments. The process of FIG. 15C may be performed by any suitable system, apparatus, or device. For example, one or more elements of the HD map system 100 of FIG. 1 may be configured to perform one or more of the operations of the process of FIG. 15C. Additionally or alternatively, the computer system 4300 of FIG. 31 may be configured to perform one or more of the operations associated with the process of FIG. 15C. Although illustrated with discrete blocks, the actions and operations associated with one or more of the blocks of the process of FIG. 15C may be divided into additional blocks, combined into fewer blocks, or eliminated, depending on the particular implementation.

As disclosed in FIG. 15C, the neighbor point search module 3415 may identify, at 3440, neighboring points within other lane line segments 2940 less than a maximum distance away from the endpoints of the lane line segment 2940 of interest. For each neighboring point identified, the connectivity score generator 3420 may compute, at 3445, a connectivity score between the identified neighboring points and the closest endpoint of the lane line segment 2940 being analyzed. The connectivity score may consider: 1) the distance between two lane line segments and 2) the change in direction between the two segments. For example, connectivity scores may improve as the distance between the two-lane line segments decreases and the direction of change between two the segments is small. Some embodiments may only consider one of these factors at a time. The connectivity score ranking module 3430 may rank, at 3450, the connectivity scores in a descending order such that the neighboring point with the highest score is at the top of the list. In some embodiments, the connectivity score ranking module 3430 may rank the connectivity scores in ascending order. The connection check module 3435 may check, at 3455, whether the connection involves an endpoint that has already been connected with a different lane line segment. If the check indicates that the endpoint has already been connected to a different lane line segment, the connection check module 3435 may remove, at 3465, the connection from the ranked list. For example, checking endpoints for involvement in an existing connection may include analyzing connections with a distance below the length of the lane line segment 2940. The system may check endpoints whose distances to one end of the connection are smaller than a threshold D. The threshold D may be the maximum distance that the system considers. For the remaining connections on the ranked list, the connection check module 3435 may check, at 3460, whether the connection, if made, would intersect any existing lane lines. If the check indicates that the connection would overlap with an existing lane line segment, the connection check module 3435 may remove, at 3465, the connection from the ranked list. For example, to check for intersections of existing lane lines, the connection check module 3435 may check for any overlap or intersections with the bounding boxes of the lane line segment 2940. In some embodiments, the order of the first check and the second check may be reversed. The connection check module 3435 may repeat, at 3470, the process described above for each connection of the ranked list until a connection is found that satisfies both check protocols. The lane connection module 2942 may select, at 3475, the remaining connection with the highest connectivity score and draw a connection between those two-lane line segments. In embodiments in which connections are ranked in descending order, the highest connection score may be the first connection score to satisfy both check protocols and to not be removed from the ranked list. For certain connection pairs that the system is trying to connect (for example, L), and when the system tries to determine if there are existing connection pairs that would intersect with the L, out of all existing connection pairs, the system may find those pairs whose one endpoints lie within distance D to one end of L.

Additional Embodiments

In some embodiments, the HD map system may create an occupancy map (OMap) by merging LIDAR scans from multiple track samples and multiple data collection runs. Since track samples have been aligned, individual point clouds may be transformed to the common coordinate of the OMap, merged and voxalized into small cubes (e.g., 5×5×5 cm cubes), where each cube indicates that the space within is occupied. Since a LIDAR sensor may provide intensity for each point, the HD map system may populate the intensity values to the OMap voxels (e.g., by taking the mean or median intensity from all points falling inside the cube). Further, since LIDAR sensors and camera sensors may have been calibrated, the HD map system may project LIDAR points to nearby camera images to assign color to each point. Similarly, the HD map system may populate the color information to the OMap voxels.

In some embodiments, a voxel may not have any color information if all the points within it are not visible from a camera view. In this situation, the HD map system may assign a default color (e.g., blue), and may mark it so that it is distinguished from road features. Given a set of OMap voxels, each of which having an intensity value and most with color information, the HD map system may apply a bottom-up projection to the set of voxels to create a set of 2D images. Given each column of voxels in the vertical direction, the system may take the lowest voxel and convert its intensity and color information to a pixel in the output image. Accordingly, the HD map system may create two images, one gray-scale image storing the intensity value, and an RGB image storing the color information. One benefit of doing a bottom-up projection (e.g., picking the lowest voxel in each column) instead of a top-down projection (e.g., picking the highest voxel in each column) may be that the system may be able to get rid of objects on top of the road (e.g., cars, tree crowns, and light poles).

Accordingly, after projection, the HD map system may obtain two images for each OMap area, one for intensity and the other for RGB. The HD map system may further divide each image into pixel tiles (e.g., 1024×1024 pixel tiles) to ensure that file size is manageable. The HD map system may apply machine learning techniques (e.g., deep learning) to these images to extract road features (e.g., lane lines). In some embodiments, the HD map system may merge the gray-scale image and the RGB image into a single 4-channel matrix to learn the model since deep learning may be able to process the input data independent of the number of channels in the input data. Compared to using camera images, using OMap images may give one more channel of information beyond RGB (e.g., intensity). This may significantly improve the results since one major source of confusion to machine learned models may be shadow on the road, which may have significantly different color compared to its surroundings and may be confused with road features such as lane lines. LIDAR intensity, on the other hand, may be insensitive to shadows. Thus the gray-scale intensity image may show uniform values across a shadow boundary. LIDAR intensity may still be sensitive to road features, most of which may be painted on and produce higher reflectivity than ground.

After the deep learning step, each image pixel may be labeled as either "lane line" or "not lane line." In some embodiments, the HD map system may use machine learning based models that further categorize lane lines into different types, and consider other road features. The HD map system may propagate these labels back to OMap voxels, for example, to the lowest voxel in each column. At this point the data may be in the same format as the camera-based method, and the system may apply the same post processing as described herein including clustering, skeleton extraction, line fitting and cleanup, etc. to create lane line features.

Lane Element Graph

In some embodiments, the HD map system 100 may generate a lane element graph that represents a network of lanes to allow a vehicle to plan a legal path between a source and a destination. A lane element graph may allow navigation of autonomous vehicles through a mapped area. Each lane element may be associated with the traffic restrictions that apply to it such as speed limit, speed bump, and traffic signs and signals. A lane element graph may represent the navigable road surface that is divided into lane elements, and may include connectivity among lane elements (e.g., where vehicles can go from a current lane element) as well as semantic association between lane elements and features (e.g., a speed limit in a current lane element) to assist in on-vehicle routing and planning needs. The lane elements may be topologically connected, and each lane element may be known to its successors, predecessors, and left and right neighbors.

Lane elements may be stored as pieces of a lane element graph. Within the lane element graph, individual lane elements may be represented as nodes on the graph connected by edges to other nodes, representing neighboring lane elements of the graph. The edges connecting two lane elements may indicate a physical connection between two lane elements that a vehicle can legally traverse. For example, an edge between two lane elements may represent a dashed white line over which vehicles can change lanes, but may not represent a median over which vehicles not legally cross. In some embodiments, boundaries between lane lines over which cars cannot cross may have a representation distinct from the above edges of the lane element graph. Additionally, within geographical regions, lane elements may transition from a current lane element to a subsequent lane element. Similarly, crossing the boundary of two geographical regions and transitioning from the current geographical region to an adjacent one, the lane element of the current geographical region may also transition to the connecting lane element with the adjacent geographical region.

Figure 16:
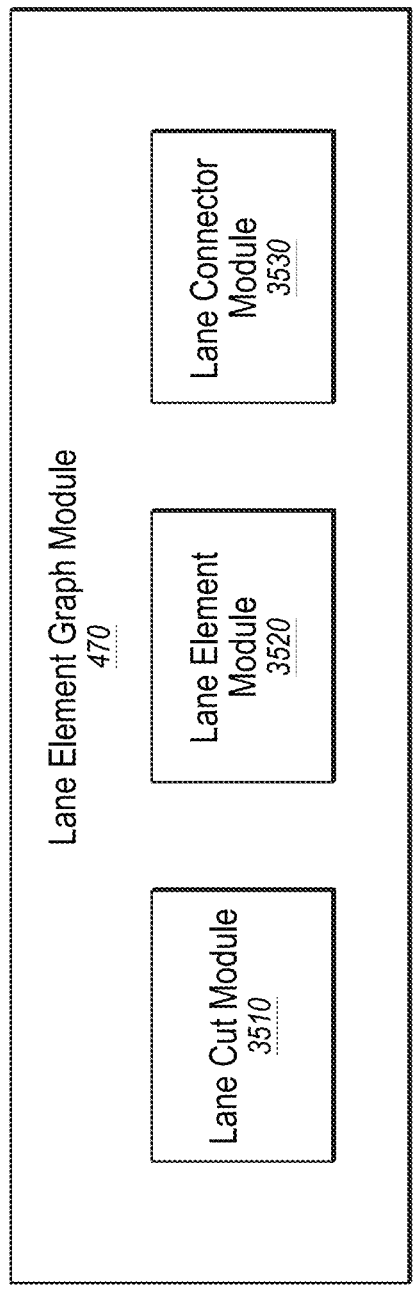
FIG. 16 illustrates an example system architecture of an example lane element graph module.

FIG. 16 illustrates an example system architecture of an example lane element graph module 470. The lane element graph module 470 may generate a lane element graph. The lane element graph module 470 may include a lane cut module 3510, a lane element module 3520, and a lane connector module 3530. Alternative embodiments may include different or additional modules or omit one or more of the illustrated modules.

The lane cut module 3510 may generate lane cuts by analyzing lane lines and navigable boundaries. A lane line may represent a boundary of a lane (e.g., explicitly marked by white and yellow stripes, or implicit paths). A lane line may be represented by a head control point, a tail control point, and a line segment. A control point may include a latitude, a longitude, and an altitude. A navigable boundary may represent a boundary of navigable road surface and may be a boundary which vehicles should not cross or go beyond (e.g., a curb edge, a median edge, a traffic island edge, etc.). A lane cut may be generated where there is a topological change in the road network (e.g., an intersection, a split or a merge of lanes) or where there is a semantic change in the lane (e.g., a change in speed limit). A lane cut may go through the width of the road, cutting it into adjacent segments. A lane cut may end at a navigable boundary.

The lane element module 3520 may generate lane elements from lane lines, navigable boundaries, and lane cut segments. The lane lines and navigable boundaries may be generated from received image frames from an imaging system mounted on a vehicle. Lane elements, also referred to as cells or LaneEls, may have left and right edges that are defined by lane lines or navigable boundaries. Lane elements may have a bottom and a top edge defined by lane cut segments. Lane elements may have 0 or 1 left and right neighbors and 0 or more predecessor and successor neighbors. Each lane elements may be associated with features that only affect local lane elements (e.g., a stop sign, a yield sign, or a traffic light).

The lane connector module 3530 may generate lane connectors for connecting lane elements together and indicating where a vehicle can go from a current lane element. In some embodiments, human operators may draw lane connectors between the lane elements at intersections to annotate their connectivity to create successor and predecessors for the lane elements. A lane element may be generated to represent a lane connector at an intersection, and the left and right edges of the lane element may be derived from the geometry of the lane connectors and the lane elements it connects. In some embodiments, the lane connector module 3530 may generate lane connectors using tracked trajectory of a data-collecting vehicle at an intersection. The tracked trajectory may represent a known path through the intersection. The lane connector module 3530 may simplify the tracked trajectory to find a centerline for the lane connector. The lane connectors may be produced from the previously traversed routes in a data collecting trip. In some embodiments, lane connectors may be generated by using template matching. The lane connector module 3530 may generate an intersection configuration dictionary or collection of known intersection configurations in the real world. All such intersection configurations may be added to the dictionary. Each configuration may be represented as a directed graph, with node being the lane elements driving into or out of the intersection, and edges being the lane connectors. Each node may be labeled with diving restrictions. For example, a left-only lane element may be labelled with "L", a lane element where a vehicle can either make a right turn or go straight cross the intersection may be labelled with "RS." Edges may be left/right neighbors and predecessor/successor relationships. The intersection of lane elements may already have some lane connectors inferred from tracked trajectory. The remaining lane connectors may be inferred by finding a best match to one configuration in the configuration dictionary. The lane connector module 3530 may generate lane connectors for the lane elements in the intersection based on the known configuration that best matches the intersection. In some embodiments, human operators may qualify the result and may modify the lane connectors after they are automatically inferred for quality assurance.

Figure 17:
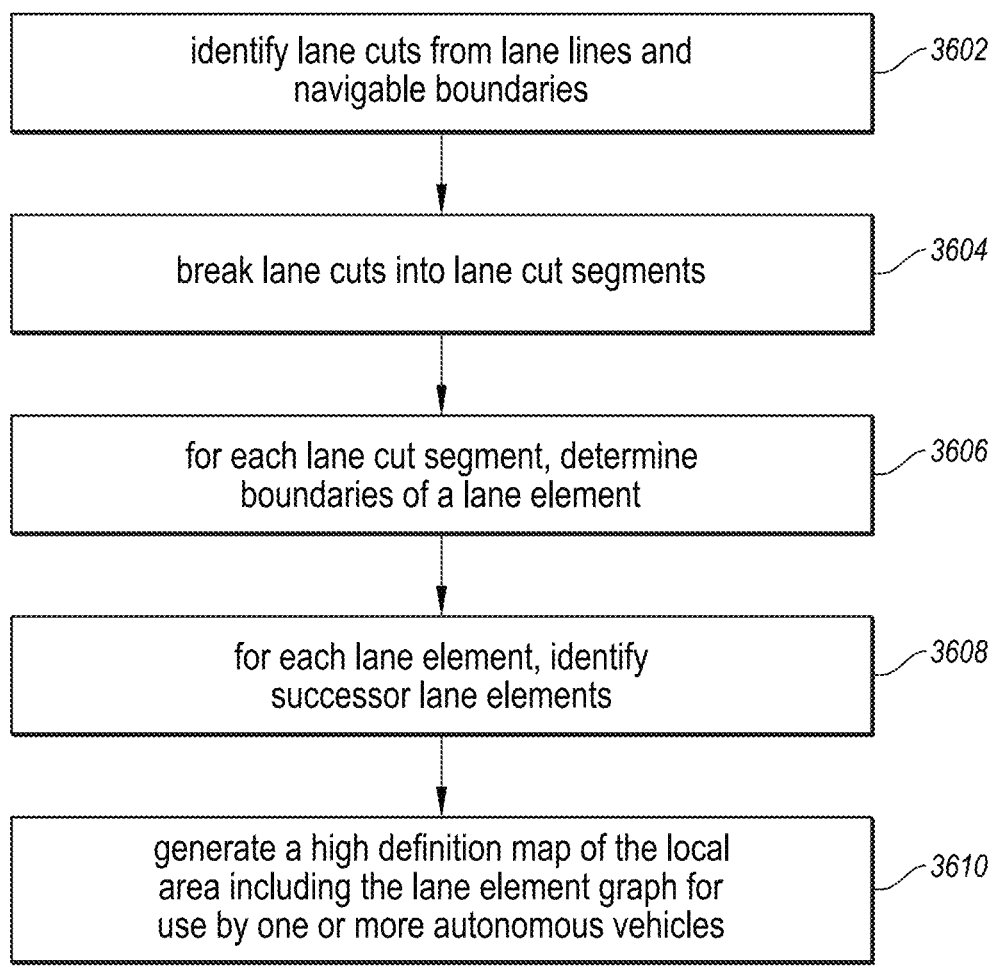
FIG. 17 illustrates a flowchart of an example process for generating a connected graph of lane elements.

FIG. 17 illustrates a flowchart of an example process for generating a connected graph of lane elements. The process of FIG. 17 may be performed by any suitable system, apparatus, or device. For example, one or more elements of the HD map system 100 of FIG. 1 may be configured to perform one or more of the operations of the process of FIG. 17. Additionally or alternatively, the computer system 4300 of FIG. 31 may be configured to perform one or more of the operations associated with the process of FIG. 17. Although illustrated with discrete blocks, the actions and operations associated with one or more of the blocks of the process of FIG. 17 may be divided into additional blocks, combined into fewer blocks, or eliminated, depending on the particular implementation.

As disclosed in FIG. 17, the lane element graph module 470 may identify, at 3602, lane cuts from lane lines and navigable boundaries. The lane cut lines and navigable boundaries may be generated from a plurality of received image frames from an imaging system mounted on a vehicle. The lane element graph module 470 may break, at 3604, lane cuts into lane cut segments across a single lane. For each lane cut segment, the lane element graph module 470 may determine, at 3606, boundaries of a lane element. The boundaries of the lane element may include the lane cut segment as a bottom edge of the lane element, a right and left edge of the lane element, and a top edge of the lane element. In some embodiments, the lane element graph module 470 (i) may identify two lane lines the lane cut segment intersects and (ii) may identify a corresponding lane cut segment that the two lane lines intersect. In some embodiments, the bottom edge or the top edge may include two lane cut segments. In the case of a road split, the lane element graph module 470 (i) may identify two lane lines the lane cut segment intersects and (ii) may identify two lane cut segments that the two lane lines intersect. The two lane cut segments may be joined form the top edge of the lane element and the two lane lines may be the right edge and the left edge of the lane element. In the case of a road merge, the lane element graph module 470 (i) may identify one lane line the lane cut segment intersects, (ii) may identify a neighboring lane cut segment where the lane cut segment does not intersect a lane line, (iii) may identify a neighboring lane line the neighboring lane cut segment intersects, and (iv) may identify a corresponding lane cut segment that the one lane line and the neighboring lane line intersect. The lane cut segment and neighboring lane cut segment may be joined to form the bottom edge of the lane element, the one lane line and the neighboring lane line may form the right and left edges of the lane element, and the corresponding lane cut segment may be the top edge of the lane element. For each lane element, the lane element graph module 470 may identify, at 3608, successor lane elements. These successor lane elements of an intersection may be identified by tracking trajectory information of a data-collecting vehicle and connecting lane elements based on the tracked trajectory information. The successor lane elements may be identified by creating a collection of directed graphs from known intersection configurations with nodes being lane elements and edges being lane connectors. An intersection configuration of lane elements can be matched to a single directed graph out of the collection, and the matching may be based at least in part on the lane elements of the intersection configuration including some identified successor lane elements based on the tracked trajectory information. The lane elements of the intersection may be connected based on the known intersection configuration in the directed graph. A high definition map of the local area can then be generated, at 3610, including the lane element graph for use in driving by one or more autonomous vehicles.

Lane Cut Generation

Figure 18:
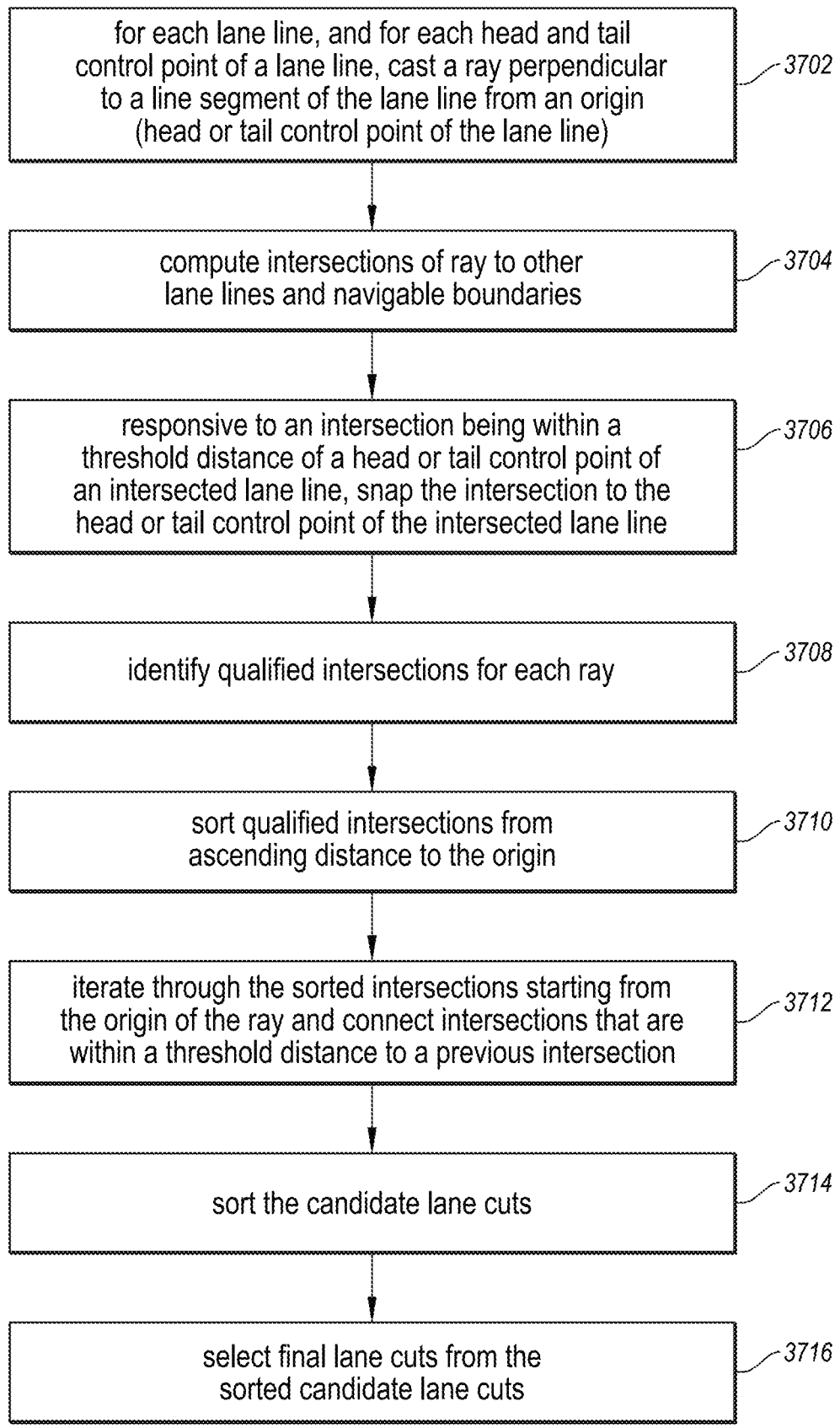
FIG. 18 illustrates a flowchart of an example process for identifying lane cuts.

FIG. 18 illustrates a flowchart of an example process for identifying lane cuts. The process of FIG. 18 may be performed by any suitable system, apparatus, or device. For example, one or more elements of the HD map system 100 of FIG. 1 may be configured to perform one or more of the operations of the process of FIG. 18. Additionally or alternatively, the computer system 4300 of FIG. 31 may be configured to perform one or more of the operations associated with the process of FIG. 18. Although illustrated with discrete blocks, the actions and operations associated with one or more of the blocks of the process of FIG. 18 may be divided into additional blocks, combined into fewer blocks, or eliminated, depending on the particular implementation.

In some embodiments, the lane cut module 3510 may identify or generate lane cuts. For each lane line, and for each head and tail control point of a lane line, the following actions may be performed. The lane cut module 3510 may cast, at 3702, a ray perpendicular to the line segment. The head or tail control points of each lane line may be referred to as the origin of the ray. The ray may extend from the origin of the ray. The lane cut module 3510 may compute, at 3704, the intersections of the ray to other nearby lane lines and navigable boundaries. The computation may be done in a same direction that the ray extends. In some embodiments, a ray may be cast in a first direction and a ray may be cast in a second direction. Responsive to an intersection being within a threshold distance (e.g., 1 meter) of a head or tail control point of an intersecting lane line, the lane cut module 3510 may snap, at 3706, the intersection to the head or tail control point of intersected lane line. This may avoid duplicate cuts when multiple lanes come to an uneven stop at an intersection. The lane cut module 3510 may identify, at 3708, qualified intersections for each ray. A qualifying intersection may refer to an intersection that is a threshold distance from a ray origin. For example, assuming the width of the road cannot exceed x meters, all intersections within this distance may be considered to be qualifying or may be considered to be a qualified intersection. The lane cut module 3510 may sort, at 3710, the intersections from ascending distance to origin. This distance may be positive or negative depending on which side of the ray origin to ensure correct order of intersections after sorting. The lane cut module 3510 may iterate, at 3712, through the sorted intersections starting from the origin and may connect intersections that are within a threshold distance to the previously visited intersection (e.g., within 10 meters). The connected intersections may form a candidate lane cut. An intersection with navigable boundaries may terminate the cut. The lane cut module 3510 may sort, at 3714, the candidate lane cuts. The candidate lane cuts may be sorted by the following rules: (i) lane cuts with more intersections snapped to head or tail control points may rank higher if tied with another lane cut; (ii) lane cuts with more intersections may rank higher if tied with another lane cut; and (iii) lane cuts with smaller curvature (e.g., measured by the maximum angle between consecutive segments) may rank higher. The lane cut module 3510 may select, at 3716, final lane cuts from the sorted candidate lane cuts. The final lane cuts may be selected by going through the sorted candidate cuts and selecting a lane cut if and only if it has no overlap (e.g., no shared control points with the previously selected final lane cut).

Examples of Lane Lines and Lane Cuts

Figure 19A:
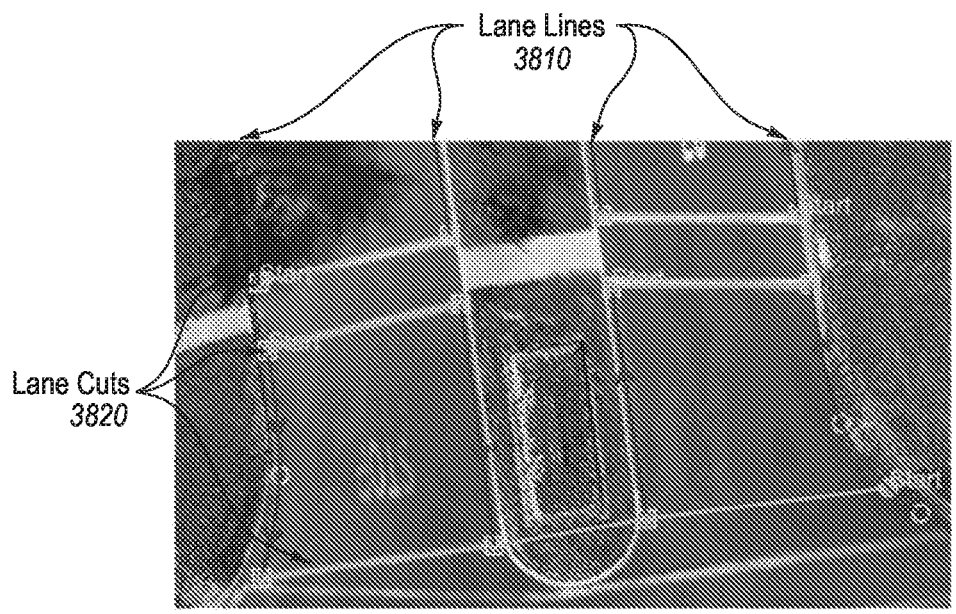
FIGS. 19A, 19B, and 19C illustrate example lane lines and lane cuts.
Figure 19B:
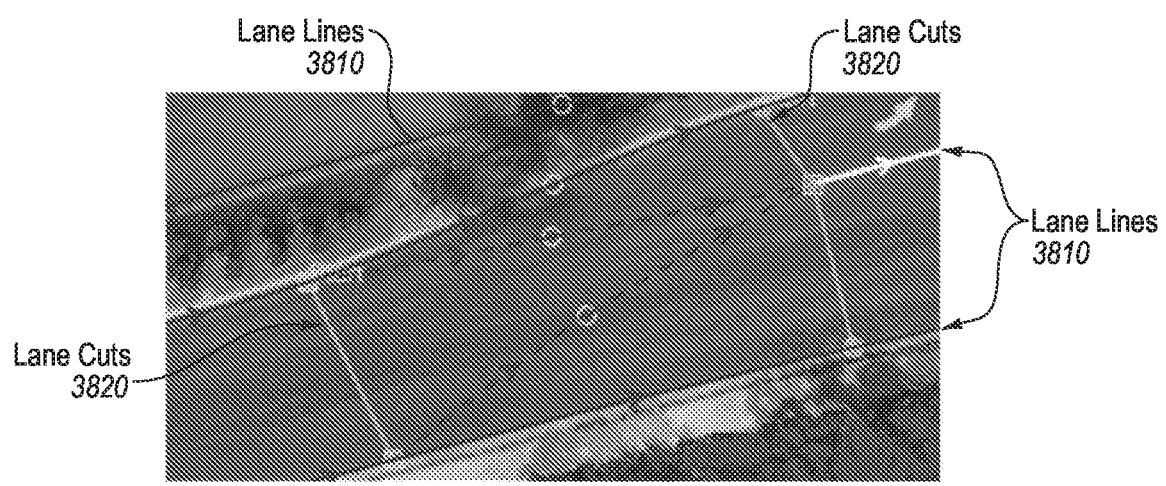
Figure 19C:
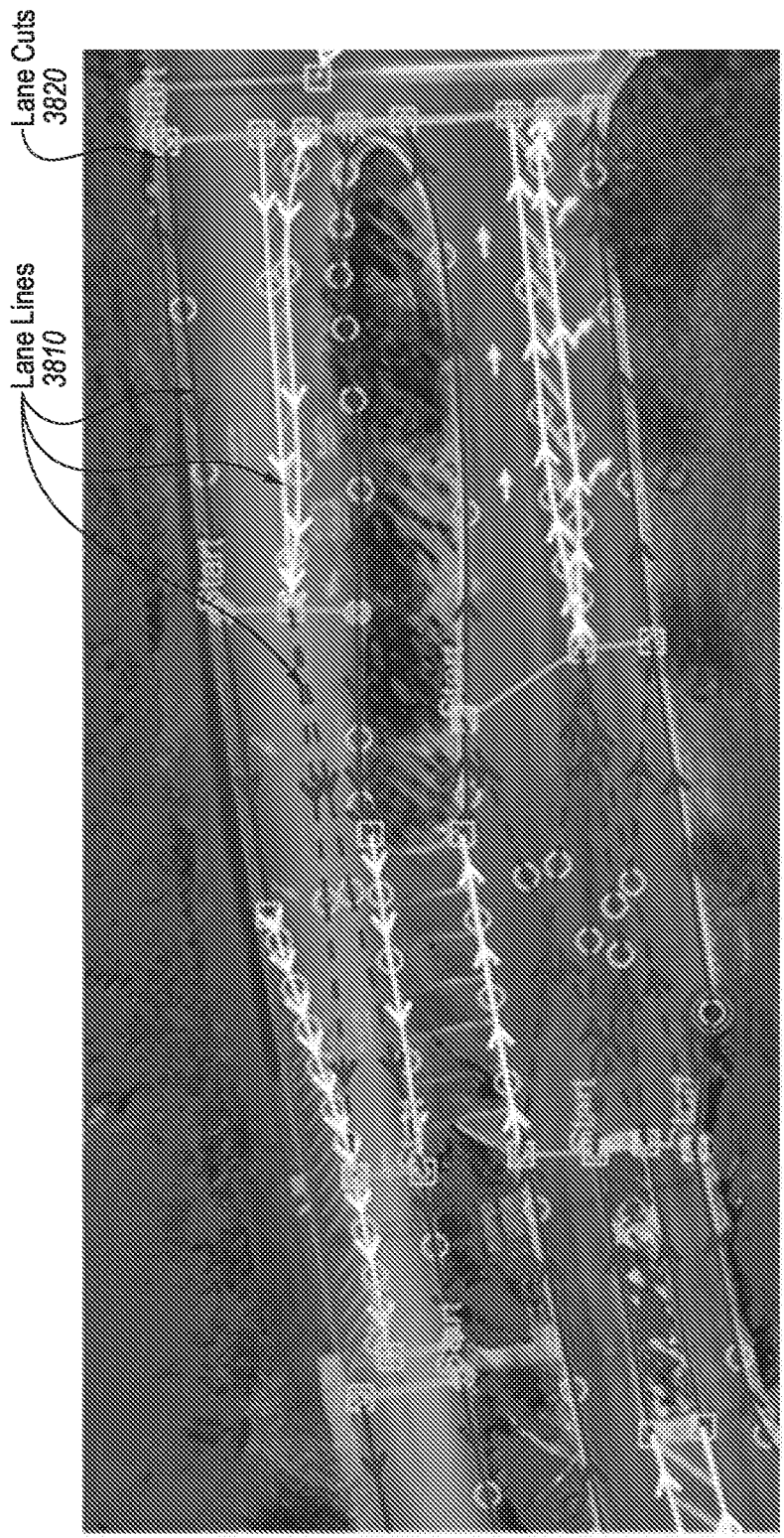

FIGS. 19A, 19B, and 19C illustrate example lane lines and lane cuts. FIGS. 19A and 19B also disclose example lane lines 3810 and manually labeled lane cuts 3820. FIG. 19A discloses example lane cuts at crosswalks and intersections (e.g., stop lines). FIG. 19B discloses example lane cuts 3820 at lane splits. FIG. 19C discloses example lane lines 3810 and manually labeled lane cuts 3820. FIG. 19C discloses more complex lane cut examples at lane merges and lane crosses. At least one of the vertices in each of the lane cuts 3820 may be at the end point of a lane line feature, which may provide a fairly robust way of lane cut detection.

Examples of Lane Elements

Figure 20:
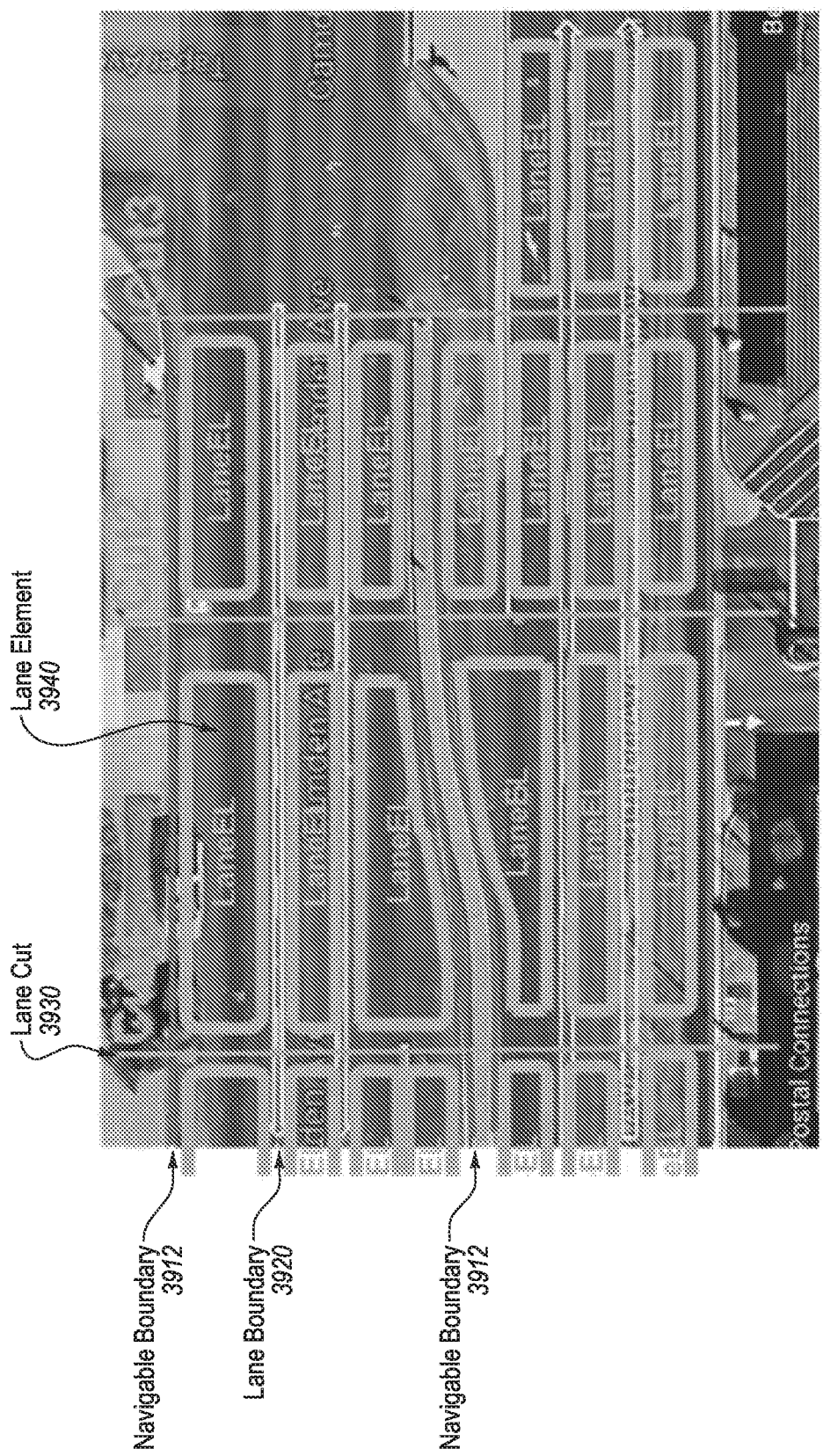
FIG. 20 illustrates example lane elements, lane boundaries, navigable boundaries, and lane cuts.
Figure 21:
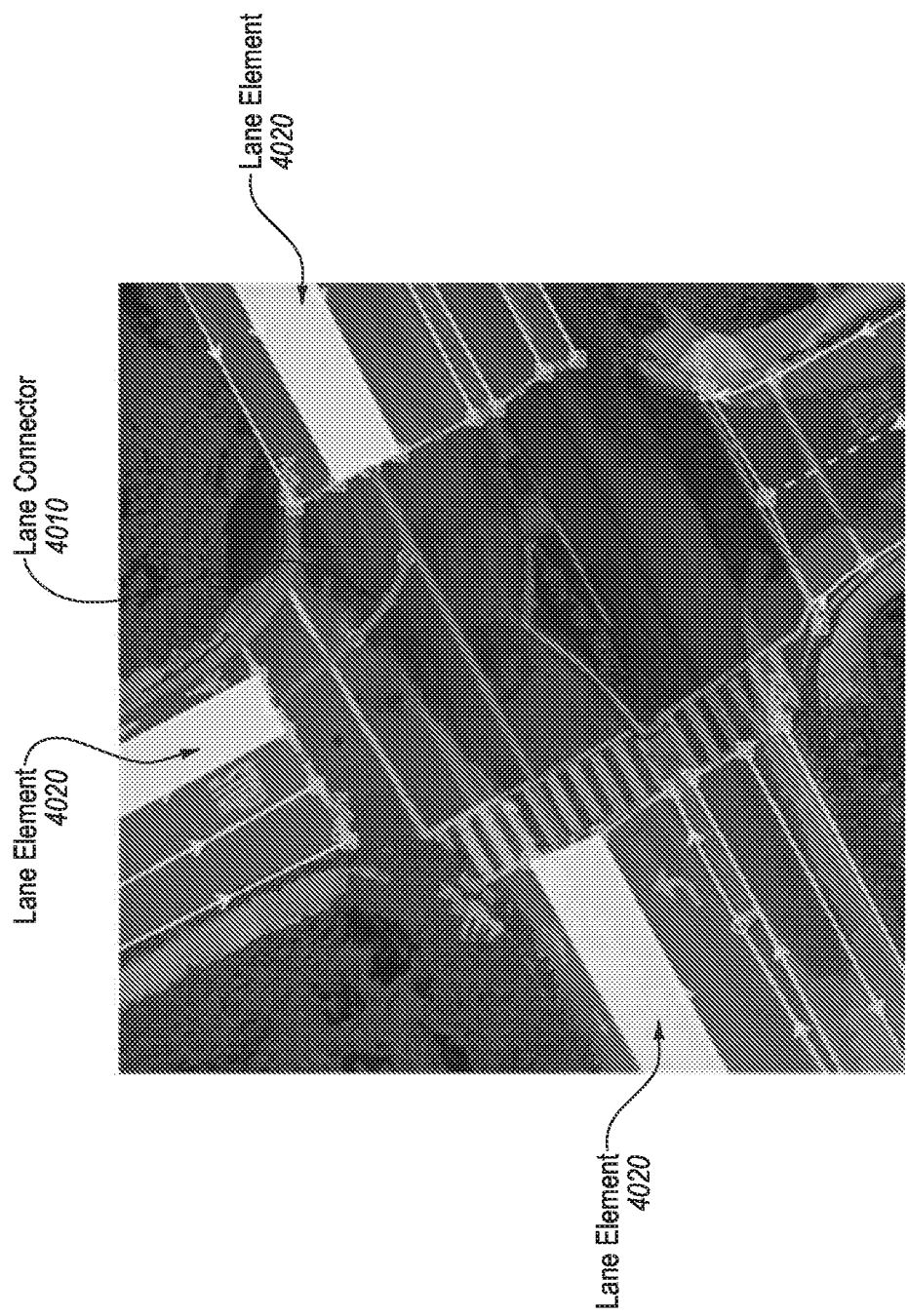
FIG. 21 illustrates an example intersection with example lane connectors connecting example lane elements.

FIG. 20 illustrates example lane elements 3940 (orange), lane boundaries 3920 (yellow), navigable boundaries 3912 (red), and lane cuts 3930 (green). FIG. 21 illustrates an example intersection with example lane connectors 4010 connecting example lane elements 4020. The connectivity of the three lane elements 4020 may be calculated from their spatial relations. For example, an automatic template matching algorithm may be used to infer the connectivity of the lane elements at intersections and automatically create lane connectors. Alternatively, a human may draw lane connectors. Specific fields of a lane element include any of the following: left lane line, right lane line, reference to incoming LaneEls, reference to outgoing LaneEls, reference to left and right adjacent LaneEls (if any, and there may be a LaneEl traveling in the opposite direction, which may only be considered adjacent if it is clearly navigable, but not if there is a curb or barrier between), left lane restriction (e.g., whether you can legally cross on the left or not), right lane restriction, termination restriction (e.g., a semantic termination restriction for the outgoing end of the LaneEl, such as a stop line), speed limit, vertical clearance, keep clear, the spatial bounds, references to related features (e.g., signs or lights), and/or left and right navigable surface polylines. A termination restriction may be an enumeration of semantic termination restrictions for the end of a lane element. Examples include a stop line (e.g., which may be an N-way stop line, which needs to reference the stop line locations for the other N−1 stops), a yield line, a crosswalk, a traffic light, a dead end, a rail crossing, a keep clear, a speed bump, etc. In some embodiments, the lane elements may be restricted to a maximum length. Breaking lane elements into smaller lengths may make processing and usage of the lane element more efficient.

Examples of Features

Features may include everything on a map that is either drawn by operators or automatically generated. For example, a feature may include any of a lane boundary, a navigable boundary, a lane element, a traffic light, a traffic sign, etc. Each feature may include a list of control points and an interpolation method. An interpolation method may be one of polyline, bezier curve, etc., which may describe how to interpolate the geometry among the control points. Primary features may include features that are either drawn by operators that are automatically generated (e.g., a sign or lane boundary). Primary features may also include automatically generated features that are further modified by human operators. For example, a lane cut or lane connector may be generated by automatic algorithms, but may be later modified by a human operator during human curation. Examples of primary features may include lane boundaries, crosswalks, stop lines, yield lines, traffic lights, and traffic signs. Derived features may include features that are inferred and constructed from primary features. The properties of a derived feature may depend on other features. In some embodiments, human operators may not be allowed to directly add/modify derived features. An example of a derived feature type may include a lane element.

In some embodiments, it may be difficult for a human operator to manually update and validate a lane element graph. Lane elements may be aligned with lane boundaries and navigable boundaries. Changing one lane element may affect many of its neighbors. For example, adding a speed bump may cause many lane elements to be split. In another example, adding a speed limit sign may change attributes of tens or hundreds of lane elements.

Lane cuts may be primary features. Lane cuts may cut out a cross section of a road. Counting the intersections between a lane cut and the lane boundaries/navigable boundaries, all information of a road cross section may be inferred, such as how many lanes, what are the lanes directions, etc. A lane cut may be needed whenever there are changes to roads, such as lane merging/splitting, upcoming intersection or junction, speed limit changes, a speed bump, etc. In some embodiments, a lane cut may be automatically generated. For example, when a speed limit sign is encountered, the system may automatically shoot a ray orthogonal to the direction the sign is facing to produce a lane cut. In some embodiments, human operators may draw the lane cut precisely, such as in the case of lane merging.

Lane connectors may be primary features. At intersections, roads may become complicated and lane elements may overlap. Lane cuts alone may not be enough to describe the road connectivity. Assuming lane elements are generated until just before the intersections, lane connectors may be drawn by operators or automatically generated to describe how they are connected through the intersections.

Example of Lane Element Generation

Figure 22:
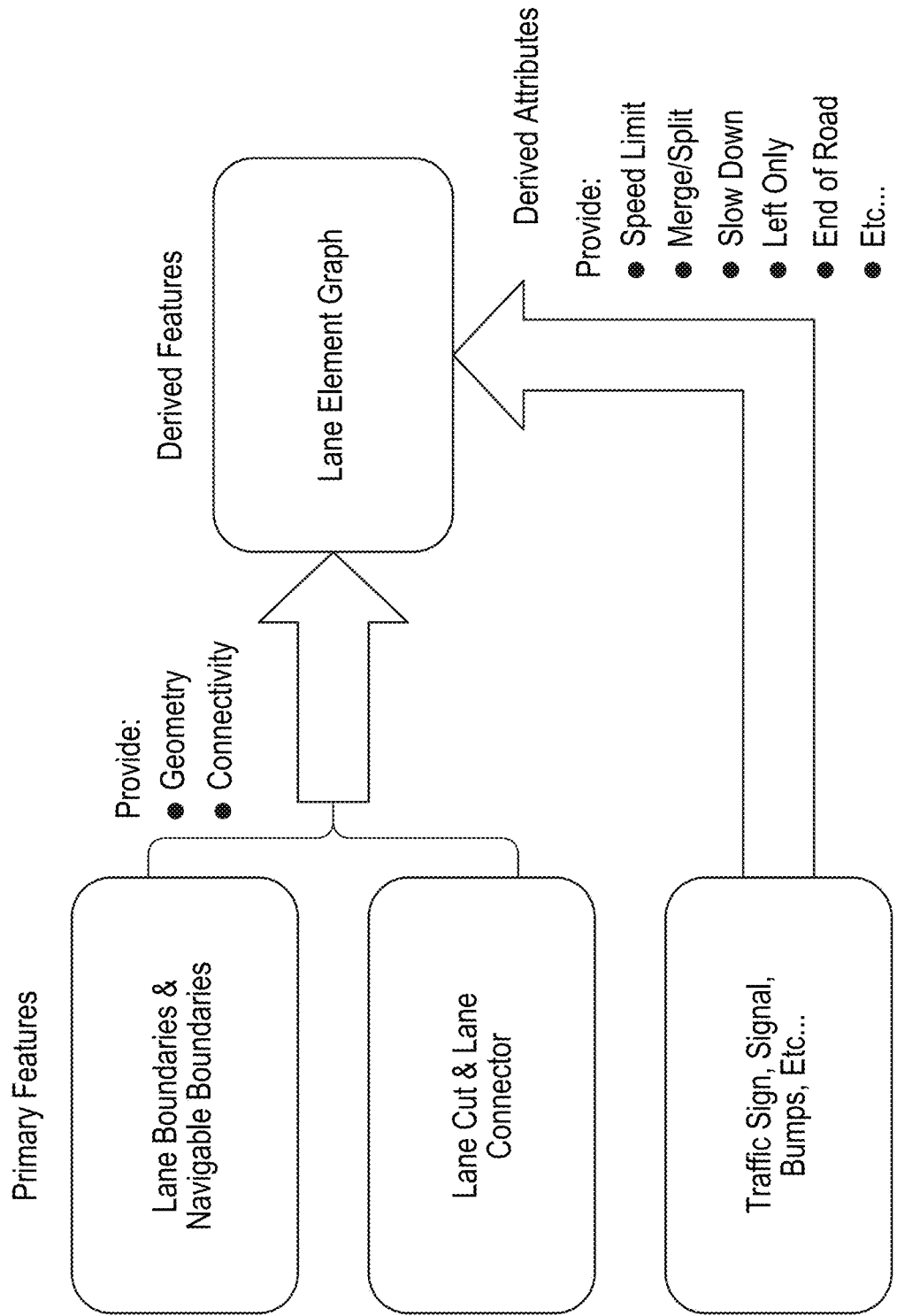
FIG. 22 illustrates a flowchart of an example process of generating a lane element graph from primary features and derived features.

FIG. 22 illustrates a flowchart of an example process of generating a lane element graph from primary features and derived features. The process of FIG. 22 may be performed by any suitable system, apparatus, or device. For example, one or more elements of the HD map system 100 of FIG. 1 may be configured to perform one or more of the operations of the process of FIG. 22. Additionally or alternatively, the computer system 4300 of FIG. 31 may be configured to perform one or more of the operations associated with the process of FIG. 22. Although illustrated with discrete blocks, the actions and operations associated with one or more of the blocks of the process of FIG. 22 may be divided into additional blocks, combined into fewer blocks, or eliminated, depending on the particular implementation.

As disclosed in FIG. 22, primary features may include lane boundaries, navigable boundaries, lane cuts, lane connectors, and traffic sign, signal, bumps, etc. In some embodiments, lane cuts may be drawn by users and may be primary features. The process of FIG. 22 may include an algorithm for lane element generation in which the system may go through each lane cut and, based on the intersection points between the lane cuts and lane boundaries, may break the lane cuts into segments.

Figure 23:
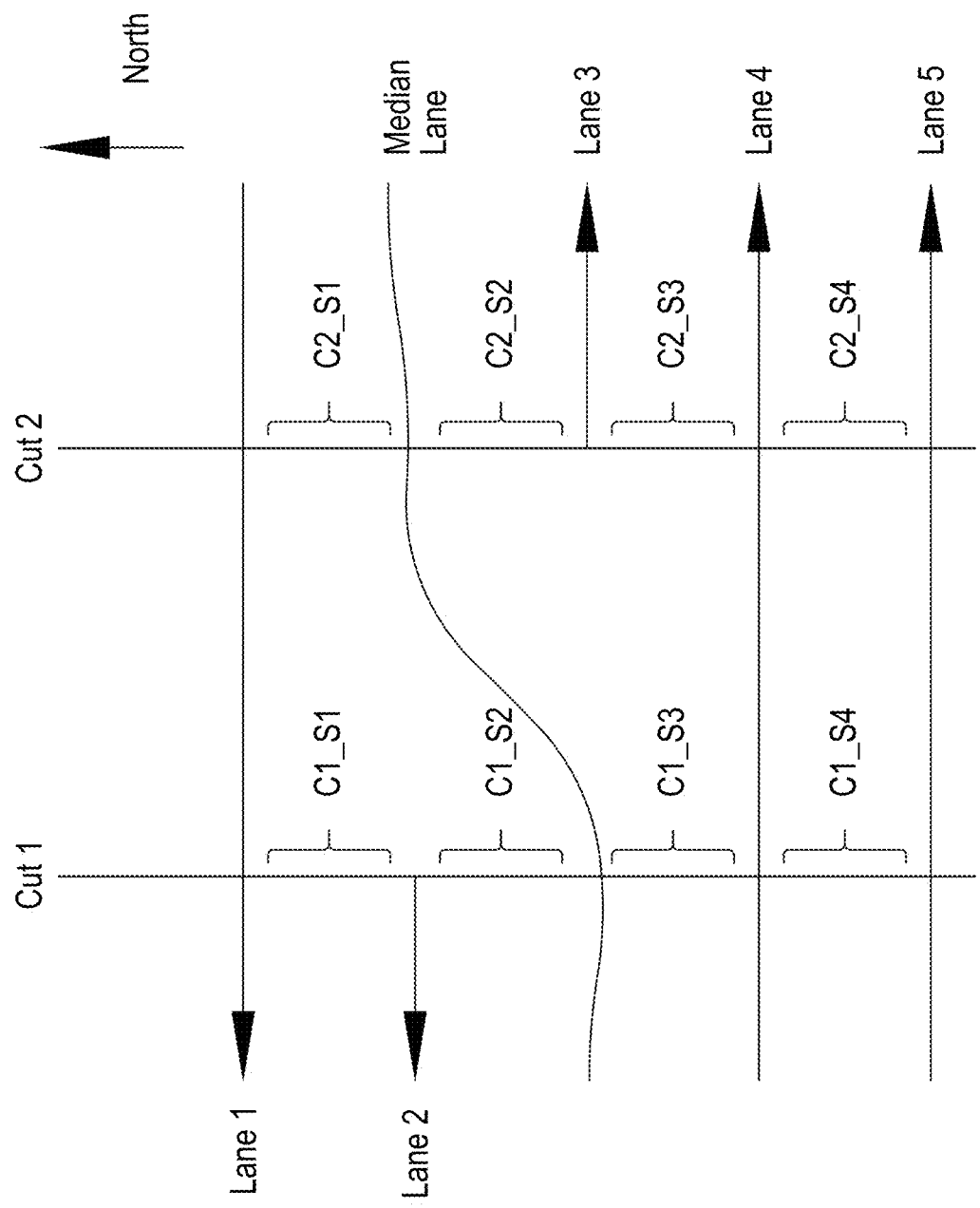
FIG. 23 illustrates example lane cuts and lane boundaries.

FIG. 23 illustrates example lane cuts and lane boundaries. The lane cuts are Cut 1 and Cut 2. The lane boundaries are Lane 1, Lane 2, Median Lane, Lane 3, Lane 4, and Lane 5. Cut 1 intersects with Lane 1, Lane 2, Median Lane, Lane 4, and Lane 5. Thus, Cut 1 is broken into four lane cut segments C1_S1, C1_S2, C1_S3, and C1_S4. For each segment, the traffic direction may be inferred based on traffic direction of the lane boundary. In this example, lane cut segments C1_S1 and C1_S2 are going west and lane cut segments C1_S3 and C1_S4 are going east. Cut 2 may be broken to lane cut segments C2_S1, C2_S2, C2_S3, and C2_S4 in a similar fashion.

The system may further go through each lane cut segment, where the lane cut segment itself serves as the bottom edge for a lane element, and the system may trace the two lane boundaries that are intersected by the segment until another lane cut segment is reached. The other lane cut segment may be the top of the lane element. The parts of the two lane boundaries may serve as the left and right edges of the lane element. Thus, the full geometric boundary of the lane element may be obtained. For example, from lane cut segment C1_S4, Lane 4 and Lane 5 may be traced until lane cut segment C2_S4 is reached.

An example for a road split may include performing the algorithm from lane cut segment C2_S1. The right edge of lane cut segment C2_S1 (Lane 1) may be traced until it reaches lane cut segment C1_S1. The left edge of lane cut segment C2_S1 (median lane) may be traced until it reaches lane cut segment C1_S2. This lane element may be a split zone. Its cap or top edge may be formed by joining lane cut segments C1_S1 and C1_S2, and this lane element may have two successor lane elements.

An example for road merge occurs if the traffic direction in FIG. 23 is reversed and the algorithm is performed from lane cut segment C1_S1. Lane cut segment C1_S1 does not have a right edge to trace, so the neighboring lane cut segment C1_S2 may be used to obtain a right edge (Median Lane) to trace. The left edge is Lane 1. Both the Median Lane and Lane 1 end at lane cut segment C2_S1. For this lane element, the bottom edge may be lane cut segment C1_S1 joined with lane cut segment C1_S2 and the top edge may be lane cut segment C2_S1.

The left and right neighbors of lane elements may be derived by using the property that neighboring lane elements share the same edge at intersection points. In some embodiments, lane or navigable boundaries that are broken may be connected to implicit lane boundaries. For example, at the driveway of houses, the curb (navigable boundary) may be broken and may be connected to an implicit lane boundary that is formed at the driveway boundary.

In some embodiments, generating lane elements without the step of tracing lane lines to find the corresponding top edge of a lane element may include solving an optimization problem and finding the best match to minimize a certain cost function. In FIG. 23, the optimal match of lane cut segments (e.g., bottom edge and top edge for lane elements) may be:

C1_S1<->C2_S1
C1_S2<->C2_S1
C1_S3<->C2_S2
C1_S3<->C2_S3
C1_S4<->C4_S4

In some embodiments, a simple cost function may be used based on whether a lane cut segment shares a left lane edge or right lane edge with another lane cut segment and a distance between lane cut segments to find the match.

In some embodiments, the algorithm may be executed in instant mode and batch mode. In instant mode, the system may assume that an operator has changed any primary features, so the whole lane element graph may be affected. The lane element generation algorithm may be rerun for a reasonably large area (e.g., 100 meters by 100 meters). In some embodiments, the human operator may preview the changes to ensure accuracy. At this scale, the algorithm may build a complete graph within seconds. In batch mode, a whole region (e.g., 50 miles by 50 miles) may be done at a time. Since the core algorithm may work with each lane cut independently (e.g., each lane cut may only be traced along the traffic direction, and may not look backward), the work may be distributed into a map reduce job and linearly scaled with the number of machines provided. The algorithm may be deterministic, so a preview of the lane element graph in instant mode may be the same as what is generated and sent to vehicle in batch mode.

Example Lane Elements Connectivity

Figure 24:
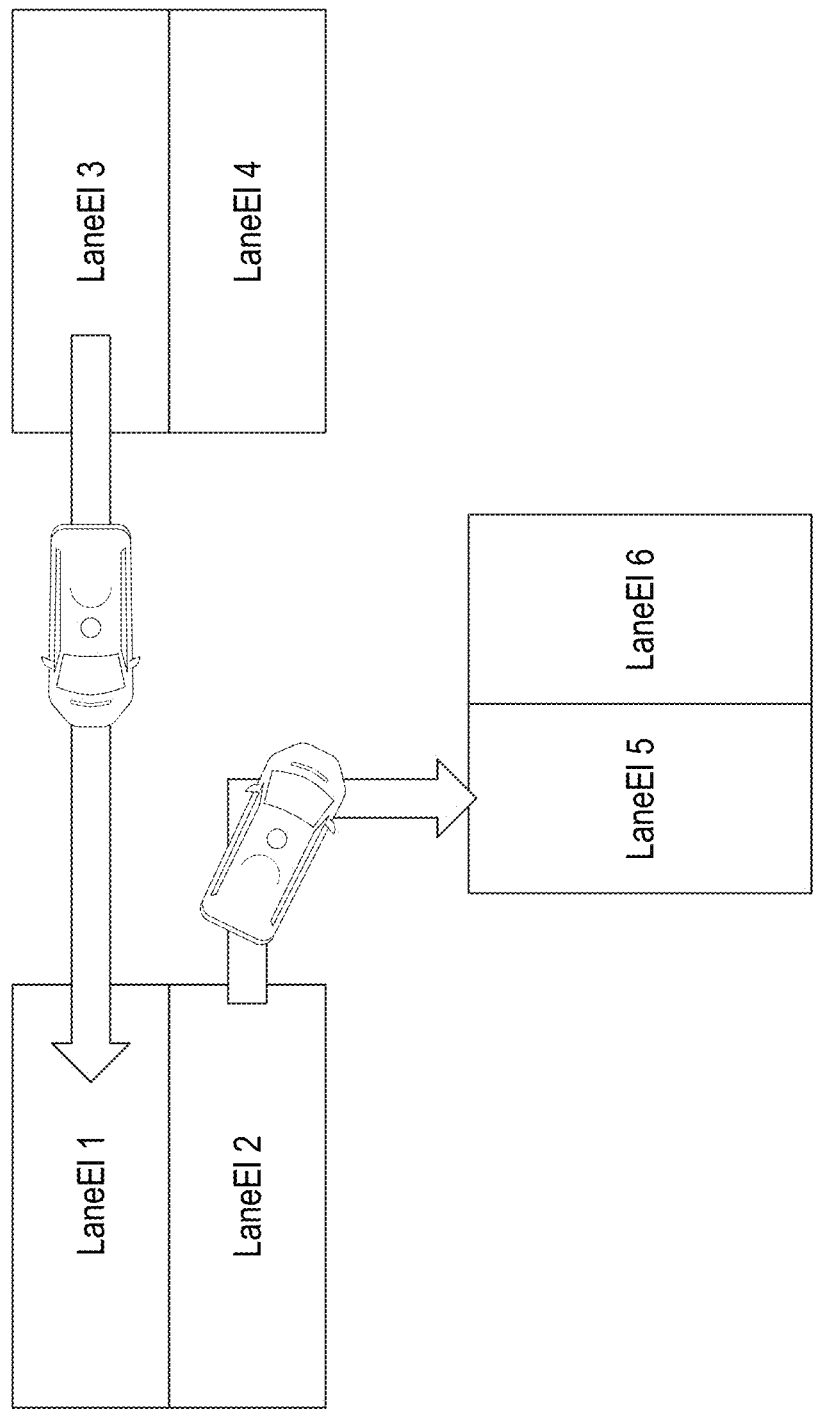
FIG. 24 illustrates an example T-intersection with two data collecting trips from a vehicle.
Figure 25:
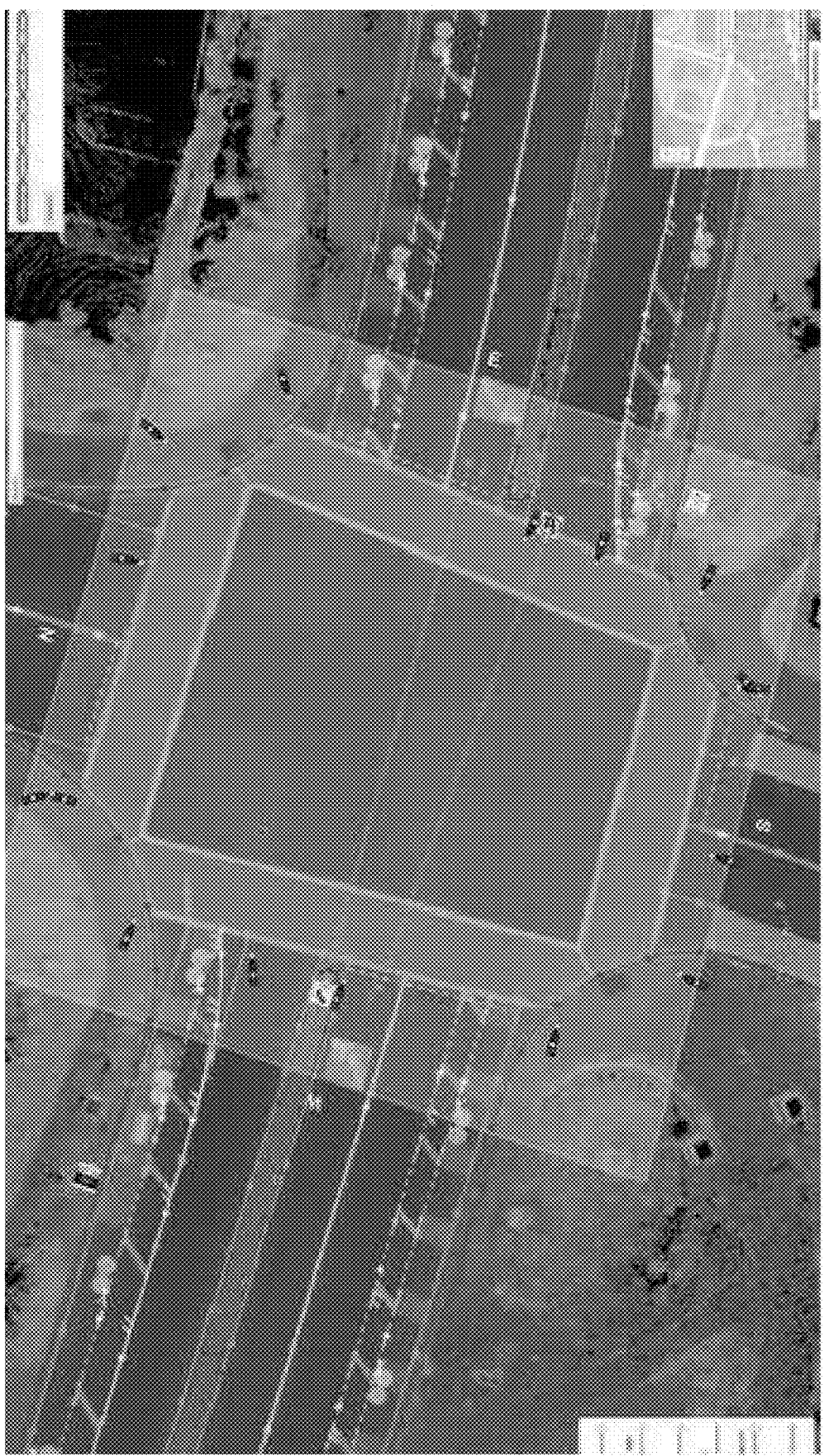
FIGS. 25-34 illustrate example user interfaces for a tool for lane connectivity at traffic intersections.
Figure 26:
Figure 27:
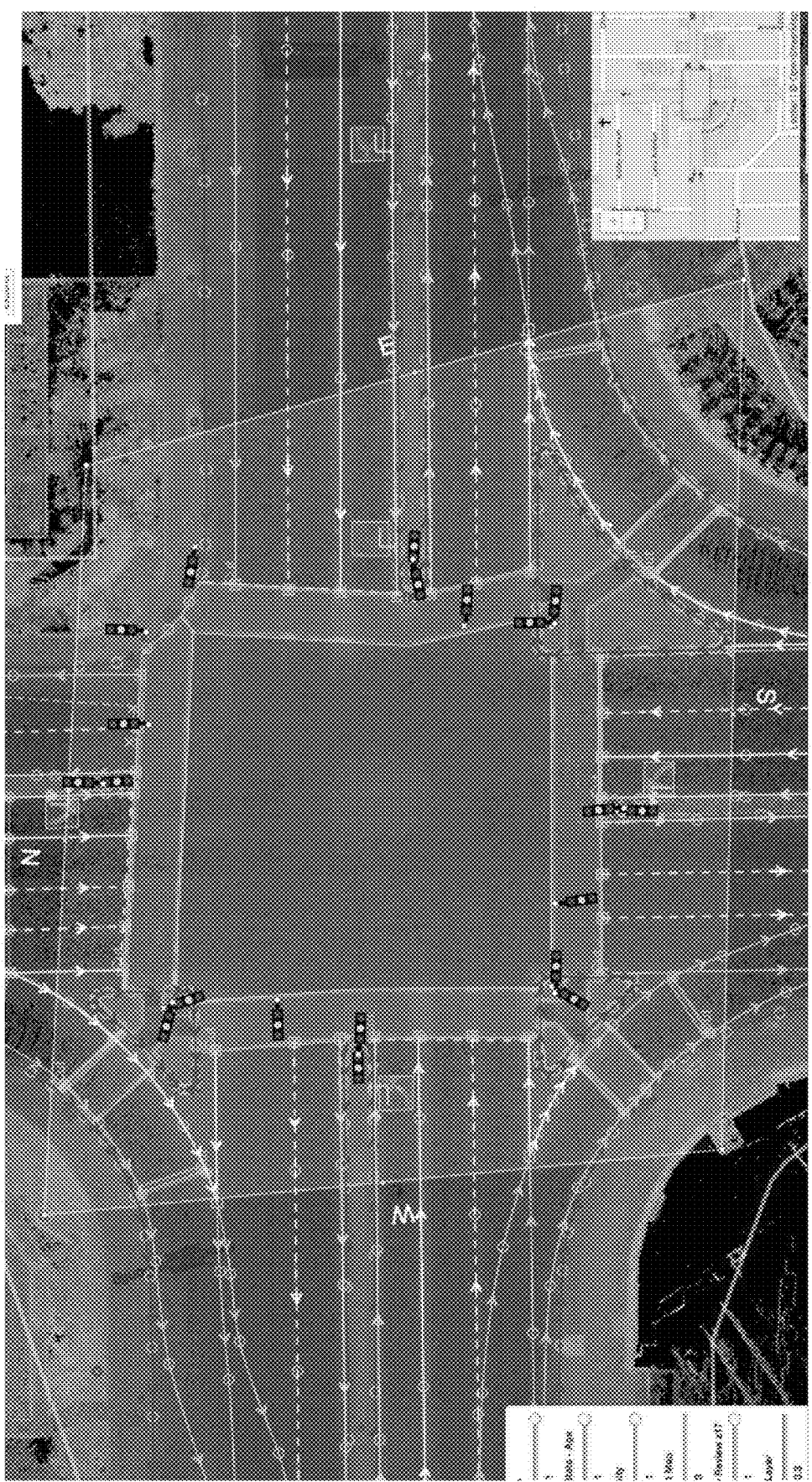
Figure 28:
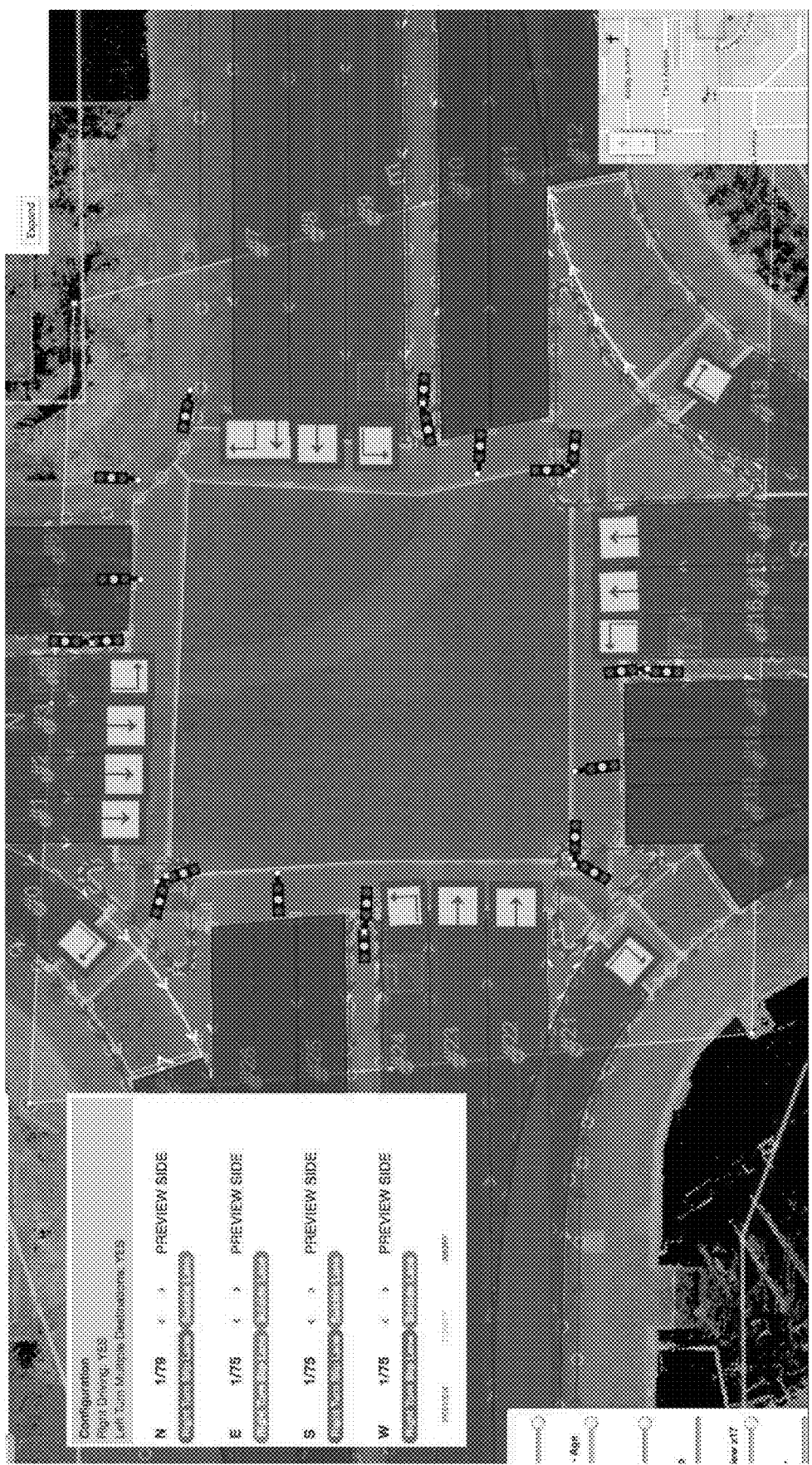
Figure 29:
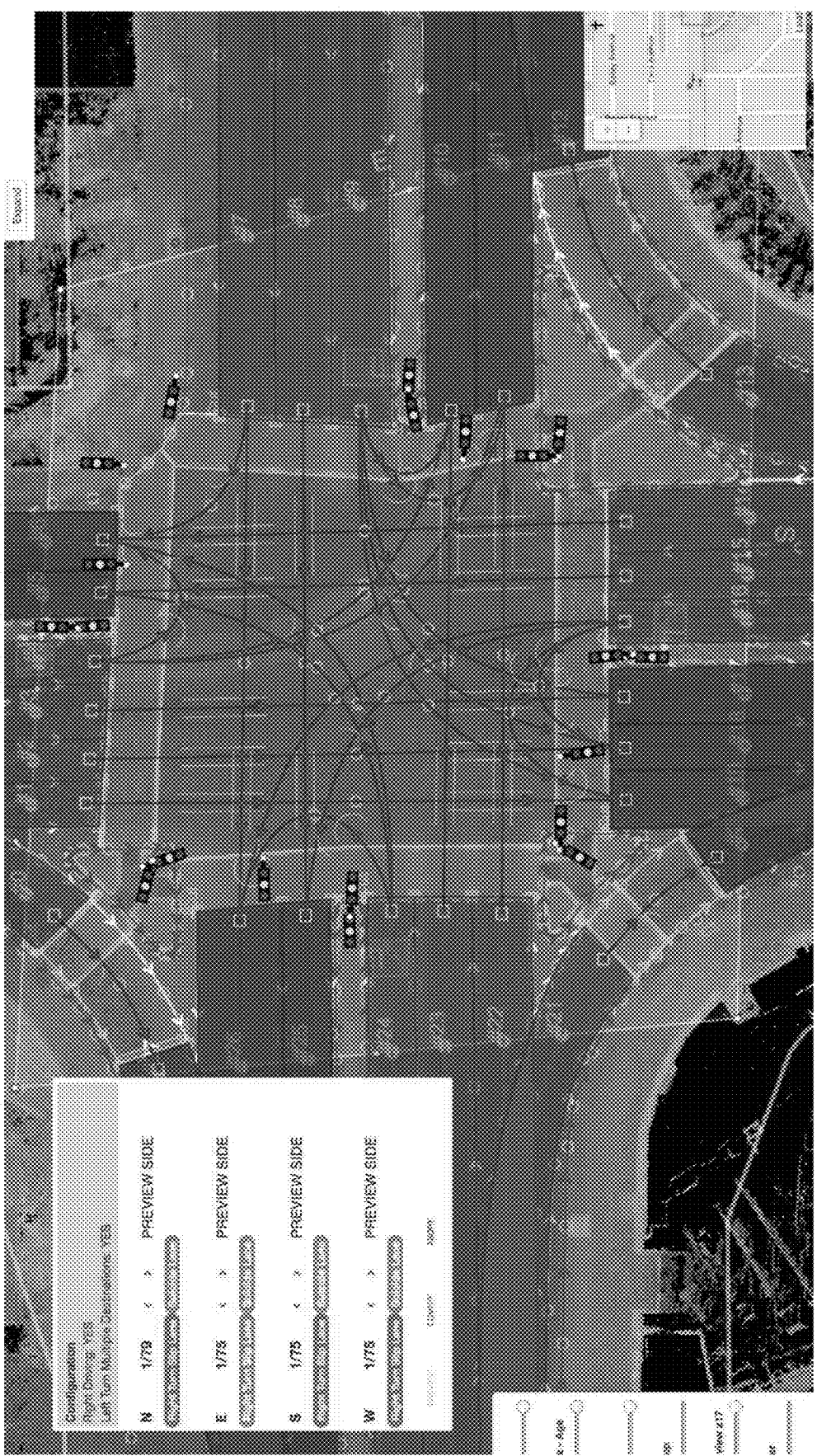

FIG. 24 illustrates an example T-intersection with two data collecting trips from a vehicle. The T-intersection may include six lane elements LaneEl 1 to LaneEl 6. In one data collecting trip, the vehicle may have traveled from LaneEl 3 to LaneEl 1. In another data collecting trip, the vehicle may have traveled from LaneEl 2 to Lane El 5. From the tracked trajectories, the lane connectors from LaneEl 3 to LaneEl 1 and from LaneEl 1 to LaneEl 5 may be derived. However, not all the lane connectors may be derived using tracked trajectories since not all lane elements were traveled in during the two data collecting trips. At this stage, a matching method to a known intersection configuration may be used to complete the remaining lane connectors in the intersection (e.g., by identifying a best match to a known intersection configuration of a collection of known intersection configurations).

Traffic Restrictions Association

In some embodiments, another type of primary feature, namely an association link, may be used to annotate a lane element. For example, similar to the lane connector, the association link may connect a traffic light to a lane element that it controls. In some embodiments, the system may infer which lane elements are controlled by a traffic light from the geometric relationship of the lane element to the traffic light. For example, this may be based on traffic light orientation and distance. The association link may also connect a traffic sign to a lane element it controls. Traffic signs like yield signs, stop signs and speed limits are similar to traffic lights. However, traffic signs do not always control all lanes in the same direction. The association link may be used to specify which lane element are controlled by the traffic sign.

Other Considerations for Lane Cut Generation

In some embodiments, lane cuts may be automatically generated. When lane cuts are automatically generated, lane cuts may not be derived from raw image pixels or LIDAR points (e.g., lane boundaries and navigable boundaries may be derived from these features), but from lower level features such as lane lines and navigable boundaries. Having feature vectors instead of higher level features as input may greatly reduce the complexity of detecting changes in road topology. However, the quality of input features may have a greater impact on the quality of detected lane cuts as opposed to other automation tasks (e.g., lane lines, traffic signs that use raw image pixels, or LIDAR points). If input lane line features are not well aligned to the road, have missing segments, or have extra pieces that do not exist, the output lane cuts may not be likely to be useful for generating a network graph.

In some embodiments, lane cut generation may occur after all input features (e.g., explicit/implicit lane lines and navigable boundaries) have been curated. Although more complexity may be added to the feature review workflow, as there are dependencies among feature types (lane lines and navigable boundaries are reviewed before lane cuts become available), the detection of topological changes in road network may be done with more confidence and detected lane cuts may be more likely to be correct.

Topological changes in road network may be generally accompanied with termination of lane lines, either explicit or implicit. The altitude of features may not affect the topology of a road network. The computation may be simplified by projecting all the input features to 2D by removing the altitude dimension from each control point. The altitude information for each control point may typically not be discarded, but can instead be kept separately, with a mapping between each 2D control point to its altitude value. This information may become useful upon output, when 2D lane cut features may be projected back into the 3D OMap. Navigable boundaries may terminate the lane cut. The connected intersections may form a candidate lane cut.

For each lane cut in the final set, an altitude may be computed for each control point. Each control point on a lane cut may be an intersection with input features, whose altitude information may be known. An intersection may fall between two control points on an input feature. The intersection may include a parameter t which may measure how close the intersection is to one control point vs. the other (e.g., if the intersection is on the first control point, t=0; if the intersection is on the second control point, t=1; otherwise the range of t is between (0, 1)). An interpolated altitude may be computed at t based on an interpolation method associated with each input feature (e.g., bezier curve) and the altitude information for both control points. Thus, an altitude at each lane cut control point may be calculated.

Rays may not be cast from navigable boundaries. Navigable boundaries may be used to intersect (and terminate) lane cuts. The use of navigable boundaries may be to ensure that a lane cut does not extend to adjacent roads, which may happen if two roads are right next to each other. To speed up this computation, for each feature, a latitude/longitude bounding box may be precomputed that fully contains the feature. The system may only include a feature for intersection computation if ray origin is close to (or contained by) its bounding box. Since the process is done over a large region, this can filter out a majority of the features for intersection computation.

Other Considerations

A roundabout can be cut into segments with a lane cut to break it into several intersections. For example, a four-way roundabout may be cut into four T-intersections. Lane connectors may be drawn for each of the T-intersections.

There may be other traffic marks painted on the road surface such as, for example, 'bus lane', 'slow', 'keep clear', etc. A polygon feature may be created for each of these traffic marks such that it can be geometrically inferred which lane elements are affected by them.

Roads may terminate in many ways such as, for example, a driveway, a parking lot, a cul-de-sac, a dead end, etc. For these cases, a final lane cut may be drawn in front of such road terminations and this lane cut may be marked with a special flag, such as 'road_termination'.

In some embodiments, the lane line generation process may identify lane lines from photographic images using deep learning techniques and may merge the lane lines from multiple images into a single lane. Mapping between the two-dimensional representations of lane lines and the three-dimensional representations may be performed by implementing triangulation techniques using stereo images. In some embodiments, lane line merging in instances resembling an intersection may be performed during the process of generating a single lane line rather than in reference to the generation of a complete route. Additionally, in some embodiments, information used to facilitate lane line may be generated in real-time as a car travels along a path.

Lane Line Connectivity

In some embodiments, the system may determine lane lines based on marking on the road. The system may store metadata describing lanes such as, for example, the direction in which a vehicle is allowed to travel on the lane, whether the lane is a turn lane (e.g., a right turn lane or a left turn lane), etc. At a traffic intersection (also referred to as an intersection), a road often does not have lane markings describing how a vehicle can travel through the intersection. For example, when making a left turn from a particular lane, a vehicle may be limited to entering a specific lane or may be able to enter two or more lanes. Prior to performing the turn, the vehicle may need to determine the lane connectivity indicating which lanes the vehicle can enter after the turn even if there are no lane markings at the intersection. Lane connectivity is often determined based on traffic laws/rules. In some embodiments, the system may use various heuristics to determine lane connectivity at an intersection. In some embodiments, the system may determine the lane connectivity and may store the information as metadata that is provided to vehicles for determining how to navigate at the traffic intersection. In some embodiments, the system may determine the lane connectivity and may configure a user interface that displays the determined lane connectivity to a user or operator for verification. The user/operator may approve the lane connectivity at the intersection determined by the system or may manually correct it.

In some embodiments, the system may determine, for an intersection, all possible connections that a vehicle can make (e.g., from one lane segment to another) while crossing the intersection such that the connections are safe and legal.

Overall Process for Determining Lane Line Connectivity

In some embodiments, the system may receive information describing an intersection. The information may identify incoming and outgoing lanes for each road at the intersection. The information may further include any turn information that is available based on traffic signs or road markings (e.g., whether a lane is a left turn lane, a right turn lane, a U-turn lane, etc.). The system may iteratively generate various options for the lanes of a particular road at the intersection, with the options specifying the direction in which a vehicle can go in that lane (e.g., left turn only, left turn and straight, right turn only, right turn and straight, left and right turns, etc.). The system may use constraints based on, for example, traffic lights, road signs, road markings (e.g., arrows indicating the lane type such as left turn lane, right turn lane, straight lane, or some combination thereof), traffic laws, traffic rules, physical constraints on vehicles (e.g., large trucks may not be physically able to complete turns from certain lanes), and constraints on lanes on the opposite side of the intersection where the vehicle could potentially go (e.g., if there are no lanes on the right, then the system may not generate any right turn combinations). In some embodiments, the system may use predefined templates for generating the combinations of arrows for each lane. The templates may not permit invalid combinations of lane directions (e.g., having a right turn lane to the left of a left turn lane, having a lane that goes straight to the left of a left turn lane, having a lane going straight to the right of a right turn lane, etc.). The system may eliminate options that are inconsistent with the constraints based on traffic lights and constraints on lanes of the opposite side of the intersection. The system may rank the various templates that remain after performing the filtering. The system may recommend the top ranking templates to a user for approval.

Automation of Intersection Processing

FIGS. 25-34 illustrate example user interfaces for a tool for lane connectivity at traffic intersections. In some embodiments, intersection related work using the tool can be further divided into several dependent steps such as, for example, sign association, connectivity (turn lines), turn lane geometry, bulb association, and priority.

In a sign association step, each sign that is relevant to an intersection may be associated to the lane(s) it controls, through sign associators (which may be represented by dashed skyblue lines). For example, as disclosed in FIG. 25, all "No U Turn" signs may be associated to corresponding lanes entering the intersection with upcoming left turns.

In a connectivity (turn lines) step, turn lines (which may be represented by green curve lines) may be created to represent all possible paths that vehicles can take to traverse the intersection. In some embodiments, as disclosed in FIG. 26, the turn lines can get dense and complex in multi-lane intersections.

In a turn lane geometry step, connectivity (turn lines) may be further expanded to turn lanes. Geometry based algorithms may be used to generate smooth boundaries given the connectivity, and may ensure that the resultant drive paths are realistic ones that a vehicle would actually drive along.

In a bulb association step, each bulb within all traffic lights may be associated with the turn lines it controls. For example, a green left arrow bulb may be associated with all corresponding left turns. These associations may be represented as a matrix (e.g., turn lines X bulbs) in the user interface.

In a priority step, for each pair of turn lines with conflicting traffic, a priority (e.g., higher, lower, decide by signal) may be arbitrated for vehicles to decide right of ways. These pairwise relations may be represented as another matrix (e.g., turn lines*turn lines) in the user interface.

In some embodiments, because algorithms may not be as smart and flexible as human beings, the use of a semi-automation tool may have a strict requirement on the quality of input data. For example, some random errors (e.g., wrong sign type, wrong association, incomplete intersection laneEL graph, etc.) that were previously not caught, or that are caught in later stages, may be required to be caught and fixed before automation is applied. Further, the order of the various steps in the tool may be enforced according to dependency. For example, sign association may be required to be finished and quality assessed before auto connectivity may be employed.

In some embodiments, taskification may be employed, with a series of task based tools being used to enforce data quality and dependency. In some embodiments, a process may include the various steps to complete in connection with an intersection. In some embodiments, each step (except the first one) may be handled by at least one task.

In a step of sign association, sign associations may be generated firstly as they may have a dependency for connectivity. The associations may be generated semi-automatically, in two steps: (1) assign each sign to the side of intersection that it controls, with the system relying on geometries for the assignment, and with the algorithm making the assignments with high confidence, but leaving low confidence situations for users to fix manually, and (2) after the assignment, for most of the sign types related to the intersection, the association may be automatically generated, with the outputs being the generated associations.

In the step of connectivity, two types of connectivity may be performed: (1) automatic connectivity and manual connectivity.

In automatic connectivity, connectivity may have strict requirements on both the input data quality and human expertise. The turn lines may be generated semi-automatically, in two steps: (1) templating and (2) turn line generation. In the step of templating, all possible templates may be inferred from a laneEL graph and the template with the highest confidence may be picked. Empirically, the inference may be correct for ~98% of the intersections. For those that are not correct, the templates may be toggled, or where the intersection is too complicated, the intersection may be sent for manual connectivity. In the step of turn line generation, the tool may go side by side to review the proposal for turn lines (e.g., where an intersection has four sides, such as the north, east, south, and west sides, the tool may process each of the four sides one at a time in four separate operations), the tool may perform some checks and provide warnings if necessary, a user may review and resolve all the warnings, and the turn lines may be committed to the backend, with the outputs being the generated turn lines.

In manual connectivity, the inputs, outputs, and resolution may be similar to those in automatic connectivity, but all of the turn lines may be manually drawn per the operation specs. In a step of bulb association, bulb association may be performed after turn lines are generated, and also may depend on the correct bulb location results. The association between each individual bulb to turn lines may be semi-automated as follows: (1) assign each signal to the side of intersection that it controls, with this being similar to the sign association automation, thus the assignment may also require a human review, and (2) after the assignment, each bulb may be associated to the turn lines it controls, with the algorithm working correctly for all common signal configurations, with uncommon cases being reported for manual processing, and with the outputs being the generated associations between bulb and turn lines. In a step of priorities, priorities may be done last as they may depend on connectivity and sign/signal associations. The priorities inference may be semi-automated as follows: (1) for intersection type, lane protect-ness, and through side, as different logic may be used for different intersection types, the type may be decided prior to automation, and for some types, the protect-ness (protected left turn) and the through side of the intersection may be further determined.

Auto Connectivity

In some embodiments, auto connectivity may be an important and somewhat complicated step in intersection semi-automation. As disclosed in the user interface of FIG. 27, arrows may show directions in which traffic can move along a lane through an intersection. As disclosed in the user interface of FIG. 28, arrows at the end of each lane element may be shown before entering an intersection, with the arrows indicating predicted directions in which a vehicle can turn. As disclosed in the user interface of FIG. 29, connectivity may be shown from one lane segment to another through the intersection as determined by the system. In some embodiments, for regular intersections, the road design may provide enough hints for human drivers to infer connectivity. Plus, the inference process may be mostly a logical process, so an algorithm-based approach may be sufficient to generate the connectivity.

In some embodiments, the connectivity generation for an N-side intersection may be further divided into smaller tasks. The connectivity of the N sides may be generated mostly independently, and then assembled. This may effectively reduce the complexity of the problem from $O(N^2)$ to $O(N)$. For each side, the connectivity may be generated in two steps: (1) direction combo template generation, and (2) connectivity generation from a picked template. This division may greatly simplify the problem for the algorithm, and may also make it easier for humans to review the results visually and catch problem as quickly as possible.

Figure 30:
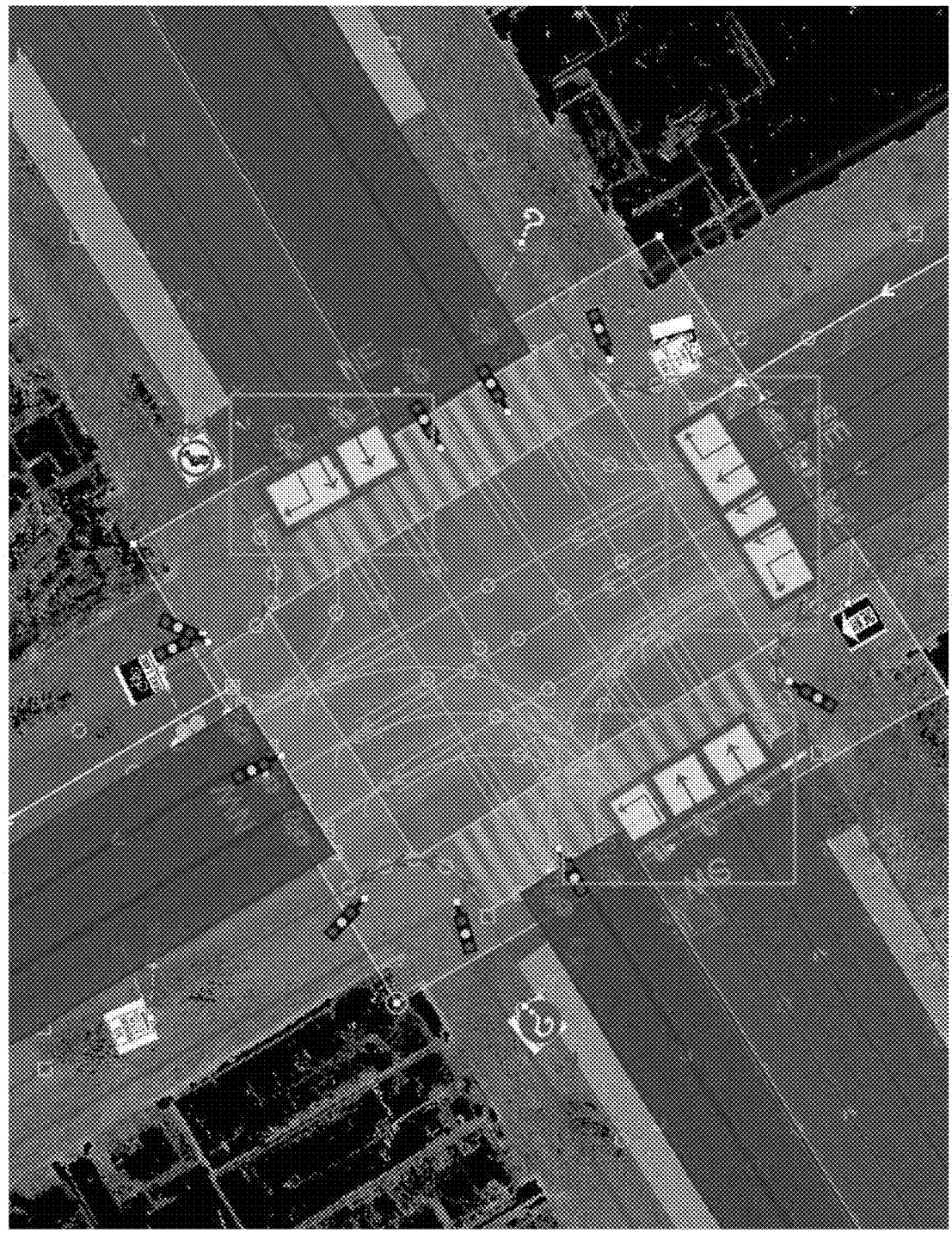

In the step of direction combo template generation, as disclosed in the user interface of FIG. 30, for each lane going into the intersection, a set (combo) of directions may be assigned to the lane. The combo may be directions of successors (e.g., connectivity) originating from each lane. All combos from one side may form a template, and combos within a template may be related. For each side, there may be a finite number of applicable templates. These templates may be generated iteratively, then filtered and ranked using the following inputs: (1) number of lanes in this side, (2) number of lanes in other sides, (3) directional paints, (4) traffic signs (e.g., no right turn, no straight, etc.), (5) special road structures (e.g., branch/merge, slip right turns, suicide lanes, etc.), and (6) some typical patterns for certain lane structures (e.g., in the U.S., for a two-lane road without extra hints, usually the left lane is left only, and the right lane is straight and right; also templates with multiple turns are more common than templates with no turns). In some embodiments, generating all templates may be solved as a backtracking problem with high computational complexity. However, a recursive approach may not enforce some intrinsic restrictions. For example, |r|r|l|l| and |s|l|s| (where r=right, l=left, s=straight) are both invalid templates. Therefore, the system may use an iterative approach that honors these restrictions. In some embodiments, it may be possible for big intersections (e.g., because most of them have enough directional paints) to filter out most of the templates, which may simplify ranking. For medium/small sized intersections, the ranking may be more difficult with less hints. The system may use a hybrid approach to rank the templates as follows: (1) template matching to a predefined ranked template set, and (2) score-based filtering and ranking as a fallback, with the score calculated from a number of irregularities and a degree of commonness for the template. In some embodiments, the system may be able to pick the correct template automatically for ~97% of the intersections.

Even for the remaining ~3% of the intersections, since the system generates all the valid templates, the user may still go through all the templates manually and pick the correct template.

With regard to the step of connectivity, once the template is generated, the next step may be to determine the connectivity. For each originating lane on a side, the system may find all destination lanes on the left/right/opposite side that a vehicle can legally travel to. The logic may differ depending on whether the direction is right, left, or straight. The right direction may be the most straightforward direction (depending on the state) since the right direction may have a one-to-one connection between the Nth originating lane and Nth lane from outermost on the right side. For the left direction, the system may consider the case that left is one-to-many (depending on the state). Not all lanes on the left may not be qualified for left turn destination (e.g., a left merge lane or part of a right turn slip lane). If there is only one originating lane, it may be connected to all applicable destination lanes on the left side. If there are O lanes, and D lanes on the left (D>=O), then the rightmost lane may be one to (D−O+1). Further, a U-turn may also be considered as a left turn, and they may be generated based on several hints (e.g., signs, geometries: Is the space big enough for a U turn?). For the straight direction, not all lanes on the opposite side may be qualified for a straight turn destination. For example, if there are O originating lanes, and D destination lanes: (1) if O=D, then the system may simply connect them, (2) if O>D (e.g., there is a merge), then the system may trigger an error and abort, (3) if O<D (e.g., there is a branch, as there is more than one way to arrange the branch), then the system may perform a recursive algorithm to generate all possible branching patterns. The recursive algorithm may process an originating lane and a destination lane for mapping and may recursively process the remaining pairs of originating lanes and destination lanes. The pattern with minimal geometry difference may be picked. Accordingly, the option that allows the highest number of lanes to continue going straight may be given a higher priority. For example, a first option may allow two lanes to go straight and one at an angle, and a second option may allow one straight lane and two lanes at an angle. Accordingly, the first option may provide more lanes going straight and may be given a higher priority. In some embodiments, the system may determine an aggregate measure of angles compared to a line going straight. The system may give priority to the option that has a minimum aggregate angle from a direction going straight. If the template is generated correctly, this connectivity step may have a ~95% correct rate. Some embodiments may use geometry based hints. In some embodiments, if there are several turns, the system may measure the curvatures of different arcs formed by the turns for each template. The system may assign high priority to the template that has a minimum aggregate curvature of the arcs. Accordingly, the priority assigned to a template may be inversely related (or inversely proportionate) to the aggregate curvature of the arcs formed by tracks of vehicles that may turn according to the templates.

In some embodiments, the system may include regional support. For example, different countries and regions may have different rules that can impact connectivity, such as: (1) left turn one-to-one or one-to-many, (2) right driving vs. left driving, (3) dedicated turning lane for U-turn, and (4) left turns on the outermost lane of the road. In some embodiments, the system may maintain a database with state specific rules. The system may combine the steps with state specific rules to ensure that templates that violate any state specific rules are excluded.

Right of Way at Intersections

In some embodiments, the system may model and automate right of ways for common intersection types. The model may be used for navigation of autonomous vehicles. Right of way may be important for an autonomous vehicle to determine while navigating. Determining right of way can be sometimes be difficult even for human drivers. The system may enumerate all possible pairs of turn lanes at an intersection. For each pair of turn lanes at an intersection: (1) the system may evaluate if the pair of turns lanes overlap spatially (e.g., determine whether vehicles driving on the pair of turns lanes can collide, with example pairs highlighted in yellow in the user interface of FIG. 31), and (2) if there is a possibility of collision, the system may provide the information via a user interface to a user (e.g., to arbitrate a relative priority (an enum with values: high, low, equal) between them, with the one with higher priority having the right of way).

In some embodiments, the system may encounter the following issues which may be handled separately: (1) non-applicability to intersections that rely on run time inputs, such as a four-way stop or a roundabout, (2) at a signal-controlled intersection, although one or more lane pairs may collide spatially, they may not collide in practice given the signal control, and (3) some work from an operation team may be required, especially for large intersections, but most of the prioritization rules may be clearly defined and may be automated Some embodiments may model and automate right of way for common intersection types. The system may use different processes/strategies for different types of intersections, including (1) signal controlled 4-way/3-way intersection, (2) 4-way stop/3-way stop/roundabout/cul-de-sac, (3) 2-way stop/asymmetrical T-junction, (4) uncontrolled 4-way, and (5) other intersections.

Figure 32:
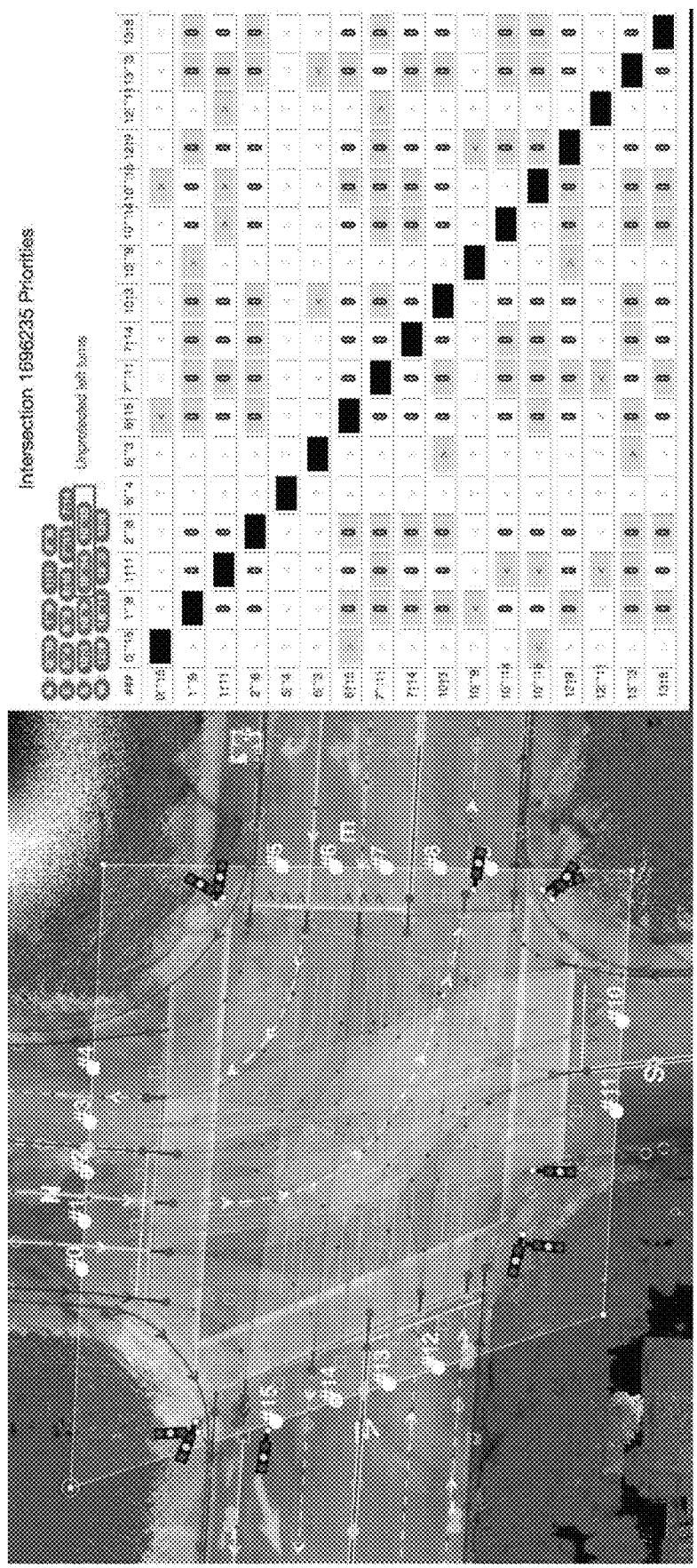
Figure 33:
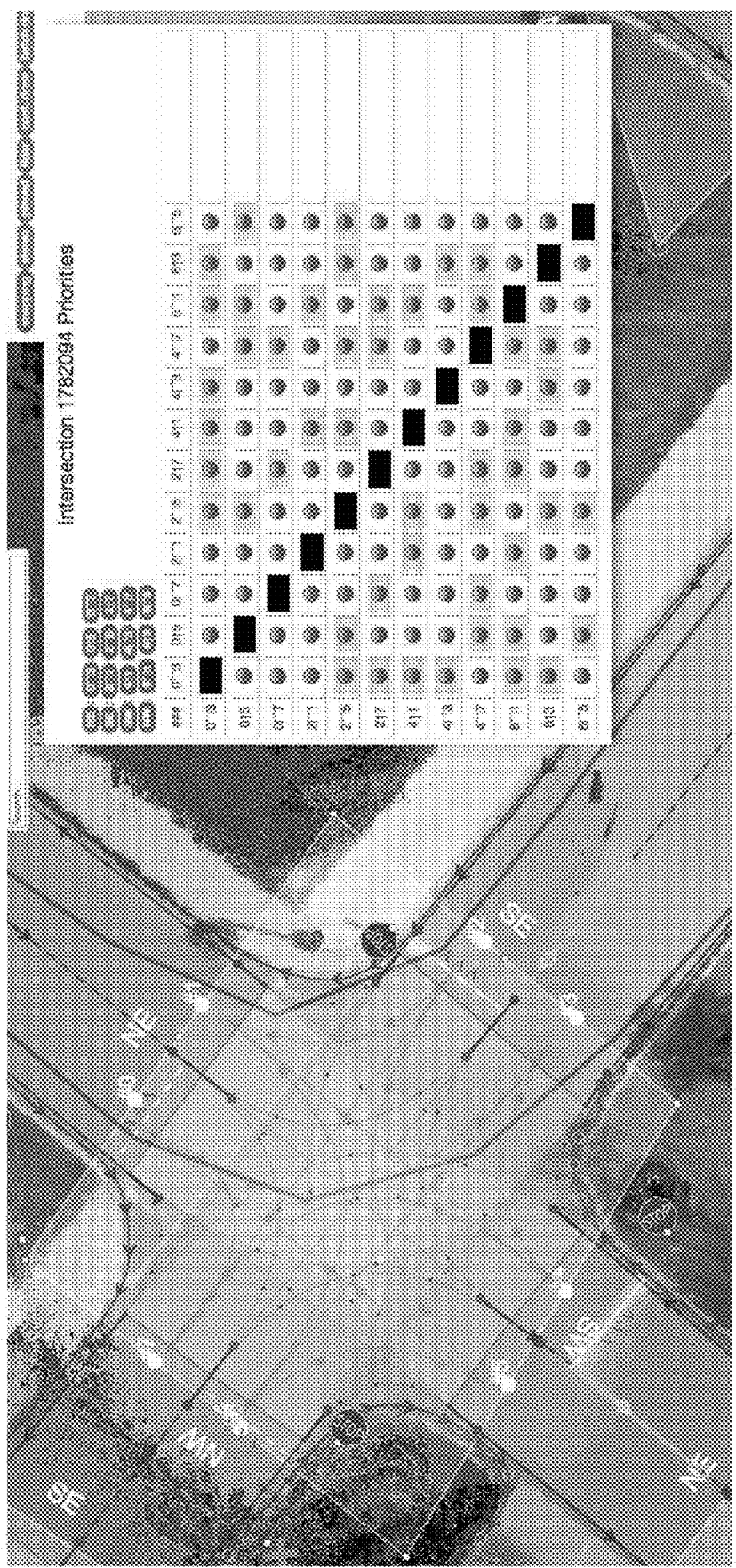

In the case of a signal-controlled (e.g., controlled with a traffic light) 4-way/3-way intersection, most of the lanes, despite their spatial relations, may rely on the traffic light for prioritization. However, there are two common cases that require extra priority assignment: (1) unprotected left turn, and (2) unprotected right turn, namely right turn given there is a no 'no turn on red' and the signal is red. The system may automatically generate the prioritization for a signal-controlled intersection as follows: (1) for unprotected left/right turns, the system may automatically infer their relative relations with the lanes that spatially overlap with them, and can be occupied by a vehicle simultaneously, with an unprotected left turn having a green signal being assigned a lower priority than conflicting right turns, U-turns, and opposing straight turns, and with an unprotected right turn having a red signal being assigned a lower priority than others, and (2) for all other remaining pairs, the system may mark their relative priority as 'CONTROLLED_BY_SIGNAL' which may be a type in the relative priority enum, and it may instruct the vehicle to follow the traffic signals for prioritization. The user interface of FIG. 32 illustrates a right of way matrix for a simple signal-controlled intersection with two unprotected left turns. As disclosed in FIG. 32, the automatically generated priorities may be incorrect for some corner cases, and the tool may allow manual overriding of the automatically generated values. Further, the whole process may be automated, given that the type of the intersection is manually marked as 'FOUR_WAY'. The unprotected left/right turns may be inferred through sign and signal association. When two lanes are of the same level (e.g., both lanes are unprotected), the system may further resolve their priority through the turn type. For example, the order of priority may be straight>right turn>left turn>U-turn. This may also be applicable to other types of intersections. In some embodiments, a special case may be double left turns (which may be marked for manual review), which can be '=' or 'CONTROLLED_BY_SIGNAL' depending on: (1) if the two lanes are spatially overlapping (however, the turn lanes generated might not be the realistic, as human drivers might take an irregular path to avoid each other), or (2) if the two lanes can be occupied at the same time, the system may use knowledge of the light programming.

In the case of a 4-way stop/3-way stop/roundabout/cul-de-sac intersection, these types of intersections may be similar in that prioritization may depend on run time inputs. For example, in a 4-way stop, a first vehicle to stop (or the vehicle on the right side if two vehicles stop simultaneously) may have the right of way. In these cases, it may suffice for a map to mark all priority relations within the intersection as "CONTROLLED_BY_STOPLINE', as shown in the user interface of FIG. 33. This may be a type in the relative priority enum, and it may instruct the vehicle to figure out the right of way on the fly.

Figure 34:
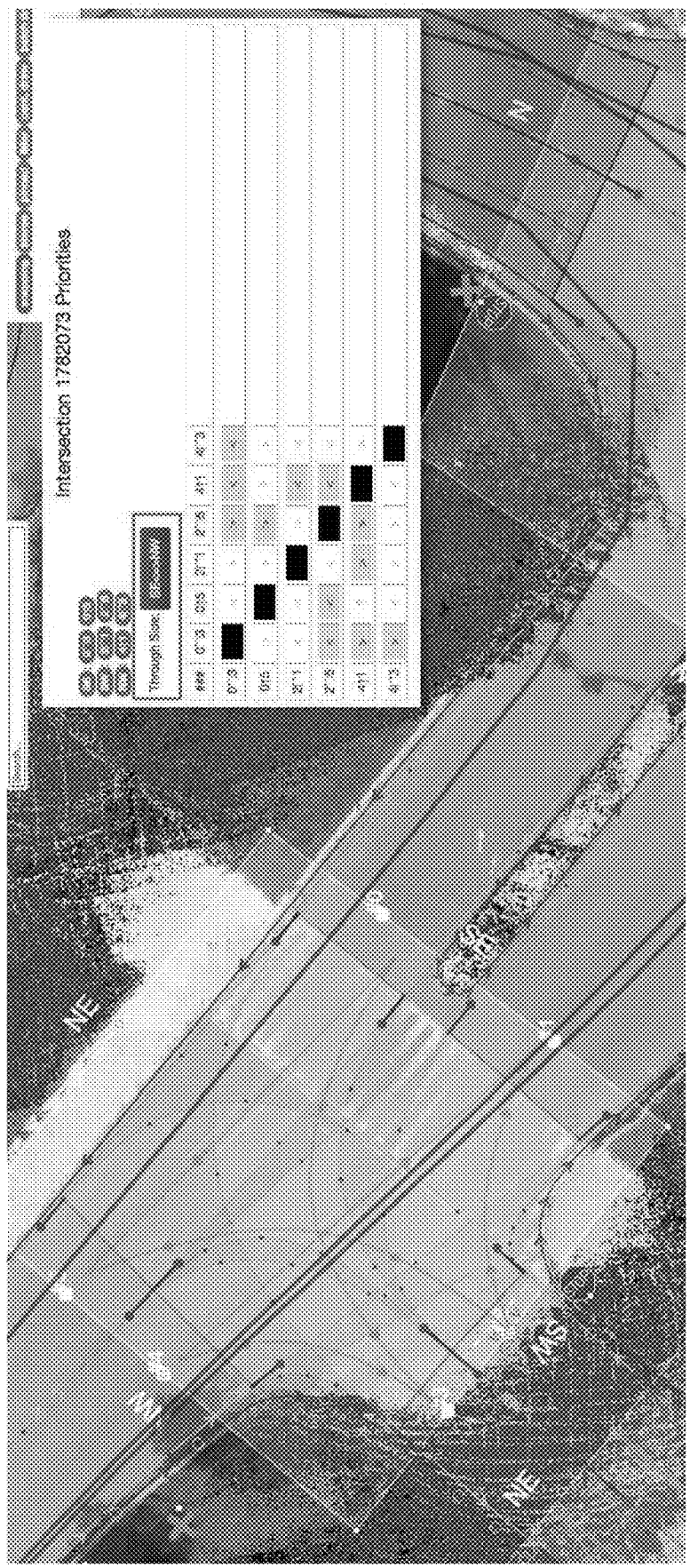

In the case of a 2-way stop/asymmetrical T-junction intersection, these two types of intersections may be similar in that lanes on the through road may have the right of way. For example, in a T-junction, lanes originating on the through road may have higher priority. Also, in a 2-way stop, the lanes not controlled by stop signs may have higher priority. For a 2-way stop, the relative relations for lanes controlled by stop signs may be determined in the same way as the 4-way stop discussed above. Given the analysis above, the priority relations may be automatically inferred, after some manual work to mark the main road, or the stop sign-controlled road. The user interface of FIG. 34 shows a right of way matrix for a simple T-junction intersection with a one-way stop. The automatically generated priorities may be wrong for some corner cases, and the tool may provide a last resort for manual overriding.

In the case of an uncontrolled 4-way intersection, which may be an intersection without any signal or sign, there may be two cases: (1) an intersection with a type 'FOUR_WAY_UNCONTROLLED_ASYMMETRICAL' may be an intersection where a main roads joins with a secondary road, or a paved road joins with an unpaved road, which may be treated as 2-way stop, and (2) an intersections with a type 'FOUR_WAY_UNCONTROLLED' may be an intersection where the four roads have equal grade, which the system may use an algorithm that treats the intersection as a 4-way stop to generate prioritization automatically.

In the case of other intersections, if the system encounters any odd intersections, such as a 5-way intersection or a mix and match of the types of intersections mentioned above, the system may mark these intersections for a user/operator to fill in all of the priorities.

Determining Lane Connectivity at Traffic Intersections for HD Maps

Figure 35:
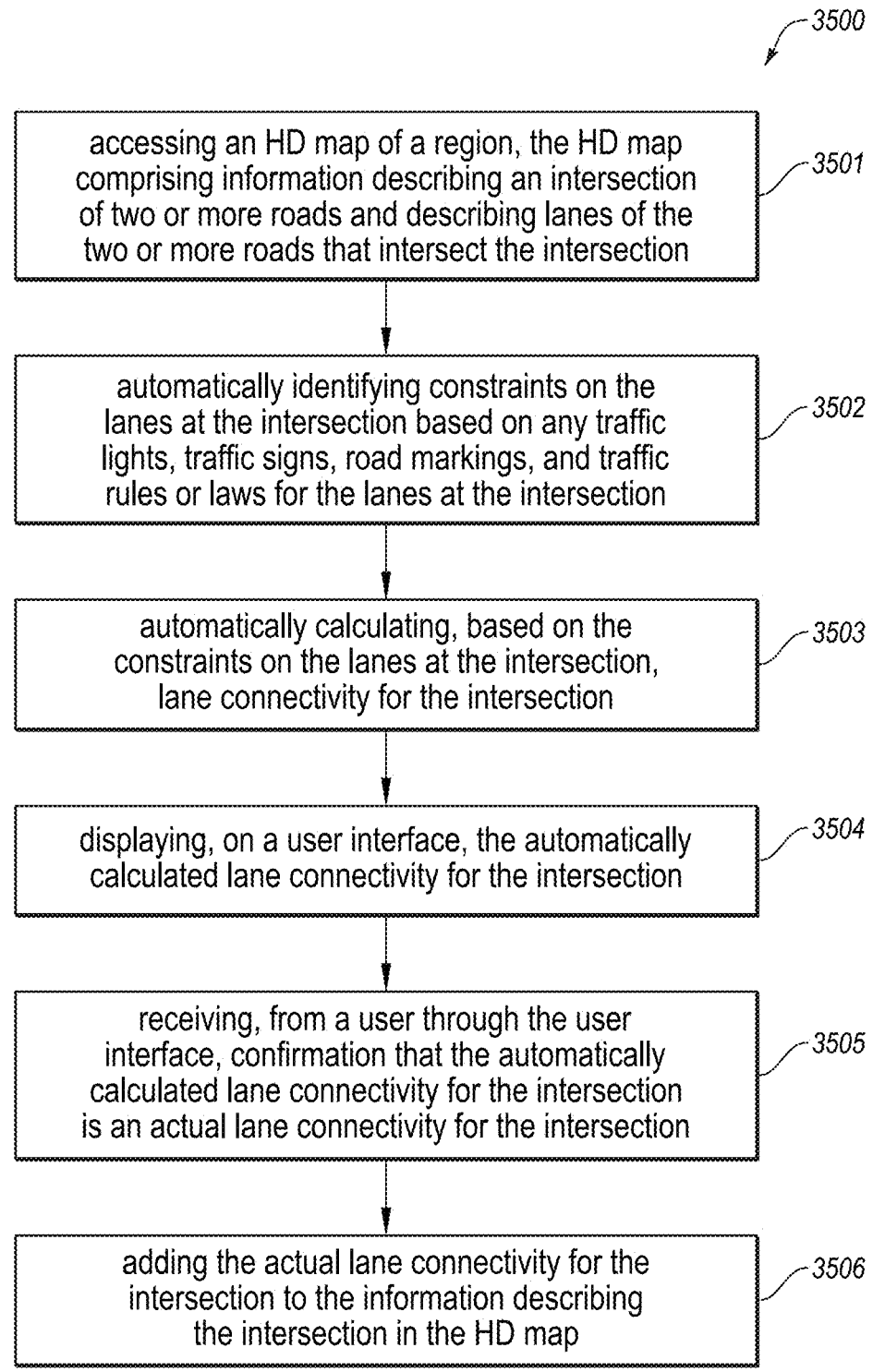
FIG. 35 illustrates a flowchart of an example method for determining lane connectivity at traffic intersections for HD maps.
Figure 36:
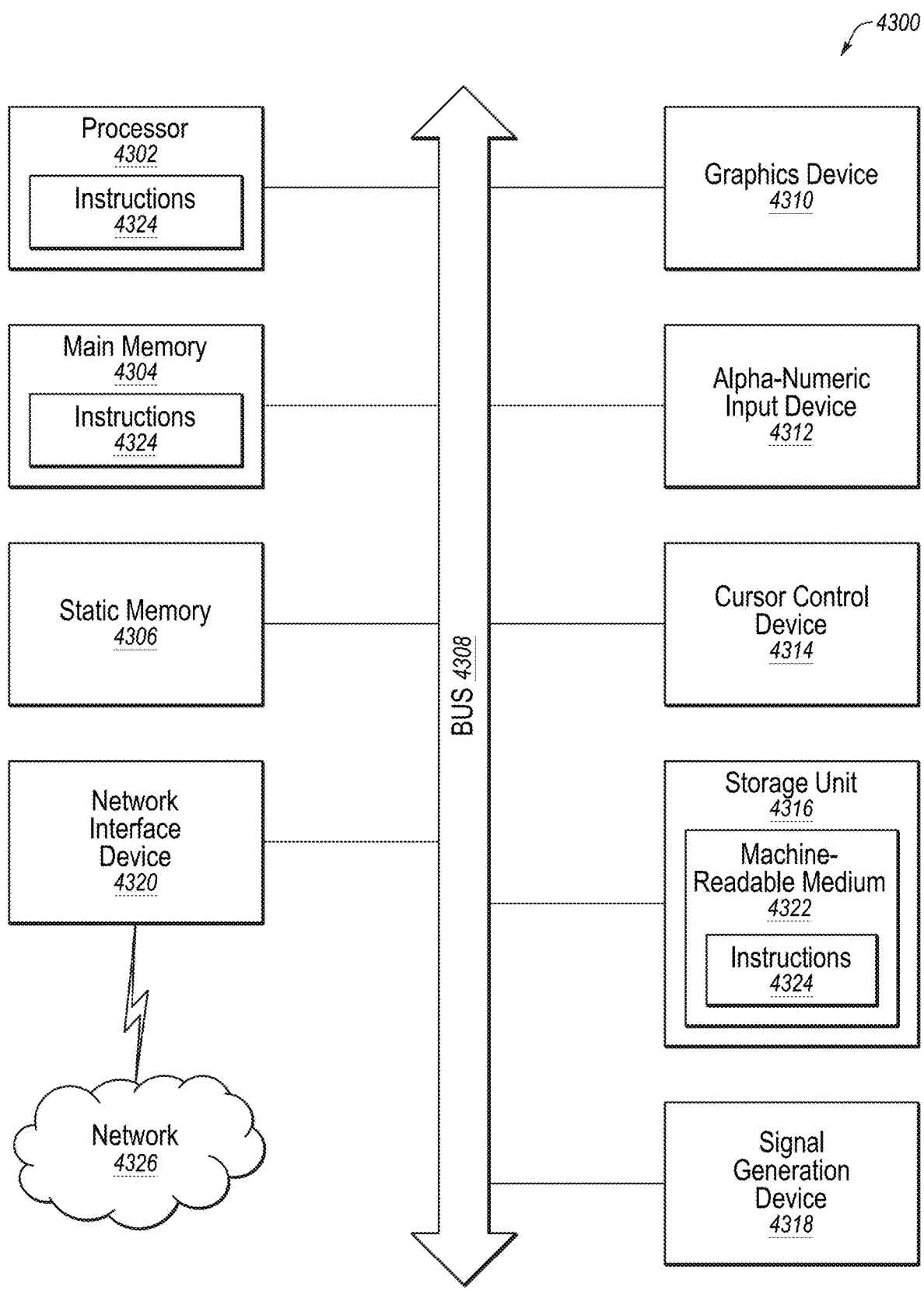
FIG. 36 illustrates an example embodiment of a computing machine that can read instructions from a machine-readable medium and execute the instructions in a processor or controller.

FIG. 35 illustrates a flowchart of an example method 3500 for determining lane connectivity at traffic intersections for HD maps. The method 3500 may be performed by any suitable system, apparatus, or device. For example, one or more elements of the HD map system 100 of FIG. 1 may be configured to perform one or more of the operations of the method 3500. Additionally or alternatively, the computer system 4300 of FIG. 36 may be configured to perform one or more of the operations associated with the method 3500. Although illustrated with discrete blocks, the actions and operations associated with one or more of the blocks of the method 3500 may be divided into additional blocks, combined into fewer blocks, or eliminated, depending on the particular implementation.

The method 3500 may include, at action 3501, accessing an HD map of a region, the HD map comprising information describing an intersection of two or more roads and describing lanes of the two or more roads that intersect the intersection. For example, the lane connector module 3530 may access, at action 3501, a HD map of a region comprising information describing an intersection of two or more roads and describing lanes of the two or more roads that intersect the intersection.

The method 3500 may include, at action 3502, automatically identifying constraints on the lanes at the intersection. In some embodiments, the automatically identifying of the constraints on the lanes at the intersection may be based on any traffic lights, traffic signs, road markings, traffic rules, or traffic laws, or some combination thereof, for the lanes at the intersection. In some embodiments, the action 3502 may include automatically determining a type of each of the lanes, automatically determining a direction in which a vehicle can travel in each of the lanes, automatically identifying of the constraints on the lanes at the intersection further comprises automatically determining, for each two turn lanes with conflicting traffic, a priority specifying which of the two turn lanes has a right of way, or automatically associating the traffic signs to a side of the intersection that is controls, or some combination thereof. For example, the lane connector module 3530 may automatically identify, at action 3502, constraints on the lanes at the intersection based on any traffic lights, traffic signs, road markings, and traffic rules or laws for the lanes at the intersection.

The method 3500 may include, at action 3503, automatically calculating, based on the constraints on the lanes at the intersection, lane connectivity for the intersection. In some embodiments, the lane connectivity may indicate which of the lanes that are outgoing from the intersection a vehicle can legally travel from each of the lanes that is incoming into the intersection. In some embodiments, the action 3503 may include accessing predefined lane connectivity templates that can apply to the intersection with the predefined lane connectivity templates configured to prevent invalid combinations of lane directions, filtering the predefined lane connectivity templates to eliminate predefined lane connectivity templates that are inconsistent with the constraints on the lanes at the intersection, ranking the predefined lane connectivity templates that remain after performing the filtering, and automatically calculating the lane connectivity for the intersection based on a top ranked predefined lane connectivity template. In these embodiments, if the top ranked predefined lane connectivity template does not match the intersection, the method 3500 may further include creating a new predefined lane connectivity template based on the actual lane connectivity for the intersection. Also, in these embodiments, the accessing of the predefined lane connectivity templates that can apply to the intersection may include accessing predefined lane connectivity templates that conform to a governmental jurisdiction in which the intersection is located. For example, the lane connector module 3530 may automatically calculate, at action 3503, lane connectivity for the intersection based on the constraints on the lanes at the intersection.

The method 3500 may include, at action 3504, displaying, on a user interface, the automatically calculated lane connectivity for the intersection. For example, the lane connector module 3530 may display, at action 3504, the automatically calculated lane connectivity for the intersection on a user interface The method 3500 may include, at action 3505, receiving, from a user through the user interface, confirmation that the automatically calculated lane connectivity for the intersection is an actual lane connectivity for the intersection. For example, the lane connector module 3530 may receive, at action 3505, confirmation that the automatically calculated lane connectivity for the intersection is an actual lane connectivity for the intersection from a user through the user interface.

The method 3500 may include, at action 3506, adding the actual lane connectivity for the intersection to the information describing the intersection in the HD map. For example, the lane connector module 3530 may add, at action 3506, the actual lane connectivity for the intersection to the information describing the intersection in the HD map.

Subsequent to the action 3506, the method 3500 may employ the actual lane connectivity for the intersection in gathering data to update the HD map store 165, and/or in navigating the vehicle 150 based on the identified lane lines. Further, the method 3500 may be employed repeatedly as the vehicle 150 navigates along a road. For example, the method 3500 may be employed when the vehicle 150 (or another non-autonomous vehicle) starts driving, and then may be employed repeatedly during the navigation of the vehicle 150 (or another non-autonomous vehicle). The vehicle 150 may navigate by sending control signals to controls of the vehicle 150. The method 3500 may also be employed by the vehicle computing system 120 of the vehicle 150 and/or by the online HD map system 110 to confirm actual lane connectivity for the intersection. In some embodiments, the method 3500 may be employed by the vehicle computing system 120 and/or by the online HD map system 110 to receive confirmation of the automatically determined lane connectivity for the intersection and to add information regarding lane connectivity for the intersection to the HD map more quickly and more accurately than using an entirely manual process or an entirely automated process.

Computer System Architecture

Figure 31:
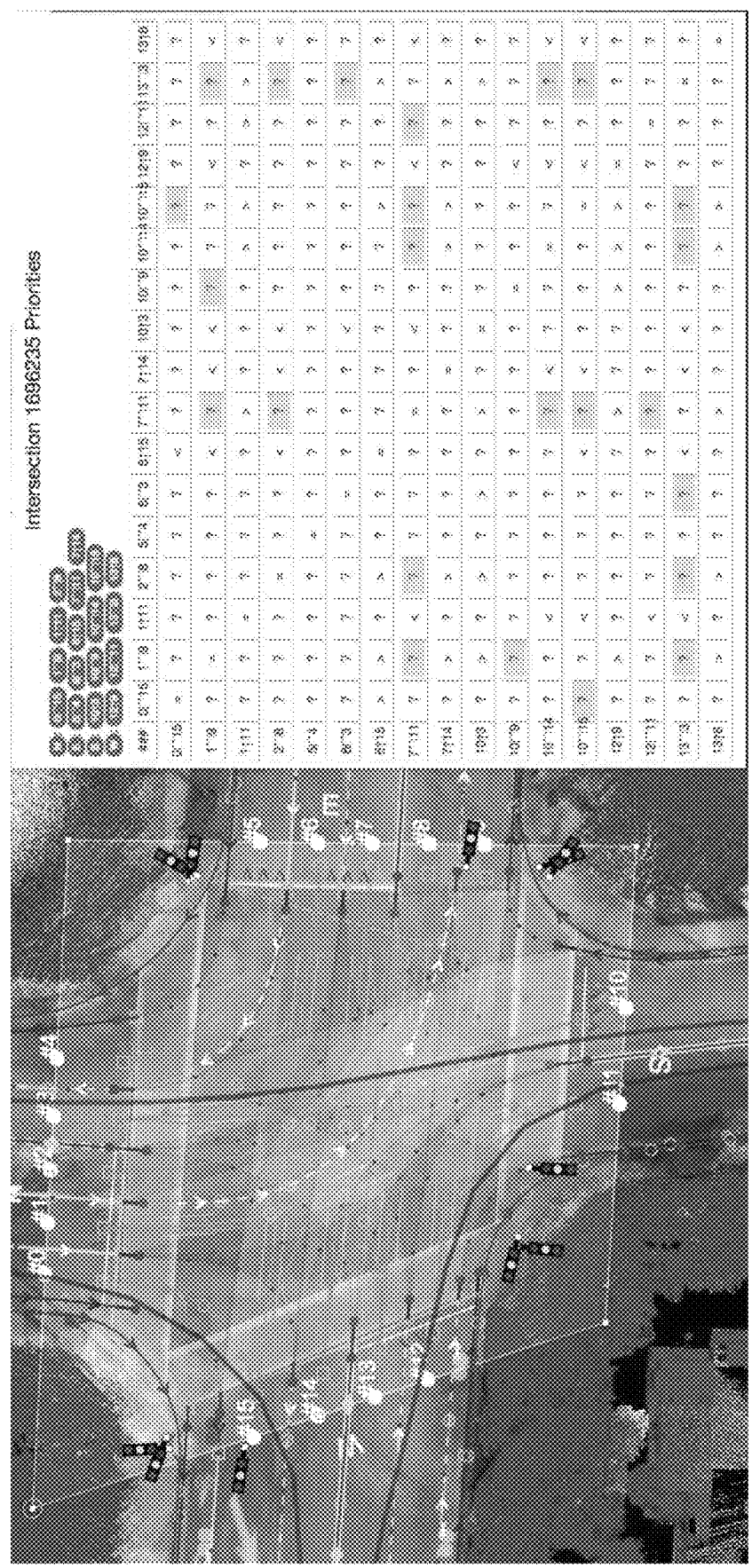

FIG. 31 is a block diagram illustrating components of an example computer system able to read instructions from a machine-readable medium and execute them in a processor (or controller). Specifically, FIG. 31 shows a diagrammatic representation of a machine in the example form of a computer system 4300 within which instructions 4324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 4324 (sequential or otherwise) that specify actions to be taken by that machine. Further, while only a single machine is illustrated, the term "machine" shall also be taken to include any collection of machines that individually or jointly execute instructions 4324 to perform any one or more of the methodologies discussed herein.

The example computer system 4300 may be part of or may be any applicable system described in the present disclosure. For example, the online HD map system 110 and/or the vehicle computing systems 120 described above may comprise the computer system 4300 or one or more portions of the computer system 4300. Further, different implementations of the computer system 4300 may include more or fewer components than those described herein. For example, a particular computer system 4300 may not include one or more of the elements described herein and/or may include one or more elements that are not explicitly discussed.

The example computer system 4300 includes a processor 4302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 4304, and a static memory 4306, which are configured to communicate with each other via a bus 4308. The computer system 4300 may further include graphics display unit 4310 (e.g., a plasma display panel (PDP), a liquid crystal display (LCD), a projector, or a cathode ray tube (CRT)). The computer system 4300 may also include alphanumeric input device 4312 (e.g., a keyboard), a cursor control device 4314 (e.g., a mouse, a trackball, a joystick, a motion sensor, or other pointing instrument), a storage unit 4316, a signal generation device 4318 (e.g., a speaker), and a network interface device 4320, which also are configured to communicate via the bus 4308.

The storage unit 4316 includes a machine-readable medium 4322 on which is stored instructions 4324 (e.g., software) embodying any one or more of the methodologies or functions described herein. The instructions 4324 (e.g., software) may also reside, completely or at least partially, within the main memory 4304 or within the processor 4302 (e.g., within a processor's cache memory) during execution thereof by the computer system 4300, the main memory 4304 and the processor 4302 also constituting machine-readable media. The instructions 4324 (e.g., software) may be transmitted or received over a network 4326 via the network interface device 4320.

While machine-readable medium 4322 is shown in an example embodiment to be a single medium, the term "machine-readable medium" should be taken to include a single medium or multiple media (e.g., a centralized or distributed database, or associated caches and servers) able to store instructions (e.g., instructions 4324). The term "machine-readable medium" shall also be taken to include any medium that is capable of storing instructions (e.g., instructions 4324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   accessing a high definition (HD) map of a region, the HD map comprising information describing an intersection of two or more roads and describing lanes of the two or more roads that intersect the intersection;
   identifying constraints on the lanes at the intersection;
   calculating, based at least on the constraints on the lanes at the intersection, lane connectivity for the intersection, the lane connectivity indicating which of the lanes that are outgoing from the intersection a vehicle can legally travel from one or more of the lanes that are incoming into the intersection;
   receiving, based at least on an input received at a user interface, confirmation that the lane connectivity for the intersection, as calculated based at least on the constraints, is an actual lane connectivity for the intersection; and
   adding the actual lane connectivity for the intersection to the information describing the intersection in the HD map.

2. The method of claim 1, wherein the calculating of the lane connectivity for the intersection further comprises:
   accessing predefined lane connectivity templates that can apply to the intersection, the predefined lane connectivity templates configured to prevent invalid combinations of lane directions;
   filtering the predefined lane connectivity templates to eliminate predefined lane connectivity templates that are inconsistent with the constraints on the lanes at the intersection; and
   ranking the predefined lane connectivity templates that remain after performing the filtering, wherein the calculating the lane connectivity for the intersection is based at least on a top ranked predefined lane connectivity template.

3. The method of claim 2, further comprising, creating a new predefined lane connectivity template based at least on the actual lane connectivity for the intersection.

4. The method of claim 2, wherein the accessing of the predefined lane connectivity templates that can apply to the intersection comprises accessing predefined lane connectivity templates that conform to a governmental jurisdiction in which the intersection is located.

5. The method of claim 1, wherein the identifying of the constraints on the lanes at the intersection further comprises determining a type of one or more of the lanes.

6. The method of claim 1, wherein the identifying of the constraints on the lanes at the intersection further comprises determining a direction in which a vehicle can travel in one or more of the lanes.

7. The method of claim 1, wherein the identifying of the constraints on the lanes at the intersection further comprises determining, for two turn lanes with conflicting traffic, a priority specifying which of the two turn lanes has a right of way.

8. The method of claim 1, wherein the identifying of the constraints on the lanes at the intersection further comprises associating a traffic sign to a side of the intersection that it controls.

9. The method of claim 1, wherein the identifying of the constraints on the lanes at the intersection is based at least on, one or more of: traffic lights, traffic signs, road markings, traffic rules, or traffic laws.

10. A processor comprising:
    processing circuitry to cause performance of operations comprising:
    accessing a high definition (HD) map of a region, the HD map comprising information describing an intersection of two or more roads and describing lanes of the two or more roads that intersect the intersection;
    identifying constraints on the lanes at the intersection;
    calculating, based at least on the constraints on the lanes at the intersection, lane connectivity for the intersection, the lane connectivity indicating which of the lanes that are outgoing from the intersection a vehicle can legally travel from one or more of the lanes that are incoming into the intersection;
    receiving, based at least on an input received at a user interface, confirmation that the lane connectivity for the intersection, as calculated based at least on the constraints, is an actual lane connectivity for the intersection; and
    adding the actual lane connectivity for the intersection to the information describing the intersection in the HD map.

11. The processor of claim 10, wherein the calculating of the lane connectivity for the intersection further comprises:
    accessing predefined lane connectivity templates that can apply to the intersection, the predefined lane connectivity templates configured to prevent invalid combinations of lane directions;
    filtering the predefined lane connectivity templates to eliminate predefined lane connectivity templates that are inconsistent with the constraints on the lanes at the intersection; and
    ranking the predefined lane connectivity templates that remain after performing the filtering, wherein the calculating the lane connectivity for the intersection is based at least on a top ranked predefined lane connectivity template.

12. The processor of claim 11, wherein the operations further comprise creating a new predefined lane connectivity template based at least on the actual lane connectivity for the intersection.

13. The processor of claim 11, wherein the accessing of the predefined lane connectivity templates that can apply to the intersection comprises accessing predefined lane connectivity templates that conform to a governmental jurisdiction in which the intersection is located.

14. The processor of claim 10, wherein the identifying of the constraints on the lanes at the intersection further comprises determining a type of one or more of the lanes.

15. The processor of claim 10, wherein the identifying of the constraints on the lanes at the intersection further comprises determining a direction in which a vehicle can travel in one or more of the lanes.

16. The processor of claim 10, wherein the identifying of the constraints on the lanes at the intersection further comprises determining, for two turn lanes with conflicting traffic, a priority specifying which of the two turn lanes has a right of way.

17. The processor of claim 10, wherein the identifying of the constraints on the lanes at the intersection further comprises associating a traffic sign to a side of the intersection that it controls.

18. The processor of claim 10, wherein the identifying of the constraints on the lanes at the intersection is based at least on, one or more of: traffic lights, traffic signs, road markings, traffic rules, or traffic laws.

19. A system comprising:
one or more processing units to perform operations comprising:
- accessing a high definition (HD) map of a region, the HD map comprising information describing an intersection of two or more roads and describing lanes of the two or more roads that intersect the intersection;
- identifying constraints on the lanes at the intersection;
- calculating, based at least on the constraints on the lanes at the intersection, lane connectivity for the intersection, the lane connectivity indicating which of the lanes that are outgoing from the intersection a vehicle can legally travel from one or more of the lanes that are incoming into the intersection;
- receiving, based at least on an input received at a user interface, confirmation that the lane connectivity for the intersection, as calculated based at least on the constraints, is an actual lane connectivity for the intersection; and
- adding the actual lane connectivity for the intersection to the information describing the intersection in the HD map.

20. The system of claim 19, wherein the calculating of the lane connectivity for the intersection further comprises:
- accessing predefined lane connectivity templates that can apply to the intersection, the predefined lane connectivity templates configured to prevent invalid combinations of lane directions;
- filtering the predefined lane connectivity templates to eliminate predefined lane connectivity templates that are inconsistent with the constraints on the lanes at the intersection; and
- ranking the predefined lane connectivity templates that remain after performing the filtering, wherein the calculating the lane connectivity for the intersection is based at least on a top ranked predefined lane connectivity template.

21. The system of claim 20, wherein the operations further comprise creating a new predefined lane connectivity template based at least on the actual lane connectivity for the intersection.

22. The system of claim 20, wherein the accessing of the predefined lane connectivity templates that can apply to the intersection comprises accessing predefined lane connectivity templates that conform to a governmental jurisdiction in which the intersection is located.

23. The system of claim 19, wherein the identifying of the constraints on the lanes at the intersection further comprises determining a type of one or more of the lanes.

24. The system of claim 19, wherein the identifying of the constraints on the lanes at the intersection further comprises determining a direction in which a vehicle can travel in one or more of the lanes.

25. The system of claim 19, wherein the identifying of the constraints on the lanes at the intersection further comprises determining, for two turn lanes with conflicting traffic, a priority specifying which of the two turn lanes has a right of way.

26. The system of claim 19, wherein the identifying of the constraints on the lanes at the intersection further comprises associating a traffic sign to a side of the intersection that it controls.

27. The system of claim 19, wherein the identifying of the constraints on the lanes at the intersection is based at least on, one or more of: traffic lights, traffic signs, road markings, traffic rules, or traffic laws.

* * * * *